United States Patent
Tanaka et al.

(10) Patent No.: US 10,706,448 B2
(45) Date of Patent: Jul. 7, 2020

(54) SERVICE MONITORING SYSTEM AND SERVICE MONITORING METHOD

(71) Applicant: PANASONIC INTELLECTUAL PROPERTY MANAGEMENT CO., LTD., Osaka (JP)

(72) Inventors: Hisahiro Tanaka, Fukuoka (JP); Akitoshi Izumi, Fukuoka (JP); Masanari Miyamoto, Fukuoka (JP); Shinichi Shigenaga, Fukuoka (JP); Ryota Fujii, Fukuoka (JP); Koshi Tanaka, Fukuoka (JP); Hisashi Tsuji, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 518 days.

(21) Appl. No.: 15/513,622

(22) PCT Filed: Sep. 14, 2015

(86) PCT No.: PCT/JP2015/004661
§ 371 (c)(1),
(2) Date: Mar. 23, 2017

(87) PCT Pub. No.: WO2016/051693
PCT Pub. Date: Apr. 7, 2016

(65) Prior Publication Data
US 2017/0300990 A1    Oct. 19, 2017

(30) Foreign Application Priority Data

Sep. 30, 2014  (JP) .................................. 2014-201881
Aug. 31, 2015  (JP) .................................. 2015-171556

(51) Int. Cl.
*G06Q 10/00*    (2012.01)
*G06Q 30/06*    (2012.01)
(Continued)

(52) U.S. Cl.
CPC ... *G06Q 30/0613* (2013.01); *G06Q 10/06398* (2013.01); *G07G 1/12* (2013.01);
(Continued)

(58) Field of Classification Search
None
See application file for complete search history.

(56) References Cited

U.S. PATENT DOCUMENTS 7,940,897 B2 *  5/2011  Khor ...................... G06Q 30/02
                                                        379/88.02
9,015,046 B2 *  4/2015  Pereg ................... G06Q 10/063
                                                           704/251
(Continued)

FOREIGN PATENT DOCUMENTS

JP    2006-267465    10/2006
JP    2009-123029     6/2009
(Continued)

OTHER PUBLICATIONS

Prosodic cues for emotion characterization in real-life spoken dialogs L Devillers, I Vasilescu—Eighth European Conference on Speech . . . , 2003—isca-speech.org (Year: 2003).*
(Continued)

*Primary Examiner* — Jonathan G Sterrett
(74) *Attorney, Agent, or Firm* — Greenblum & Bernstein, P.L.C.

(57) ABSTRACT

A service monitoring system includes a voice collector that collects a voice of an employee in a predetermined voice collection region, a storage unit that stores service event data including determination conditions for each predetermined (Continued)

service event, terminal operation history data indicating an operation history of an employee on a predetermined business terminal and voice data of the employee in correlation with each other, a detector that detects the service event of the employee based on the service event data and the terminal operation history data, a calculator that calculates a service speech evaluation value corresponding to a predetermined speech keyword on the basis of the voice data of the employee during the service event, and an output that stores the service speech evaluation value in correlation with identification information of the employee, and voice data of the employee specified by a service position and time point of the employee.

19 Claims, 44 Drawing Sheets

(51) Int. Cl.
| | | |
|---|---|---|
| *G06Q 10/06* | (2012.01) | |
| *G07G 1/12* | (2006.01) | |
| *G10L 15/08* | (2006.01) | |
| *G10L 17/00* | (2013.01) | |
| *G10L 17/22* | (2013.01) | |
| *G10L 25/78* | (2013.01) | |
| G10L 21/0216 | (2013.01) | |
| G10L 15/22 | (2006.01) | |
| G10L 15/02 | (2006.01) | |

(52) U.S. Cl.
CPC ............ *G10L 15/08* (2013.01); *G10L 17/005* (2013.01); *G10L 17/22* (2013.01); *G10L 25/78* (2013.01); *G10L 15/02* (2013.01); *G10L 2015/025* (2013.01); *G10L 2015/088* (2013.01); *G10L 2015/227* (2013.01); *G10L 2021/02166* (2013.01)

(56) References Cited

U.S. PATENT DOCUMENTS

| | | | |
|---|---|---|---|
| 9,313,332 B1* | 4/2016 | Kumar | H04M 3/5232 |
| 2001/0011228 A1* | 8/2001 | Shenkman | G06Q 30/0204 |
| | | | 705/14.53 |
| 2005/0246165 A1* | 11/2005 | Pettinelli | G10L 15/1807 |
| | | | 704/207 |
| 2006/0265090 A1* | 11/2006 | Conway | H04M 3/42221 |
| | | | 700/94 |
| 2008/0059200 A1* | 3/2008 | Puli | G06F 17/289 |
| | | | 704/277 |
| 2008/0222027 A1* | 9/2008 | Megdal | G06Q 40/02 |
| | | | 705/38 |
| 2011/0282662 A1* | 11/2011 | Aonuma | G10L 17/26 |
| | | | 704/231 |
| 2012/0035987 A1* | 2/2012 | Anand | G06Q 10/06398 |
| | | | 705/7.42 |
| 2013/0282446 A1* | 10/2013 | Dobell | G06Q 10/06398 |
| | | | 705/7.42 |
| 2013/0290067 A1* | 10/2013 | Barton | G06Q 10/06 |
| | | | 705/7.28 |
| 2013/0339105 A1* | 12/2013 | Russell | H04W 4/029 |
| | | | 705/7.42 |
| 2015/0363735 A1* | 12/2015 | Fairbanks | G06Q 10/06393 |
| | | | 705/7.39 |

FOREIGN PATENT DOCUMENTS

| | | |
|---|---|---|
| JP | 2011-86087 | 4/2011 |
| JP | 2011-237966 | 11/2011 |
| JP | 5336675 | 8/2013 |
| JP | 5533219 | 5/2014 |

OTHER PUBLICATIONS

Search Report issued in International Patent Application No. PCT/JP2015/004661, dated Dec. 15, 2015.

* cited by examiner

FIG. 10

| SERVICE SITUATION DATA ID | SERVICE SPEECH EVALUATION VALUE | EVENT STARTING TIME | EVENT ENDING TIME | ATTENDANT ID | SERVICE EVENT ID | ATTENDANT POSITION (PRESET) | ATTENDANT POSITION (NOT PRESET) | |
|---|---|---|---|---|---|---|---|---|
| | | | | | | PRESET ID | CAMERA ID | COORDINATE POSITION ON SCREEN |
| ID1 | V11 ... V1n | 2014/08/18 12:00:00 | 2014/08/18 12:00:10 | E1 | EID1 | Null | C1 | X,Y |
| ID2 | V21 ... V2m | 2014/08/18 12:05:00 | 2014/08/18 12:05:10 | E2 | EID2 | P1 | Null | Null |

FIG. 11

| SERVICE EVENT ID | SERVICE EVENT NAME | SERVICE EVENT DETERMINATION CONDITION (CONDITION FOR DETERMINING WHETHER OR NOT SERVICE EVENT IS DETECTED IN MONITORING DATA) | | SERVICE EVENT OUTPUT INFORMATION (INFORMATION OUTPUT WHEN SERVICE EVENT IS DETECTED) | | |
|---|---|---|---|---|---|---|
| | | DETECTION TRIGGER | POS ACTION | PRESET ID | ATTENDANT ID | SERVICE EVENT ID |
| EID1 | ACCOUNTING COMPLETION GREETING | | ACCOUNTING COMPLETION OPERATION | 1...PN (PRESET IDS OF ATTENDANT POSITIONS) | 1...EN (ACQUIRE SINGLE ATTENDANT ID FROM POS) | EID1 |

FIG. 12

| SERVICE EVENT ID | SERVICE EVENT NAME | SERVICE EVENT DETERMINATION CONDITION (CONDITION FOR DETERMINING WHETHER OR NOT SERVICE EVENT IS DETECTED IN MONITORING DATA) | | SERVICE EVENT OUTPUT INFORMATION (INFORMATION OUTPUT WHEN SERVICE EVENT IS DETECTED) | | |
|---|---|---|---|---|---|---|
| | | DETECTION TRIGGER | | PRESET ID | ATTENDANT ID | SERVICE EVENT ID |
| | | POS ACTION | SPECIFIC KEYWORD IN VOICE | | | |
| EID1 | ACCOUNTING COMPLETION GREETING | ACCOUNTING COMPLETION OPERATION | | 1...PN (PRESET IDS OF ATTENDANT POSITIONS) | 1...EN (ACQUIRE SINGLE ATTENDANT ID FROM POS TERMINAL) | EID1 |
| EID2 | VISITING GREETING | | PERFORM VOICE RECOGNITION ON ALL ITEMS OF VOICE DATA ACQUIRED FROM ATTENDANT MICROPHONE, AND VOICE RECOGNITION RESULT INCLUDES "IRASSHAIMASE" | | 1...EN ATTENDANT ID WEARING ATTENDANT MICROPHONE COLLECTING VOICE DATA INCLUDING "IRASSHAIMASE" ATTENDANT MICROPHONE AND ATTENDANT ID ARE CORRELATED WITH EACH OTHER IN ADVANCE | EID2 |

FIG. 13

| SERVICE EVENT ID | SERVICE EVENT NAME | EVENT TARGETING ALL ATTENDANTS | SERVICE EVENT DETERMINATION CONDITION (CONDITION FOR DETERMINING WHETHER OR NOT SERVICE EVENT IS DETECTED IN MONITORING DATA) ||||| SERVICE EVENT OUTPUT INFORMATION (INFORMATION OUTPUT WHEN SERVICE EVENT IS DETECTED) |||||
|---|---|---|---|---|---|---|---|---|---|---|---|---|
| | | | ATTENDANT POSITION CONDITION || DETECTION TRIGGER ||| PRESET ID | MICROPHONE ID | CAMERA ID | ATTENDANT ID | SERVICE EVENT ID |
| | | | PRESET ID | NOT PRESET | ATTENDANT POSITION PRESET ID AND STAYING PERIOD | DOOR SENSOR OPENING/CLOSING | POS ACTION | | | | | |
| EID1 | VISITING-LEAVING GREETING | ○ | | | | OPENING/CLOSING OPERATION | | | 1...MN (ACQUIRE MICROPHONE ID CLOSEST TO EACH OF ALL ATTENDANTS THROUGH IMAGE RECOGNITION) | 1...CN (ACQUIRE CAMERA ID CLOSEST TO EACH OF ALL ATTENDANTS THROUGH IMAGE RECOGNITION) | 1...EN | EID1 |
| EID2 | ACCOUNTING START GREETING | × | 1...PN (DETERMINE WHETHER OR NOT ATTENDANT IS PRESENT AT PRESET POSITION THROUGH IMAGE RECOGNITION) | | STAY AT ANY ONE OF 1...CPN FOR FIVE SECONDS OR MORE (CALCULATED THROUGH IMAGE PROCESSING) | | | 1...PN (PRESET IDS OF ATTENDANT POSITIONS) | | | 1...EN (ACQUIRE SINGLE ATTENDANT ID FROM POS) | EID2 |
| EID3 | ACCOUNTING COMPLETION GREETING | × | | | | | ACCOUNTING COMPLETION OPERATION | 1...PN (PRESET IDS OF ATTENDANT POSITIONS) | | | 1...EN (ACQUIRE SINGLE ATTENDANT ID FROM POS) | EID3 |

FIG. 14

| SERVICE EVENT ID | SERVICE EVENT NAME | EVENT TARGETING ALL ATTENDANTS | SERVICE EVENT DETERMINATION CONDITION (CONDITION FOR DETERMINING WHETHER OR NOT SERVICE EVENT IS DETECTED IN MONITORING DATA) ||| SERVICE EVENT OUTPUT INFORMATION (INFORMATION OUTPUT WHEN SERVICE EVENT IS DETECTED) |||||| 
|---|---|---|---|---|---|---|---|---|---|---|---|
| | | | ATTENDANT POSITION CONDITION || DETECTION TRIGGER | PRESET ID | ATTENDANT POSITION COORDINATES | CAMERA ID | ATTENDANT ID | SERVICE EVENT ID |
| | | | PRESET ID | NOT PRESET | | | | | | | |
| EID1 | VISITING -LEAVING GREETING | ○ | | NOT PRESET | DOOR SENSOR OPENING/ CLOSING | OPENING/CLOSING OPERATION | | ATTENDANT COORDINATE VALUES (CALCULATE COORDINATE VALUES OF ATTENDANT THROUGH IMAGE RECOGNITION) | 1...CN (ACQUIRE CAMERA ID CLOSEST TO EACH OF ALL ATTENDANTS THROUGH IMAGE RECOGNITION) | 1...EN | EID1 |
| EID2 | ACCOUNTING START GREETING | × | 1...PN (DETERMINE WHETHER OR NOT ATTENDANT IS PRESENT AT PRESET POSITION THROUGH IMAGE RECOGNITION) | | ATTENDANT POSITION PRESET ID AND STAYING PERIOD | STAY AT ANY ONE OF 1...CPN FOR FIVE SECONDS OR MORE (CALCULATED THROUGH IMAGE PROCESSING) | 1...PN (PRESET IDS OF ATTENDANT POSITIONS) | | | 1...EN (ACQUIRE SINGLE ATTENDANT ID FROM POS) | EID2 |
| EID3 | ACCOUNTING COMPLETION GREETING | × | | | POS ACTION | ACCOUNTING COMPLETION OPERATION | 1...PN (PRESET IDS OF ATTENDANT POSITIONS) | | | 1...EN (ACQUIRE SINGLE ATTENDANT ID FROM POS) | EID3 |

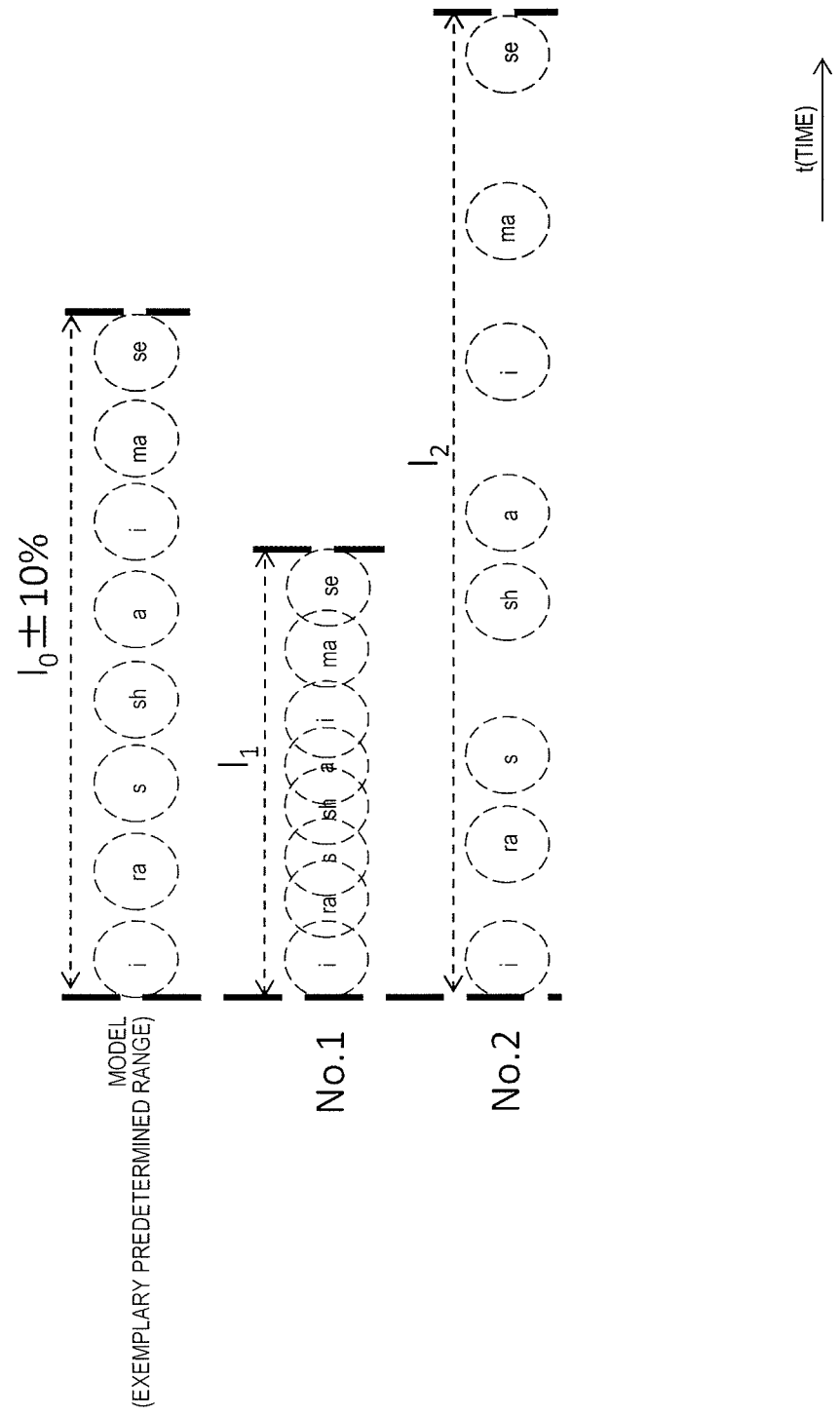

FIG. 22A

| SERVICE EVENT ID | SERVICE EVENT NAME | KEYWORD ID | SPEECH EXPECTATION KEYWORD | SERVICE SPEECH MODEL ID |
|---|---|---|---|---|
| EID1 | ACCOUNTING COMPLETION GREETING | KID1 | ARIGATOUGOZAIMASITA | modelID1 |
| EID2 | ACCOUNTING START GREETING | KID2<br>KID2<br>KID3 | IRASSHAIMASE<br>RASSHAIMASE<br>IRASSHAIMASE KONNICHIWA | modelID2 |
| ... | ... | ... | ... | |

FIG. 22B

| SERVICE SPEECH MODEL ID | MODEL VOICE DATA |
|---|---|
| modelID_1 | MODEL VOICE DATA OF "ARIGATOUGOZAIMASITA" |
| modelID_2 | MODEL VOICE DATA OF "IRASSHAIMASE" |
| ⋮ | ⋮ |

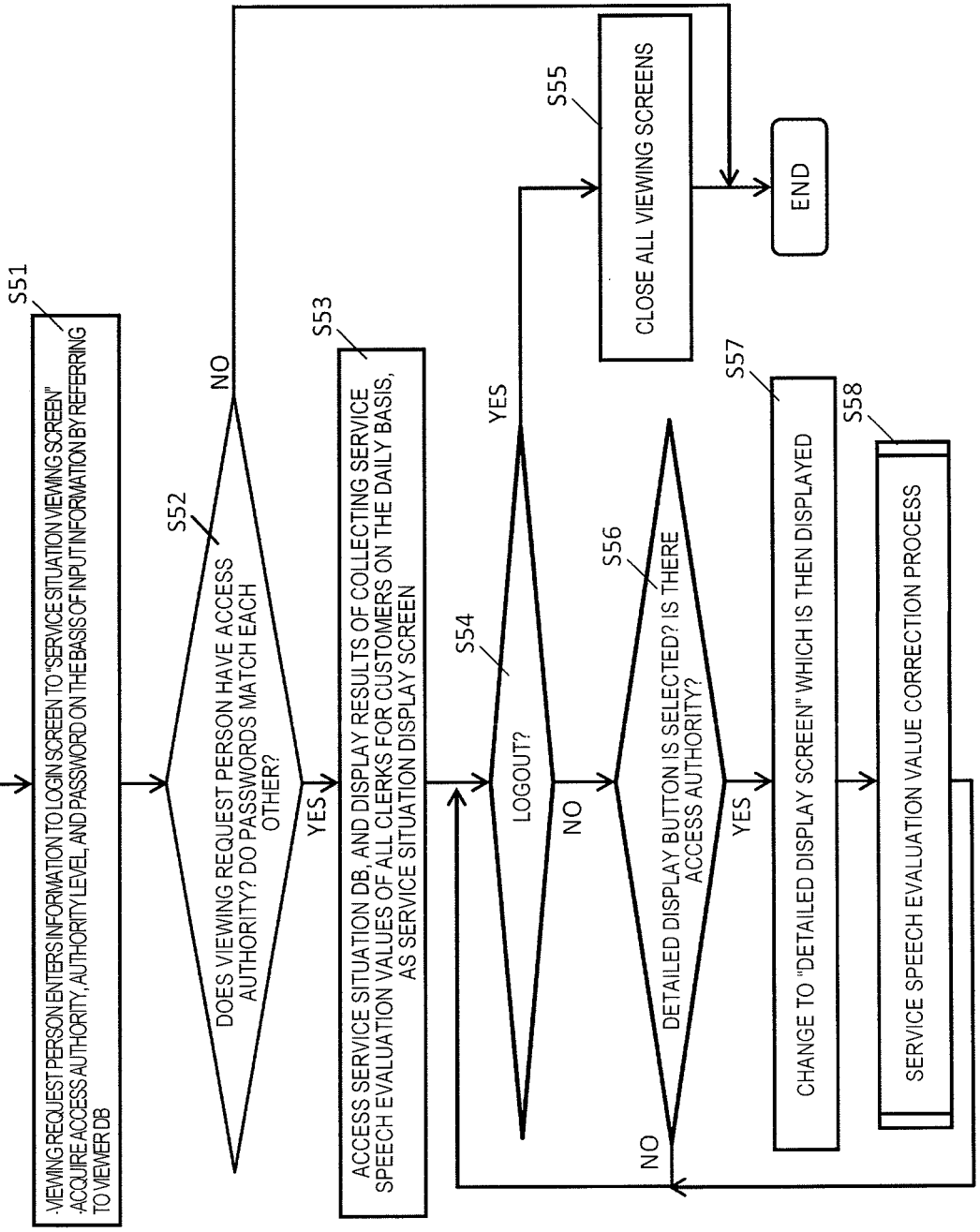

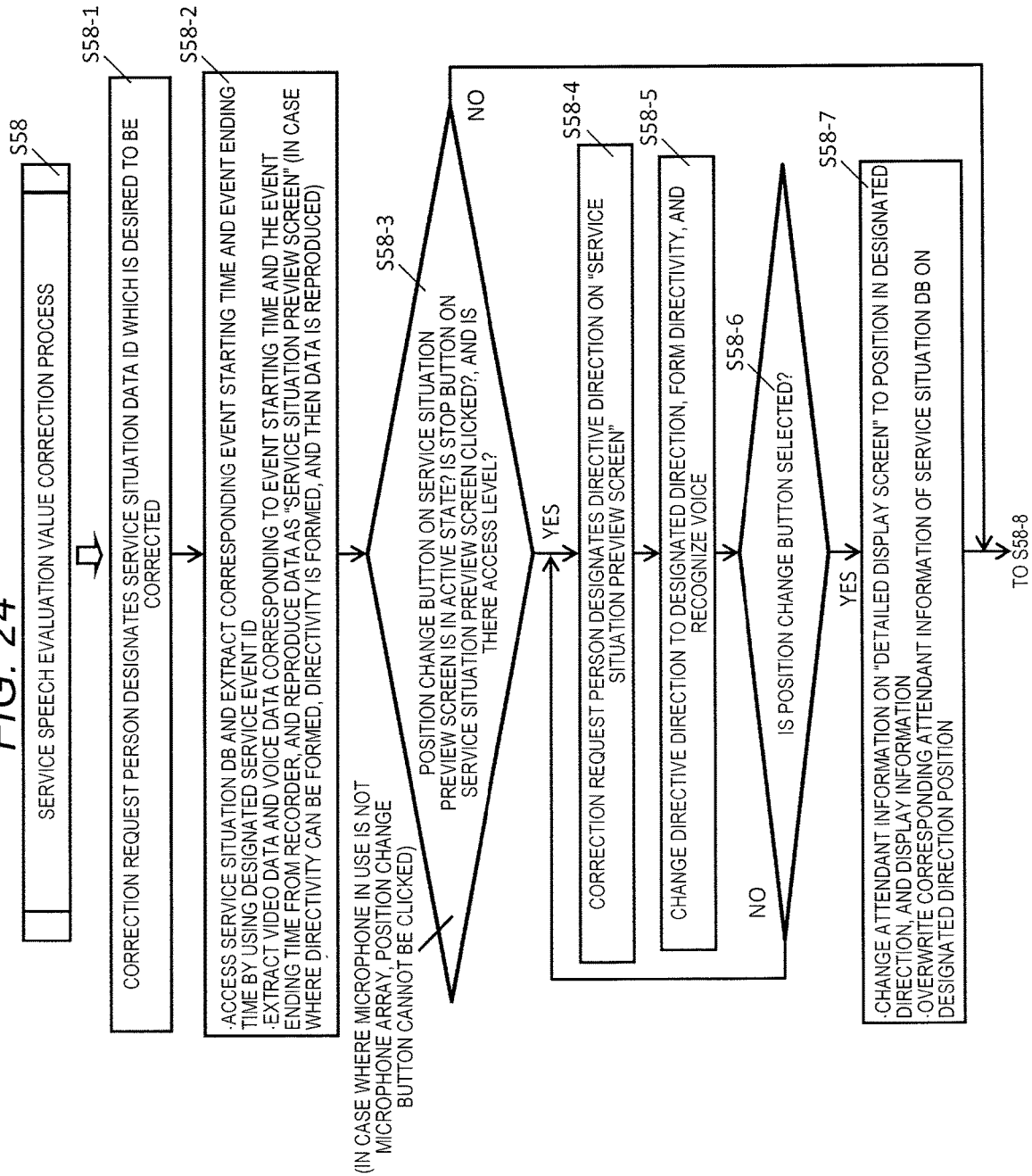

FIG. 26A

| VIEWER ID | PASSWORD | ACCESS AUTHORITY | AUTHORITY LEVEL |
|---|---|---|---|
| 1 | xxxx | VIEWING AND CORRECTION | L1 |
| 2 | xxxx | VIEWING | L2 |

FIG. 26B

| ATTENDANT ID | STORE ID | NAME |
|---|---|---|
| 1 | 1 | ○○ |
| 2 | 2 | ×× |
| 3 | 2 | △△ |

FIG. 30B

| 2014/8/22 | A | A MONTH<br>B | A WEEK<br>C | TODAY<br>D |
|---|---|---|---|---|
| GREETING PROPORTION | 40% | 50% | 60% | 30% |
| AVERAGE SCORE | 70 POINTS | 75 POINTS | 78 POINTS | 60 POINTS |
| NUMBER OF REGISTER RECEPTIONS | 15 PEOPLE | 17 PEOPLE | 13 PEOPLE | 18 PEOPLE |

| 2014/8/22 | AA STORE | A MONTH<br>BB STORE | A WEEK<br>CC STORE | TODAY<br>DD STORE |
|---|---|---|---|---|
| NUMBER OF VISITORS | 96 PEOPLE | 120 PEOPLE | 101 PEOPLE | 88 PEOPLE |
| GREETING PROPORTION | 55% | 56% | 52% | 60% |
| AVERAGE SCORE | 71 POINTS | 72 POINTS | 73 POINTS | 74 POINTS |
| NUMBER OF REGISTER RECEPTIONS | 75 PEOPLE | 87 PEOPLE | 83 PEOPLE | 68 PEOPLE |

| SERVICE SITUATION DATA ID | SERVICE SPEECH EVALUATION VALUE | EVENT STARTING TIME | EVENT ENDING TIME | ATTENDANT ID | EVENT ID | ATTENDANT POSITION (PRESET) | | ATTENDANT POSITION (NOT PRESET) | |
|---|---|---|---|---|---|---|---|---|---|
| | | | | | | PRESET ID | | CAMERA ID | ANY COORDINATES |
| 1 | V11...V1n | 2014/08/18 12:00:00 | 2014/08/18 12:00:10 | 1 | 1 | Null | | C1 | 128,100 |
| 2 | V21...V2n | 2014/08/18 12:05:20 | 2014/08/18 12:05:30 | 2 | 2 | P1 | | Null | Null |
| 3 | V31...V3n | 2014/08/18 12:10:00 | 2014/08/18 12:10:10 | 1 | 1 | Null | | C1 | 128,100 |
| 4 | V41...V4n | 2014/08/18 12:15:33 | 2014/08/18 12:15:43 | 1 | 2 | Null | | C1 | 128,100 |
| 5 | V51...V5n | 2014/08/18 12:17:55 | 2014/08/18 12:18:05 | 1 | 1 | P1 | | Null | Null |
| 6 | V61...V6n | 2014/08/18 12:19:09 | 2014/08/18 12:19:19 | 2 | 2 | P1 | | Null | Null |
| 7 | V71...V7n | 2014/08/18 12:20:18 | 2014/08/18 12:20:28 | 2 | 1 | Null | | C1 | 128,100 |

| SERVICE SITUATION DATA ID | SERVICE SPEECH EVALUATION VALUE | EVENT STARTING TIME | EVENT ENDING TIME | ATTENDANT ID | EVENT ID | ATTENDANT POSITION (PRESET) | | ATTENDANT POSITION (NOT PRESET) | |
|---|---|---|---|---|---|---|---|---|---|
| | | | | | | PRESET ID | | CAMERA ID | ANY COORDINATES |
| 1 | V11...V1n | 2014/08/18 12:00:00 | 2014/08/18 12:00:10 | 1 | 1 | Null | | C1 | 128,100 |
| 2 | V21...V2n | 2014/08/18 12:05:20 | 2014/08/18 12:05:30 | 2 | 2 | P1 | | Null | Null |
| 3 | V31...V3n | 2014/08/18 12:10:00 | 2014/08/18 12:10:10 | 1 | 1 | Null | | C1 | 128,100 |
| 4 | V41...V4n | 2014/08/18 12:15:33 | 2014/08/18 12:15:43 | 1 | 1 | Null | | C1 | 128,100 |
| 5 | V51...V5n | 2014/08/18 12:17:55 | 2014/08/18 12:18:05 | 1 | 2 | P1 | | Null | Null |
| 6 | V61...V6n | 2014/08/18 12:19:09 | 2014/08/18 12:19:19 | 2 | 2 | P1 | | Null | Null |
| 7 | V71...V7n | 2014/08/18 12:20:18 | 2014/08/18 12:20:28 | 2 | 1 | Null | | C1 | 128,100 |

FIG. 34

| SERVICE SITUATION DATA ID | SERVICE SPEECH EVALUATION VALUE | EVENT STARTING TIME | EVENT ENDING TIME | ATTENDANT ID | EVENT ID | ATTENDANT POSITION (PRESET) PRESET ID | ATTENDANT POSITION (NOT PRESET) | |
|---|---|---|---|---|---|---|---|---|
| | | | | | | | CAMERA ID | ANY COORDINATES |
| 1 | V11...V1n | 2014/08/18 12:00:00 | 2014/08/18 12:00:10 | 1 | 1 | Null | C1 | 128,100 |
| 2 | V21 V2n | 2014/08/18 12:05:20 | 2014/08/18 12:05:30 | 2 | 2 | P1 | Null | Null |
| 3 | V81...V8n FG | 2014/08/18 12:10:00 | 2014/08/18 12:10:10 | 1 | 1 | Null | C1 | 128,100 |
| 4 | V41...V4n | 2014/08/18 12:15:33 | 2014/08/18 12:15:43 | 1 | 1 | Null | C1 | 128,100 |
| 5 | V51...V5n | 2014/08/18 12:17:55 | 2014/08/18 12:18:05 | 1 | 2 | P1 | Null | Null |
| 6 | V61...V6n | 2014/08/18 12:19:09 | 2014/08/18 12:19:19 | 2 | 2 | P1 | Null | Null |
| 7 | V71...V7n | 2014/08/18 12:20:18 | 2014/08/18 12:20:28 | 2 | 1 | Null | C1 | 128,100 |

| SERVICE SITUATION DATA ID | SERVICE SPEECH EVALUATION VALUE | EVENT STARTING TIME | EVENT ENDING TIME | ATTENDANT ID | EVENT ID | ATTENDANT POSITION (PRESET) | | ATTENDANT POSITION (NOT PRESET) | |
|---|---|---|---|---|---|---|---|---|---|
| | | | | | | PRESET ID | | CAMERA ID | ANY COORDINATES |
| 1 | V11...V1n | 2014/08/18 12:00:00 | 2014/08/18 12:00:10 | 1 | 1 | Null | | C1 | 128,100 |
| 2 | V21...V2n | 2014/08/18 12:05:20 | 2014/08/18 12:05:30 | 2 | 2 | P1 | | Null | Null |
| 3 | V31...V3n | 2014/08/18 12:10:00 | 2014/08/18 12:10:10 | 1 | 1 | Null | | C1 | 128,100 |
| 4 | V41...V4n | 2014/08/18 12:15:33 | 2014/08/18 12:15:43 | 1 | 1 | Null | | C1 | 152,256 |
| 5 | V51...V5n | 2014/08/18 12:17:55 | 2014/08/18 12:18:05 | 1 | 2 | P1 | | Null | Null |
| 6 | V61...V6n | 2014/08/18 12:19:09 | 2014/08/18 12:19:19 | 2 | 2 | P1 | | Null | Null |
| 7 | V71...V7n | 2014/08/18 12:20:18 | 2014/08/18 12:20:28 | 2 | 1 | Null | | C1 | 128,100 |

|  | ATTENDANT MICROPHONE | MICROPHONE | MICROPHONE ARRAY |
|---|---|---|---|
| SERVICE USE | ABSENCE OF PRIVACY PROTECTION MARK | ABSENCE OF PRIVACY PROTECTION MARK | ABSENCE OF PRIVACY PROTECTION MARK |
| SURVEILLANCE USE | - - - - | PRESENCE OF PRIVACY PROTECTION MARK | PRESENCE OF PRIVACY PROTECTION MARK |

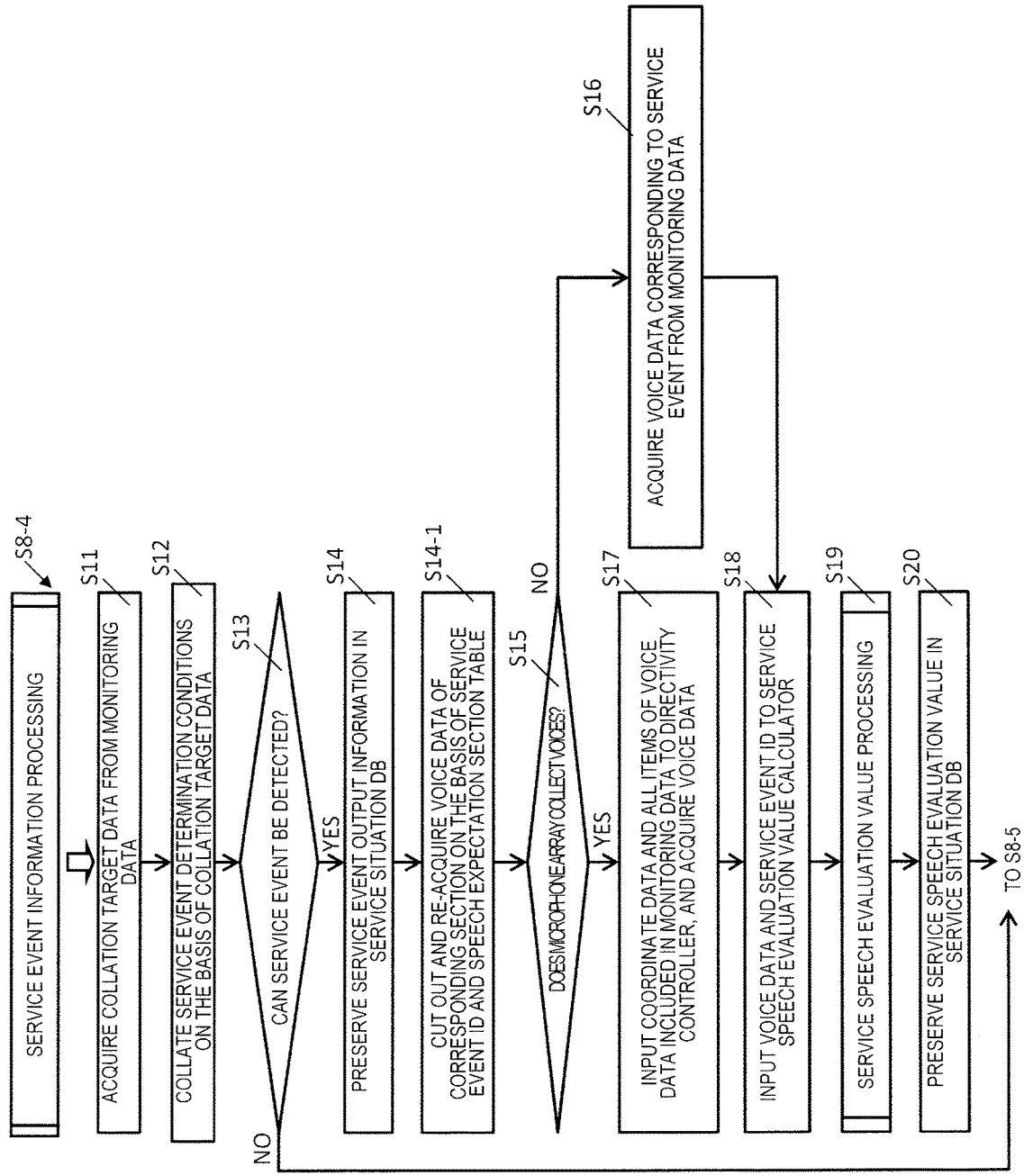

FIG. 41

| SERVICE EVENT ID | SERVICE EVENT NAME | SPEECH EXPECTATION SECTION |
|---|---|---|
| EID1 | ACCOUNTING COMPLETION GREETING | FOR 10 SECONDS AFTER OCCURRENCE OF SERVICE EVENT |
| EID2 | ACCOUNTING START GREETING | FOR 5 SECOND BEFORE OCCURRENCE OF SERVICE EVENT |
| EID3 | VISITING GREETING | FOR 10 SECONDS AFTER OCCURRENCE OF SERVICE EVENT |
| EID4 | LEAVING GREETING | FOR 10 SECONDS BEFORE OCCURRENCE OF SERVICE EVENT |
| ... | ... | ... |

US 10,706,448 B2

SERVICE MONITORING SYSTEM AND SERVICE MONITORING METHOD

TECHNICAL FIELD

The present disclosure relates to a service monitoring system and a service monitoring method, capable of monitoring a situation during service by using a voice of an employee.

BACKGROUND ART

In the related art, it is known that a customer satisfaction level greatly influences sales results in a variety of customer services, and thus it is necessary for a person in charge of a store (store manager) to quantitatively measure a customer satisfaction level.

As an example of a method of measuring a customer satisfaction level, there is a method called a mystery shopping performed by a researcher. In an on-sight research performed by a researcher, there is a possibility that research results may differ depending on differences in an environment in which the on-site research visit is performed, and thus improvement advice given on the basis of research results may not be appropriate or accurate. Differences in a research environment refer to, for example, a difference in complexity or the number of clerks (employees) in a research target store for each period of time for which the research is performed, or a difference in skill of a researcher regarding a research technique or skill of a clerk regarding a service technique (for example, a difference in the number of years the clerk has worked) who undergoes the on-site research.

Therefore, PTL 1 discloses a service evaluation diagnosis system which corrects an influence on research results based on differences in environments where an on-site research is performed, and provides advice information according to reality based on the corrected research results. In PTL 1, results of the store research (for example, an on-site research) are input by a researcher who operates a portable information terminal.

As an example of another technique for measuring customer satisfaction level, there is a service data recording device which recognizes feelings of a clerk and a customer on the basis of voices of the clerk and the customer included in conversation between the clerk and the customer, and calculates a clerk satisfaction level data and a customer satisfaction level data on the basis of the recognition result (for example, refer to PTL 2).

The service data recording device disclosed in PTL 2 records service data in which clerk satisfaction level data, customer satisfaction level data, and sales results of clerks for customers are correlated with each other, in a database. In PTL 2, it is not necessary for a researcher operating a portable information terminal to perform an input operation unlike in PTL 1.

An object of the present disclosure is to provide a service monitoring system and a service monitoring method, capable of widely protecting privacy of a customer without using human resources such as a researcher, and accurately and objectively evaluating a service situation by monitoring the speech content of a corresponding attendant in various service events for customers in a store.

CITATION LIST

Patent Literature

PTL 1: Japanese Patent No. 5336675
PTL 2: Japanese Patent No. 5533219

SUMMARY OF THE INVENTION

According to the present disclosure, there is provided a service monitoring system including a voice collector that collects a voice of an employee in a predetermined voice collection region; a first storage unit that stores service event data including determination conditions for each predetermined service event; a second storage unit that stores terminal operation history data indicating an operation history of an employee on a predetermined business terminal and voice data of the employee collected by the voice collector in correlation with each other; a detector that detects the service event of the employee on the basis of the service event data stored in the first storage unit and the terminal operation history data stored in the second storage unit; a calculator that calculates a service speech evaluation value corresponding to a predetermined speech keyword during an operation on the business terminal on the basis of the voice data of the employee stored in the second storage unit in the service event detected by the detector; and an output that stores the service speech evaluation value calculated by the calculator in correlation with identification information of the employee, and voice data of the employee specified by a service position and a service time point of the employee.

According to the present disclosure, there is provided a service monitoring method for a service monitoring system including a voice collector that collects a voice of an employee in a predetermined voice collection region, the method including storing service event data including determination conditions for each predetermined service event in a first storage unit; storing terminal operation history data indicating an operation history of an employee on a predetermined business terminal and voice data of the employee collected by the voice collector in correlation with each other in a second storage unit; detecting the service event of the employee on the basis of the service event data stored in the first storage unit and the terminal operation history data stored in the second storage unit; calculating a service speech evaluation value corresponding to a predetermined speech keyword during an operation on the business terminal on the basis of the voice data of the employee stored in the second storage unit in the detected service event; and storing the calculated service speech evaluation value in correlation with identification information of the employee, and voice data of the employee specified by a service position and a service time point of the employee.

BRIEF DESCRIPTION OF DRAWINGS

FIG. 10 is a diagram illustrating an example of a service situation DB.

FIG. 11 is a diagram illustrating an example of a service event information DB corresponding to the service monitoring system illustrated in FIG. 2.

FIG. 12 is a diagram illustrating an example of a service event information DB corresponding to the service monitoring system illustrated in FIG. 3.

FIG. 13 is a diagram illustrating an example of a service event information DB corresponding to the service monitoring system illustrated in FIG. 4.

FIG. 14 is a diagram illustrating an example of a service event information DB corresponding to the service monitoring system illustrated in FIG. 5.

FIG. 20 is a diagram illustrating a specific example of the speech length determination process using model voice data.

FIG. 22A is a diagram illustrating an example of a speech expectation keyword table forming a part of the service speech evaluation DB.

FIG. 22B is a diagram illustrating an example of a service speech model list forming a part of the service speech evaluation DB.

FIG. 23 is a flowchart illustrating an example of operation procedures of a viewing process or a service speech evaluation value correction process performed by a restricted viewer.

FIG. 24 is a flowchart illustrating an example of detailed operation procedures of the service speech evaluation value correction process.

FIG. 26A is a diagram illustrating an example of a viewer DB.

FIG. 26B is a diagram illustrating an example of an attendant DB.

FIG. 30B is a diagram illustrating an example of results of collecting service speech evaluation values of each attendant for a day.

FIG. 31 is a diagram illustrating an example of results of collecting service speech evaluation values of each store for a day.

FIG. 32 is a diagram illustrating a specific example of each record displayed on a detailed display screen of the service situation DB.

FIG. 33 is a diagram illustrating an example of an operation of correcting a service speech evaluation value in a specific record displayed on the detailed display screen of the service situation DB.

FIG. 34 is a diagram illustrating an example of a service speech evaluation value after the specific record displayed on the detailed display screen of the service situation DB is corrected.

FIG. 36 is a diagram illustrating an example of coordinates of a service position after the specific record displayed on the detailed display screen of the service situation DB is corrected.

FIG. 37 is a diagram illustrating an example of a relationship among an attendant's microphone, a microphone, a microphone array, and a privacy protection mark.

FIG. 40 is a flowchart illustrating separate an example of detailed operation procedures of the service event information processing.

FIG. 41 is a diagram illustrating an example of a speech expectation section table for each service event forming a part of the service speech evaluation DB.

DESCRIPTION OF EMBODIMENT

Hereinafter, with reference to the drawings, a description will be made of an embodiment (hereinafter, referred to as the "present embodiment") in which a service monitoring system and a service monitoring method according to the present disclosure are disclosed in detail. The service monitoring system of the present embodiment is provided in a store (for example, a retail, a wholesale store, a department store, a convenience store, a supermarket, a restaurant, or a bank) performing a customer service, monitors a service situation of a clerk (employee) of the store for customers, and objectively evaluates a service attitude (hospitality) of the clerk performing various service events (for example, greetings to customers visiting and leaving the store, and accounting start greetings which will be described later in detail) in the store. In the following description, in the service monitoring system, a quantitative index (value) as a result of objectively evaluating a service attitude (service situation) of a clerk for customers will be referred to as a "service speech evaluation value". In the present embodiment, a description will be made of evaluation of a service situation of clerk for customers, but the service monitoring system and the service monitoring method of the present disclosure are applicable to evaluation of service situations of employees (for example, bank clerks or staff members) other than clerks for customers.

The present disclosure may be expressed as each apparatus (for example, a service evaluation apparatus which will be described later) forming the service monitoring system, a method including respective operations performed by each apparatus (for example, the service evaluation apparatus) forming a directivity control system, or a program causing the service evaluation apparatus which is a computer to execute the method.

(Outline of Service Monitoring System)

Figure 1:
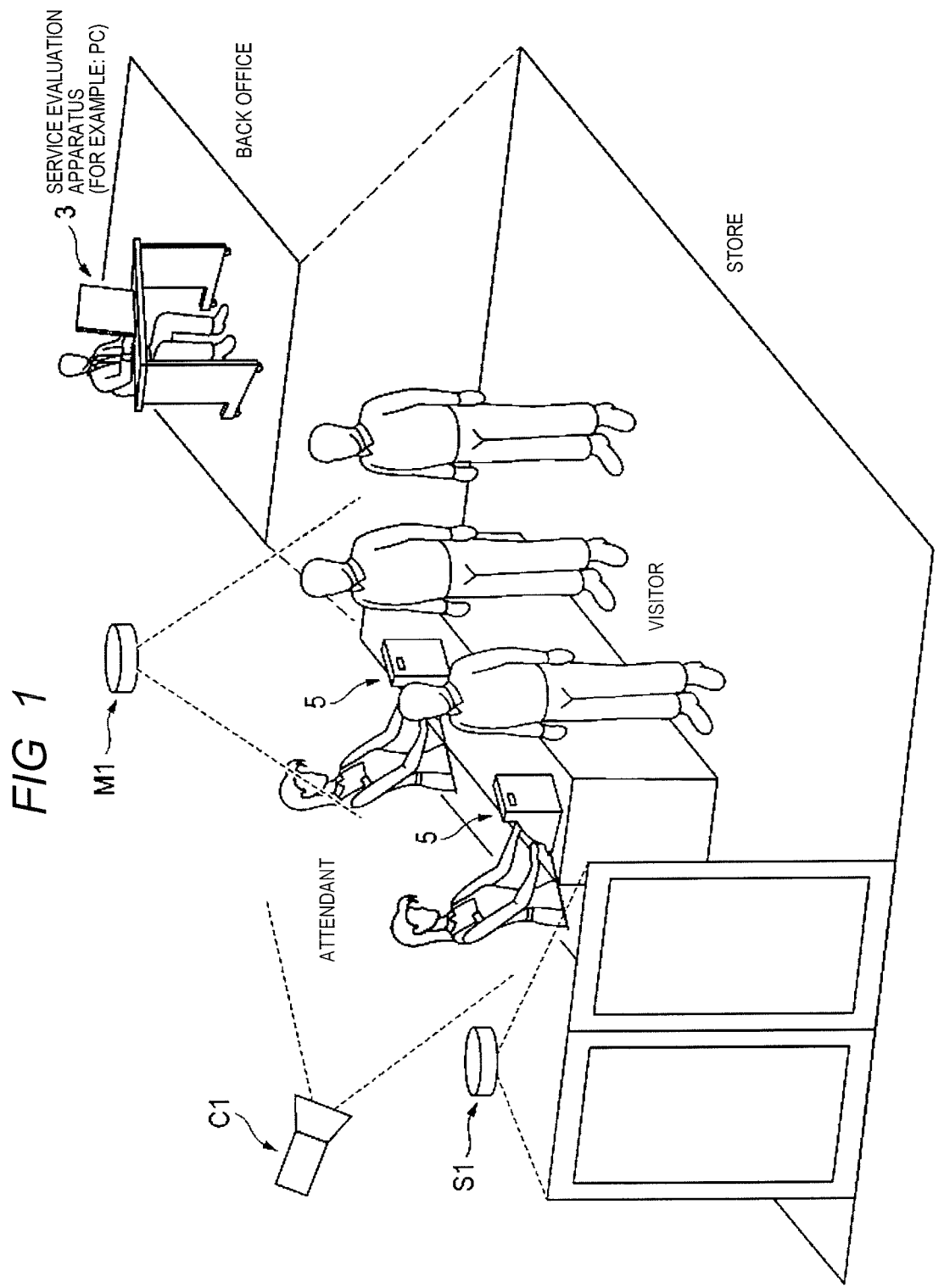
FIG. 1 is a diagram illustrating an example of an image of a store in which a service monitoring system of the present embodiment is provided.

FIG. 1 is a diagram illustrating an example of an image of a store in which service monitoring system 100 of the present embodiment is provided. In FIG. 1, for example, in the store, two employees serve a plurality of customers while operating POS terminals 5 at register counters where two POS terminals 5 are installed. In the store, at least one microphone M1 is provided to collect voices around the register counters which are voice collecting regions, at least one camera C1 is provided to perform imaging and to cause the register counters to be included in an angle of view thereof, and sensor device S1 detecting visiting and leaving of customers to and from the store is provided around the entrance of the store. In service monitoring system 100, service evaluation apparatus 3 (for example, personal computer (PC)) which calculates a service speech evaluation value by monitoring a service situation of an employee (clerk) is provided in a back office (for example, a monitoring room) of the store, and is operated by, for example, a person in charge of the store (for example, a store manager).

Service monitoring system 100 detects a service event performed by the clerk on the basis of, for example, service event data including data (hereinafter, referred to as "POS operation history data") indicating an operation history of the clerk operating POS terminal 5, and service event determination conditions for detecting the presence or absence of a service event for each of various service events described later. The POS operation history data includes, for example, an attendant ID (identification information of a clerk) of an attendant (clerk), attendant ID input operation history of inputting the attendant ID to POS terminal 5, history of inputting age of a visitor (customer), and accounting completion operation history.

In a case where a service event is detected, service monitoring system 100 calculates a service speech evaluation value (in other words, a service speech evaluation value for a clerk speaking a speech expectation keyword) corresponding to a predetermined speech expectation keyword (speech keyword) when POS terminal 5 is operated, on the basis of data obtained from microphone M1, camera C1, sensor device S1, or a combination thereof. Service monitoring system 100 stores the calculated service speech evaluation value in correlation with voice data of the clerk specified by identification information of the clerk, a service position of the clerk, and a service time point. The "voice data of the clerk (employee)" mentioned here is data recording a voice which is spoken by the clerk at a position of the clerk and are collected by microphone M1, attendant microphone SM1, or microphone array AM1.

(Configuration Examples of Service Monitoring System)

Figure 2:
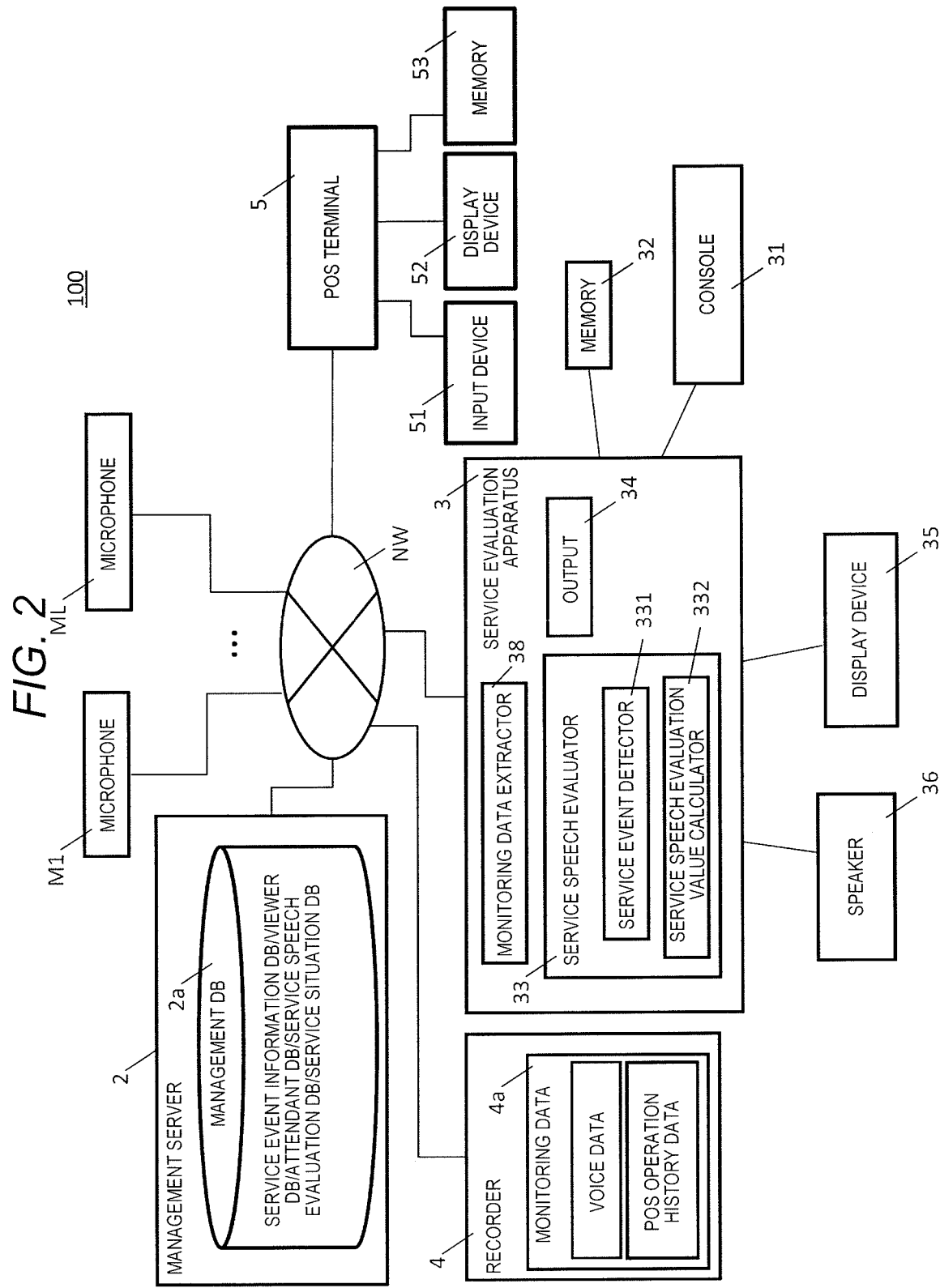
FIG. 2 is a block diagram illustrating a first system configuration example of the service monitoring system of the present embodiment.
Figure 3:
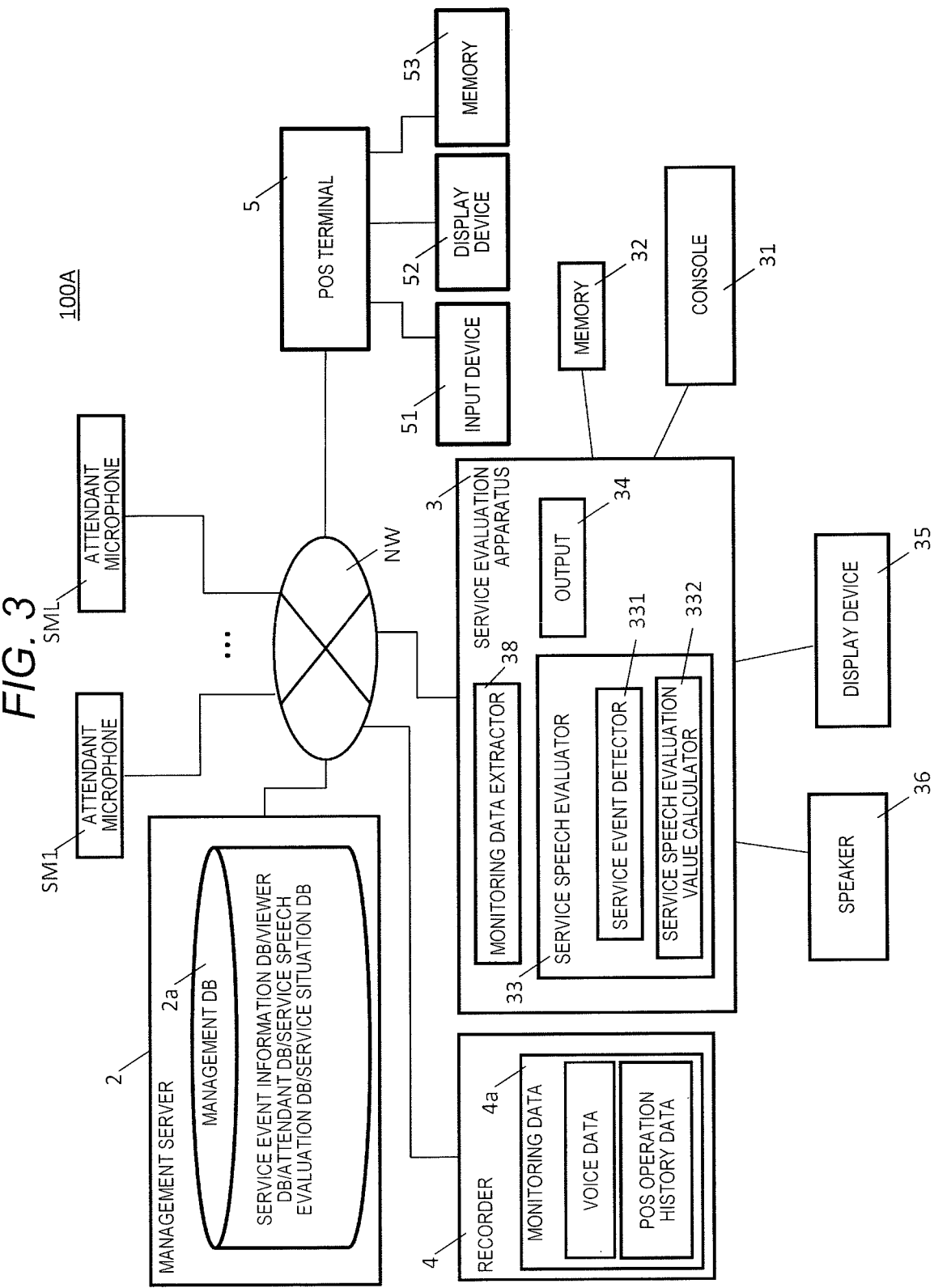
FIG. 3 is a block diagram illustrating a second system configuration example of the service monitoring system of the present embodiment.
Figure 4:
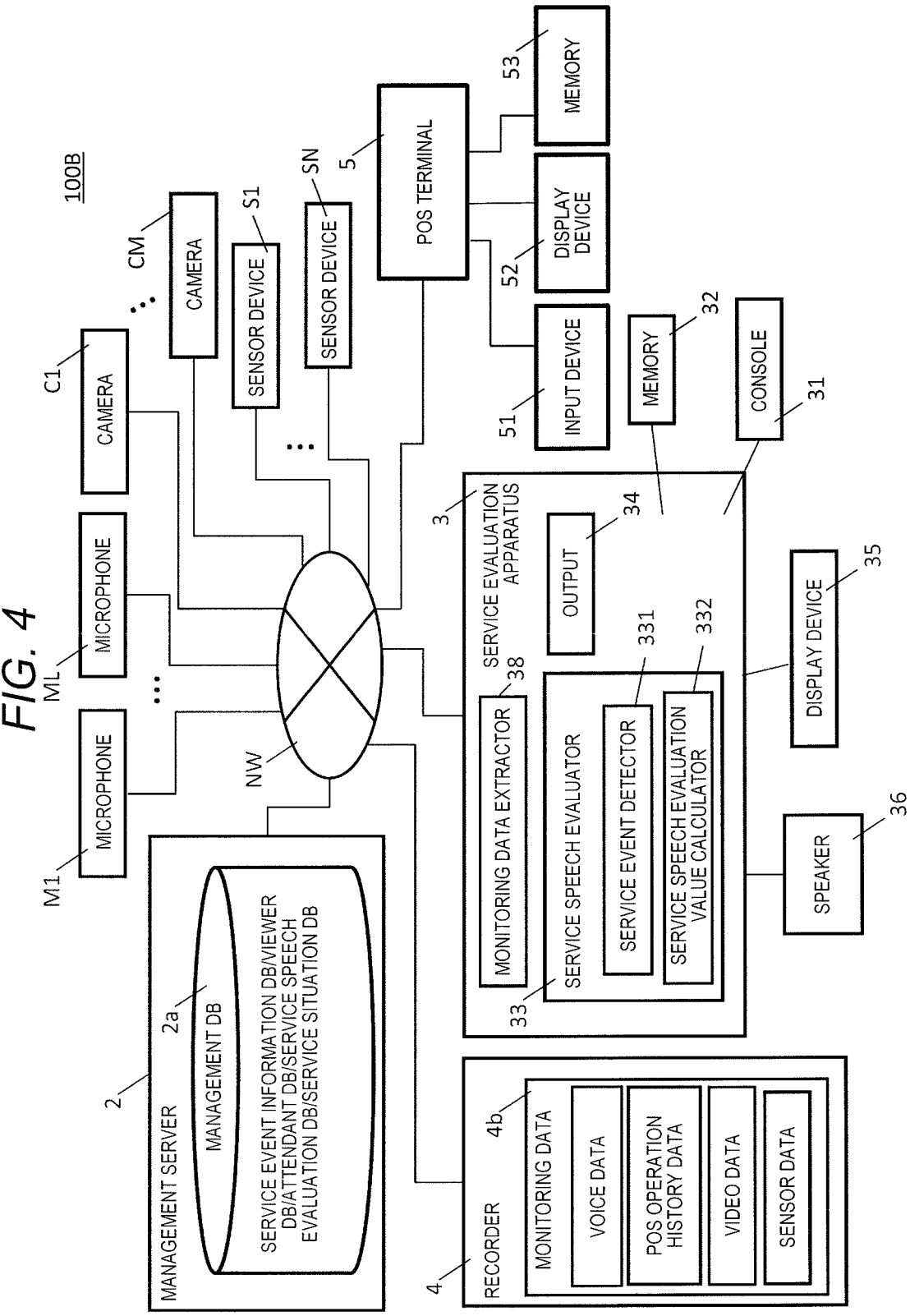
FIG. 4 is a block diagram illustrating a third system configuration example of the service monitoring system of the present embodiment.
Figure 5:
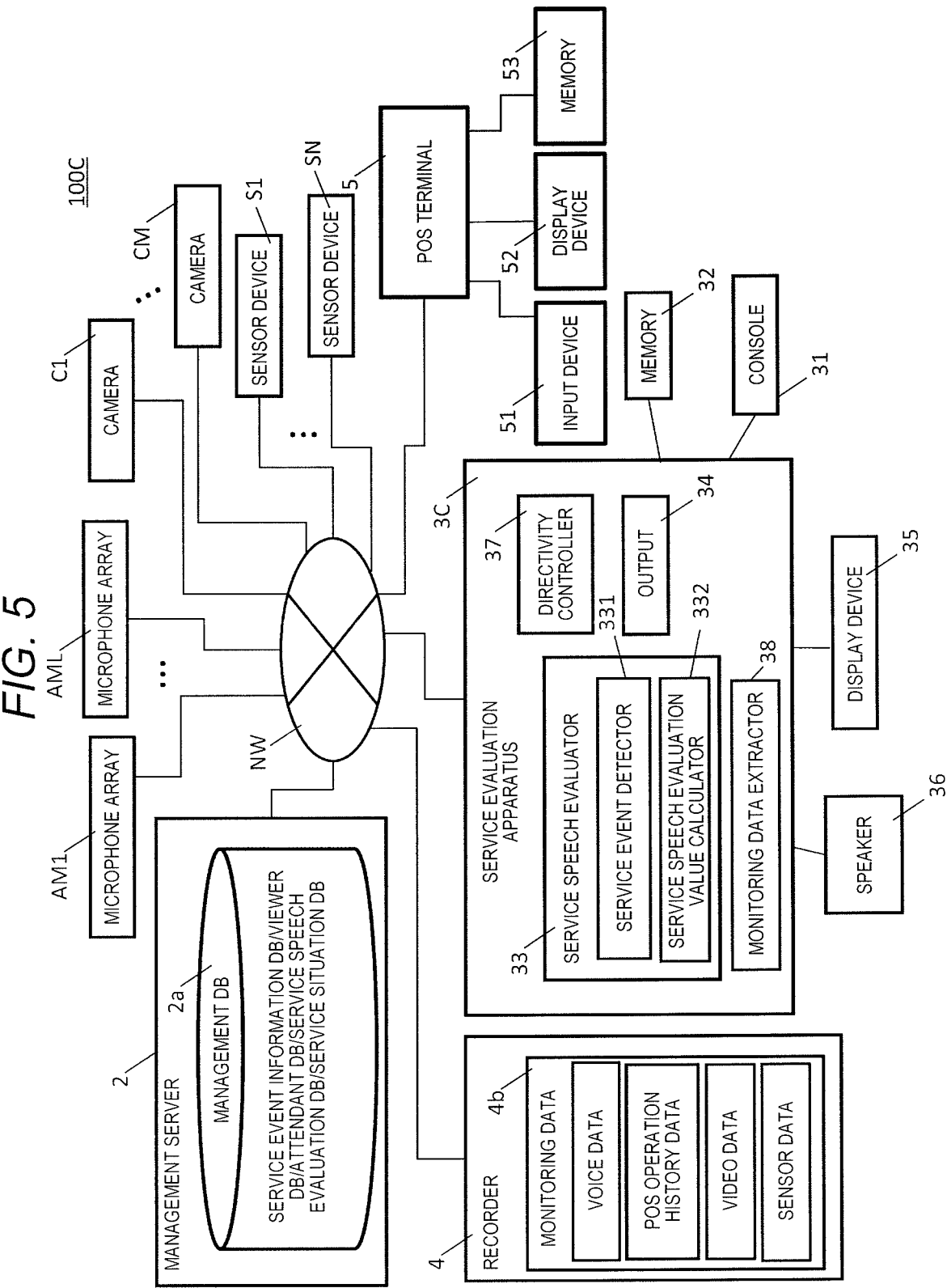
FIG. 5 is a block diagram illustrating a fourth system configuration example of the service monitoring system of the present embodiment.

Next, a description will be made of system configuration examples of the service monitoring system of the present embodiment with reference to FIGS. 2 to 5. FIG. 2 is a block diagram illustrating a first system configuration example of service monitoring system 100 of the present embodiment. FIG. 3 is a block diagram illustrating a second system configuration example of service monitoring system 100A of the present embodiment. FIG. 4 is a block diagram illustrating a third system configuration example of service monitoring system 100B of the present embodiment. FIG. 5 is a block diagram illustrating a fourth system configuration example of service monitoring system 100C of the present embodiment. In description of FIGS. 2 to 5, service monitoring system 100 illustrated in FIG. 2 will be described in detail, configurations of service monitoring systems 100A, 100B and 100C respectively illustrated in FIGS. 3, 4 and 5 will be described focusing on differences from service monitoring system 100 illustrated in FIG. 2, the same constituent elements are given the same reference numerals, and description thereof will be made briefly or omitted.

Service monitoring system 100 illustrated in FIG. 2 is configured to include at least one or more microphones M1, . . . , and ML (where L is an integer of 1 or more; the same applies hereinafter), management server 2, service evaluation apparatus 3, recorder 4, and POS terminal 5. In service monitoring system 100 illustrated in FIG. 2, one or more microphones M1, . . . , and ML, management server 2, service evaluation apparatus 3, recorder 4, and POS terminal 5 are connected to each other via network NW. Network NW may be a wired network (for example, an intranet or the Internet), and may be a wireless network (for example, a wireless local area network (LAN)).

One or more microphones M1, . . . , and ML as an example of a voice collector are provided on a predetermined installation surface (for example, a ceiling surface) of a predetermined voice collection region (for example, a register counter of the store), collect a voice of a clerk in the voice collection region, and transmits voice data of the clerk obtained through voice collecting, to recorder 4. The directivity of microphones M1, . . . , and ML includes non-directivity, and cannot be changed due to having already been determined depending on the design specification when manufactured. Microphones M1, . . . , and ML may collect not only a voice of an employee (clerk) but also leaking sounds spoken by a customer when the customer has conversation with the employee (clerk), for example.

Microphones M1, . . . , and ML may be provided for service use for evaluating a service situation of a clerk for a customer, and may be provided for surveillance use, such as crime prevention in the store (refer to FIG. 37). The microphones for surveillance use are provided at a location which is hardly visible in the store, a location far away from the register counter in the store, or the like.

FIG. 37 is a diagram illustrating an example of a relationship among attendant microphones SM1, . . . , and SML, microphones M1, . . . , and ML, microphone arrays AM1, . . . , and AML, and a privacy protection mark. The privacy protection mark is an example of predetermined information indicating customer privacy protection, and is information indicating in advance that, in order to protect privacy of a customer, voice data is not used to evaluate a customer service of a clerk in a case where there is a possibility that a voice of a customer may be collected to be mixed with the voice data of a clerk.

In other words, as illustrated in FIG. 37, a microphone provided for service use holds information indicating that the microphone is provided for service use in advance, and a microphone provided for surveillance use holds information indicating that the microphone is provided for surveillance use in advance. A privacy protection mark is added to voice data of a clerk obtained by the microphone provided for surveillance use collecting sounds, through processing in the microphone. However, a privacy protection mark is not added to voice data of a clerk obtained by the microphone provided for service use collecting sounds.

Management server 2 as a first storage unit stores (preserves), as management database (DB) 2a, various items of data which are required to calculate a service speech evaluation value of a clerk for each service event in service evaluation apparatus 3, or to view (further, correct as necessary) the calculated service speech evaluation value at a clerk for each service event in service evaluation apparatus 3. Management server 2 stores service speech evaluation values of a clerk for each service event calculated in service evaluation apparatus 3, in management DB 2a.

Management DB 2a is configured to include a service event information DB, a viewer DB, an attendant DB, service speech evaluation DB, and a service situation DB. Details of each of the DBs will be described later. Management server 2 may not be provided in the store in which service monitoring system 100 is installed, and may be, for example, an online storage unit (for example, a storage unit used for a cloud service) connected via the network NW.

Service evaluation apparatus 3 detects various service event in a predetermined voice collection region (for example, in the store), and calculates a service speech evaluation value corresponding to a predetermined speech expectation keyword of a clerk in a service event on the basis of voice data of the clerk in the detected service event. Service evaluation apparatus 3 is formed by using a data communication apparatus such as a PC (also including a laptop computer or a desktop computer), a smart phone, a tablet terminal, a mobile phone, or a personal digital assistant (PDA), and is configured to include console 31, memory 32, service speech evaluator 33, output 34, display device 35, speaker 36, and monitoring data extractor 38.

Console 31 is a user interface (UI) for notifying service speech evaluator 33 or output 34 of the content of an operation performed by a user (for example, a manager of store), and is, for example, a pointing device such as a mouse or a keyboard. Console 31 may be formed by using, for example, a touch panel or a touch pad which is disposed to correspond to a screen of display device 35 and is operable with finger FG of the user or a stylus pen.

Memory 32 is formed by using, for example, a random access memory (RAM), functions as a work memory when each constituent element of service evaluation apparatus 3 operates, and stores data required in an operation of each constituent element of service evaluation apparatus 3.

Service speech evaluator 33 is formed by using, for example, a central processing unit (CPU), a microprocessing unit (MPU), or a digital signal processor (DSP), and is configured to include service event detector 331 and service speech evaluation value calculator 332.

Service event detector 331 as an example of a detector detects a service event of a clerk on the basis of the service event information DB (service event data which will be described later) of management DB 2a of management server 2, and POS operation history data (terminal operation history data) indicating an operation history of a clerk on POS terminal 5 as an example of a predetermined business terminal. Details of a method of detecting a service event will be described later.

Service speech evaluation value calculator 332 as an example of a calculator calculates a service speech evaluation value corresponding to a predetermined speech expectation keyword when POS terminal 5 is operated, on the basis of voice data of a clerk stored in recorder 4, in the service event detected by service event detector 331. Details of a method of calculating a service speech evaluation value will be described later.

Output 34 is formed by using, for example, a CPU, an MPU, or a DSP, and stores a service speech evaluation value calculated by service speech evaluation value calculator 332 in memory 32 or management DB 2a of management server 2 in correlation with the voice data of a clerk specified by identification information of a clerk (for example, a barcode indicating identification information of the clerk, printed on a name card worn by the clerk), a service position (for example, coordinate information) of the clerk, and a service time point.

Output 34 has a function (wired communication function and wireless communication function) of communicating with each device of service monitoring system 100 via network NW, and controls an operation of display device 35 or speaker 36 so as to display various screens regarding service monitoring system 100 on display device 35 or to receive voice packets transmitted from microphones M1, . . . , and ML and to output the voice packets from microphones M1, . . . , and ML from speaker 36, according to the user's predetermined input operation.

Display device 35 as an example of a display is formed by using, for example, a liquid crystal display (LCD) or an organic electroluminescence (EL) device, and displays, for example, various screens (which will be described later) regarding service monitoring system 100 under the control of output 34 in response to the user's input operation.

Speaker 36 as an example of a voice output outputs voice data included in voice packets transmitted from microphones M1, . . . , and ML. Display device 35 and speaker 36 may be integrally formed with service evaluation apparatus 3, and may be separate devices.

Monitoring data extractor 38 as an example of a voice data extractor cuts out and extracts monitoring data 4ak (where k is an integer of 1 or greater; refer to FIG. 38, for example) at each predetermined time interval (for example, about 10 to 20 seconds) which is required to calculate a service speech evaluation value at a clerk in service speech evaluation value calculator 332 of service speech evaluator 33 from monitoring data 4a stored in recorder 4. Details of a monitoring data extraction process in monitoring data extractor 38 will be described later with reference to FIGS. 38 to 41.

Recorder 4 as an example of a second storage unit stores, for example, voice data of a clerk spoken during a service event and POS operation history data indicating operation history on POS terminal 5 in correlation with each other as monitoring data 4a. The voice data of a clerk is voice data which is collected by one or more microphones M1, . . . , and ML and is transmitted to recorder 4. The POS operation history data is data which is acquired by, for example, POS terminal 5, and is further acquired by management server 2 or service evaluation apparatus 3 from POS terminal 5 so as to be transmitted to recorder 4.

POS terminal 5 as an example of a business terminal is provided at the register counter of the store, and is configured to include input device 51, display device 52, and memory 53. POS terminal 5 stores, for example, sales information of the store or information regarding a price of each product in memory 53. FIGS. 2 to 5 illustrate single POS terminal 5, but a plurality of POS terminals 5 may be connected to each other via network NW.

In the same manner as console 31, input device 51 is a user interface (UI) for receiving an input operation from a user (for example, a clerk) and notifying POS terminal 5 thereof, and is, for example, a pointing device such as a mouse or a keyboard. Input device 51 may be formed by using, for example, a touch panel or a touch pad which is disposed to correspond to a screen of display device 52 and is operable with finger FG of the user or a stylus pen.

Display device 52 is formed by using a liquid crystal display (LCD) or an organic electroluminescence (EL) device in the same manner as display device 35, and displays information regarding sales of the store, and information regarding a price of each product or payment of a product on a screen in response to the user's input operation.

In the same manner as memory 32, memory 53 is formed by using a random access memory (RAM), functions as a work memory when each constituent element of POS terminal 5 operates, and stores data required in an operation of each constituent element of POS terminal 5.

Service monitoring system 100A illustrated in FIG. 3 has a configuration in which one or more microphones M1, . . . , and ML of service monitoring system 100 illustrated in FIG. 2 are replaced with one or more attendant microphones SM1, . . . , and SML, and other configurations are the same as those of service monitoring system 100 illustrated in FIG. 2. The directivity of attendant microphones SM1, . . . , and SML cannot be changed due to having already been determined depending on the design specification when manufactured.

One or more attendant microphones SM1, . . . , and SML as an example of a voice collector are formed by using, for example, pin microphones, collect voices of corresponding clerks by being attached to respective clerks in the store, and transmit voice data of the clerks obtained through voice collecting to recorder 4. Attendant microphones SM1, . . . , and SML may collect not only a voice of an employee (clerk) but also leaking sounds spoken by a customer when the customer has conversation with the employee (clerk), for example.

An attendant microphone is often provided for service use, and thus attendant microphones SM1, . . . , and SML of the present embodiment hold information indicating that the microphones are provided for service use in advance. Thus, as illustrated in FIG. 37, a privacy protection mark is not added to voice data of a clerk obtained through voice collecting in attendant microphones SM1, . . . , and SML.

In service monitoring system 100A illustrated in FIG. 3, monitoring data 4a stored in recorder 4 includes POS operation history data of each clerk and voice data of a clerk collected by an attendant microphone (for example, attendant microphone SM1) in the same manner as in service monitoring system 100 illustrated in FIG. 2.

Service monitoring system 100B illustrated in FIG. 4 has a configuration in which one or more cameras C1, . . . , and CM and one or more sensor devices S1, . . . , and SN are further provided in service monitoring system 100 illustrated in FIG. 2, and other configurations are the same as those of service monitoring system 100 illustrated in FIG. 2.

One or more cameras C1, . . . , and CM (where M is an integer of 1 or greater) as an example of an imaging device are provided to be fixed to, for example, a ceiling surface of the store, function as surveillance cameras or security cameras, and capture images within angles of view of respective cameras C1, . . . , and CM by using a zoom function (for example, a zoom-in process or a zoom-out process) or an optical axis movement function (panning or tilting) under the remote control from service evaluation apparatus 3 connected to network NW.

Installation positions or directions of respective cameras C1, . . . , and CM are registered in, for example, memory 32 of service evaluation apparatus 3 in advance, control information regarding panning, tilting, and zooming is transmitted to service evaluation apparatus 3 at all times, and a positional relationship between each image position forming a video and a directive direction are normally correlated with each other. In a case where each of cameras C1, . . . , and CM is an omnidirectional camera, video data (that is, omnidirectional video data) indicating an omnidirectional video of a voice collection region, or planar video data generated by performing a predetermined distortion correction process on the omnidirectional video data and performing panorama conversion is transmitted to service evaluation apparatus 3 via network NW. An angle of view and an optical axis of each of cameras C1, . . . , and CM may be fixed.

Output 34 displays video data transmitted from any one of cameras C1, . . . , and CM on display device 35 in response to, for example, the user's input operation.

One or more sensor devices S1, . . . , and SN as an example of a customer detector detect appearance or leaving of a customer at or from the store (in other words, visiting or leaving of a customer to or from the store), and transmit information regarding a detection result to recorder 4 as sensor data. Sensor devices S1, . . . , and SN may be provided in plurality according to the types or the number of service events which can be detected by service monitoring system 100.

In service monitoring system 100B illustrated in FIG. 4 and service monitoring system 100C illustrated in FIG. 5, the microphone collecting voices at a predefined position (preset position) in the store and the camera imaging the predefined position are correlated with each other in advance. Thus, a preset ID which is identification information of the preset position is correlated with a camera ID which is identification information of the camera imaging the preset position in advance.

Service monitoring system 100B illustrated in FIG. 4 has a configuration in which monitoring data 4b stored in recorder 4 further includes video data transmitted from at least one of cameras C1, . . . , and CM and sensor data transmitted from at least one of sensor devices S1, . . . , and SN during a service event performed by a clerk in addition to the POS operation history data and voice data of a clerk collected by the microphone (for example, microphone SM1) for each clerk in service monitoring system 100 illustrated in FIG. 2.

Service monitoring system 100C illustrated in FIG. 5 has a configuration in which one or more microphones M1, . . . , and ML in service monitoring system 100 illustrated in FIG. 2 are replaced with one or more microphone arrays AM1, . . . , and AML, directivity controller 37 is further provided in service evaluation apparatus 3C, and one or more cameras C1, . . . , and CM and one or more sensor devices S1, . . . , and SN are still further provided, and other configurations are the same as those of service monitoring system 100 illustrated in FIG. 2.

One or more microphone arrays AM1, . . . , and AML as an example of a voice collector are provided on a predetermined installation surface (for example, a ceiling surface) of a predetermined voice collection region (for example, a register counter of the store), and collect a voice of a clerk in the voice collection region. Each of one or more microphone arrays AM1, . . . , and AML includes, specifically, a plurality of microphones as an example of a voice collecting element, and collects a voice (for example, a voice of a clerk) from directions of 360° (all directions) centering on installation positions of microphone arrays AM1, . . . , and AML by using the plurality of microphones. Microphone arrays AM1, . . . , and AML may collect not only a voice of an employee (clerk) but also leaking sounds spoken by a customer when the customer has conversation with the employee (clerk), for example.

Microphone arrays AM1, . . . , and AML may be provided for service use for evaluating a service situation of a clerk for a customer, and may be provided for surveillance use such as crime prevention in the store (refer to FIG. 37). The microphone arrays for surveillance use are provided at a location which is hardly visible in the store, a location far away from the register counter in the store, or the like.

In other words, as illustrated in FIG. 37, a microphone array provided for service use holds information indicating that the microphone array is provided for service use in advance, and a microphone array provided for surveillance use holds information indicating that the microphone array is provided for surveillance use in advance. A privacy protection mark is added to voice data of a clerk obtained by the microphone array provided for surveillance use collecting sounds, through processing in the microphone array. However, a privacy protection mark is not added to voice data of a clerk obtained by the microphone array provided for service use collecting sounds.

At least one of microphone arrays AM1, . . . , and AML transmits a voice packet which includes voices collected by each microphone as voice data, to recorder 4 via network NW.

Console 31 acquires coordinate data indicating a position of an image on a screen, designated through the user's operation with respect to the image (for example, an image captured by any one of cameras C1, . . . , and CM; the same applies hereinafter) on the screen displayed on display device 35, and outputs the acquired coordinate data to service speech evaluator 33 or output 34.

If any position is designated with finger FG of the user or a stylus pen in a state in which video data captured by each camera is displayed on the screen of display device 35, each of cameras C1, and CM receives coordinate data of the designated position from service evaluation apparatus 3, calculates data regarding a distance and a direction (including a horizontal angle and a vertical angle; the same applies hereinafter) to a position (hereinafter, simply referred to as a "voice position") on the real space corresponding to the designated position, and transmits the data to service evaluation apparatus 3 from each camera. A process of calculating data regarding a distance and a distance in any camera is a well-known technique, and a description thereof will be omitted.

On the basis of a video displayed on the screen of display device 35, directivity controller 37 calculates coordinates indicating a directive direction which is directed toward a voice position corresponding to the designated position from any one of microphone arrays corresponding to the camera capturing the video in response to the user's designation operation. A method of calculating coordinates indicating a directive direction in directivity controller 37 is a well-known technique, and a detailed description thereof will be omitted.

Directivity controller 37 acquires, from camera C1, data regarding a distance and a direction from an installation position of, for example, camera C1, to the voice position, and calculates coordinates indicating a directive direction which is directed from an installation position of, for example, microphone array AM1 (for example, it is assumed that camera C1 is correlated with microphone array AM1 in advance) to the voice position using these data. For example, in a case where a casing of microphone array AM1 is integrally formed with camera C1 so as to surround a casing of camera C1, a direction (a horizontal angle and a vertical angle) from camera C1 to the voice position may be used as coordinates indicating a directive direction from microphone array AM1 to the voice position.

In a case where the casing of camera C1 and the casing of microphone array AM1 are installed to be separated from each other, directivity controller 37 calculates coordinates indicating a directive direction from microphone array AM1 to the voice position by using calibration parameter data calculated in advance, and data regarding a direction (a horizontal angle and a vertical angle) from camera C1 to the voice position. The calibration is an operation of calculating or acquiring a predetermined calibration parameter which is required for directivity controller 37 of service evaluation apparatus 3C to calculate coordinates indicating a directive direction, and is assumed to be performed in advance by using a well-known technique.

The coordinates indicating the directive direction are expressed by a horizontal angle of the directive direction which is directed from microphone array AM1 toward the voice position and a vertical angle of the directive direction which is directed from microphone array AM1 toward the voice position. The voice position is a position of a site as an actual monitoring target or a voice collection target, corresponding to a designated position which is designated with finger FG of the user or a stylus pen in a video displayed on the screen of display device 35 by using console 31 (refer to FIG. 1).

Directivity controller 37 forms the directivity in a direction indicated by the calculated coordinates by using voice data of a clerk included in voice packets transmitted from microphone array AM1, so as to perform an emphasis process on the voice data, and sends generated voice data having undergone the emphasis process to output 34. The emphasis process in directivity controller 37 may be performed by any one of microphone arrays, corresponding to the camera having captured the video selected by the user.

Service monitoring system 100C illustrated in FIG. 5 has a configuration in which monitoring data 4b stored in recorder 4 further includes video data transmitted from at least one of cameras C1, . . . , and CM and sensor data transmitted from at least one of sensor devices S1, . . . , and SN during a service event performed by a clerk in addition to the POS operation history data and voice data of a clerk collected by the microphone (for example, microphone M1) for each clerk in service monitoring system 100 illustrated in FIG. 2.

In FIG. 5, microphone arrays AM1, . . . , and AML are connected to network NW, but some or all of microphones M1, . . . , and ML illustrated in FIG. 2 may be connected thereto, and some or all of attendant microphones SM1, . . . , and SML illustrated in FIG. 3 may be connected thereto.

Figure 6:
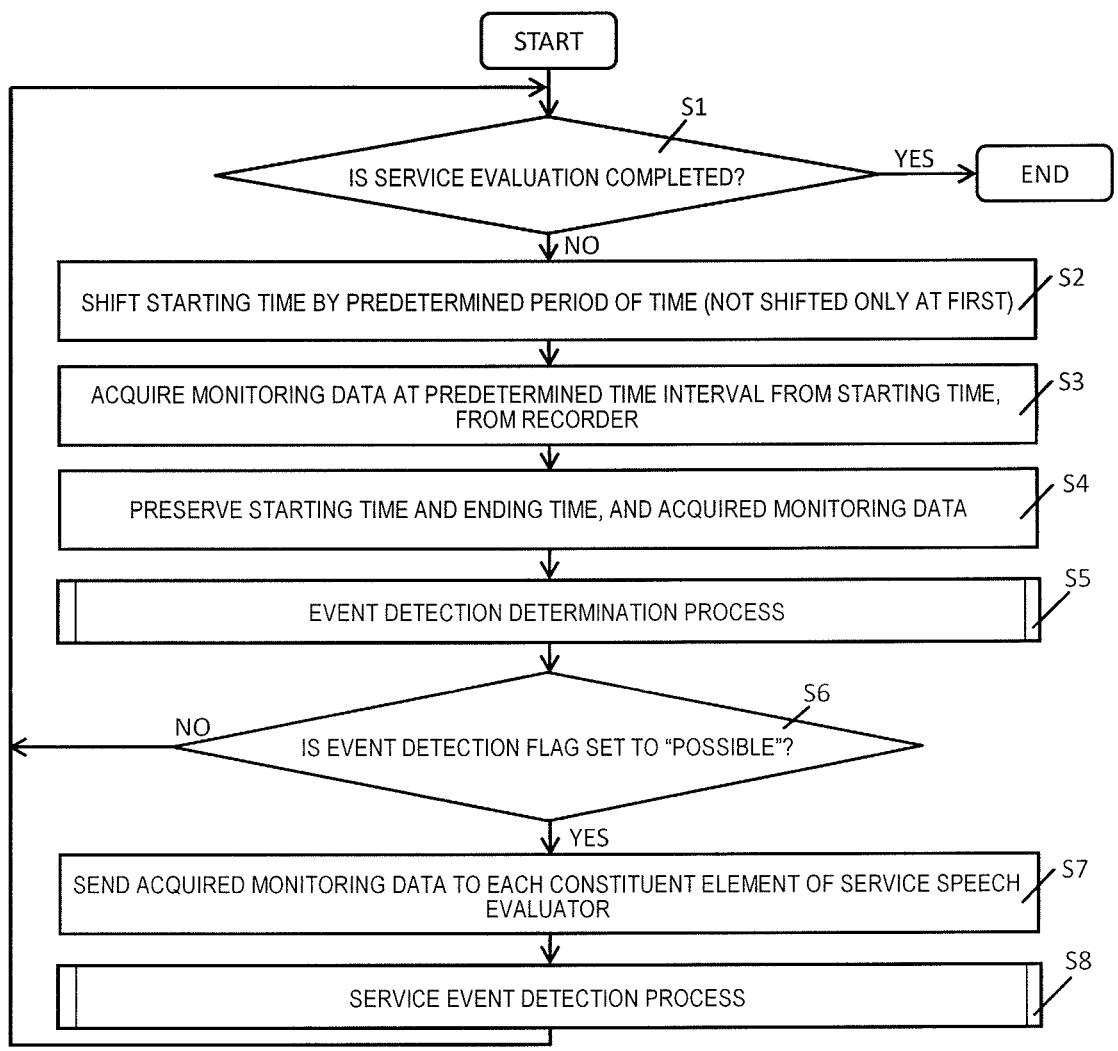
FIG. 6 is a flowchart illustrating an example of all operation procedures in the service monitoring system of the present embodiment.

All operation procedures which are common to service monitoring systems 100, 100A, 100B and 100C of the present embodiment will be described with reference to FIG. 6. FIG. 6 is a flowchart illustrating an example of all operation procedures in the service monitoring system of the present embodiment. In the following description, the same operation is fundamentally performed by using any configuration of service monitoring systems 100, 100A, 100B and 100C, but, for convenience of description, the description will be made by using, for example, the system configuration of service monitoring system 100 illustrated in FIG. 2, and will be made by referring to the configurations of respective service monitoring system 100A, 100B and 100C illustrated in FIGS. 3 to 5 as necessary.

In FIG. 6, in a case where service evaluation is completed (YES in step S1), an operation of service monitoring system 100 illustrated in FIG. 6 is finished. The case where service evaluation is completed may include a case where a "completion" button of a service evaluation application installed in service evaluation apparatus 3 is pressed, or a case where service evaluation apparatus 3 is shutdown, but is not limited to this case.

Figure 38:
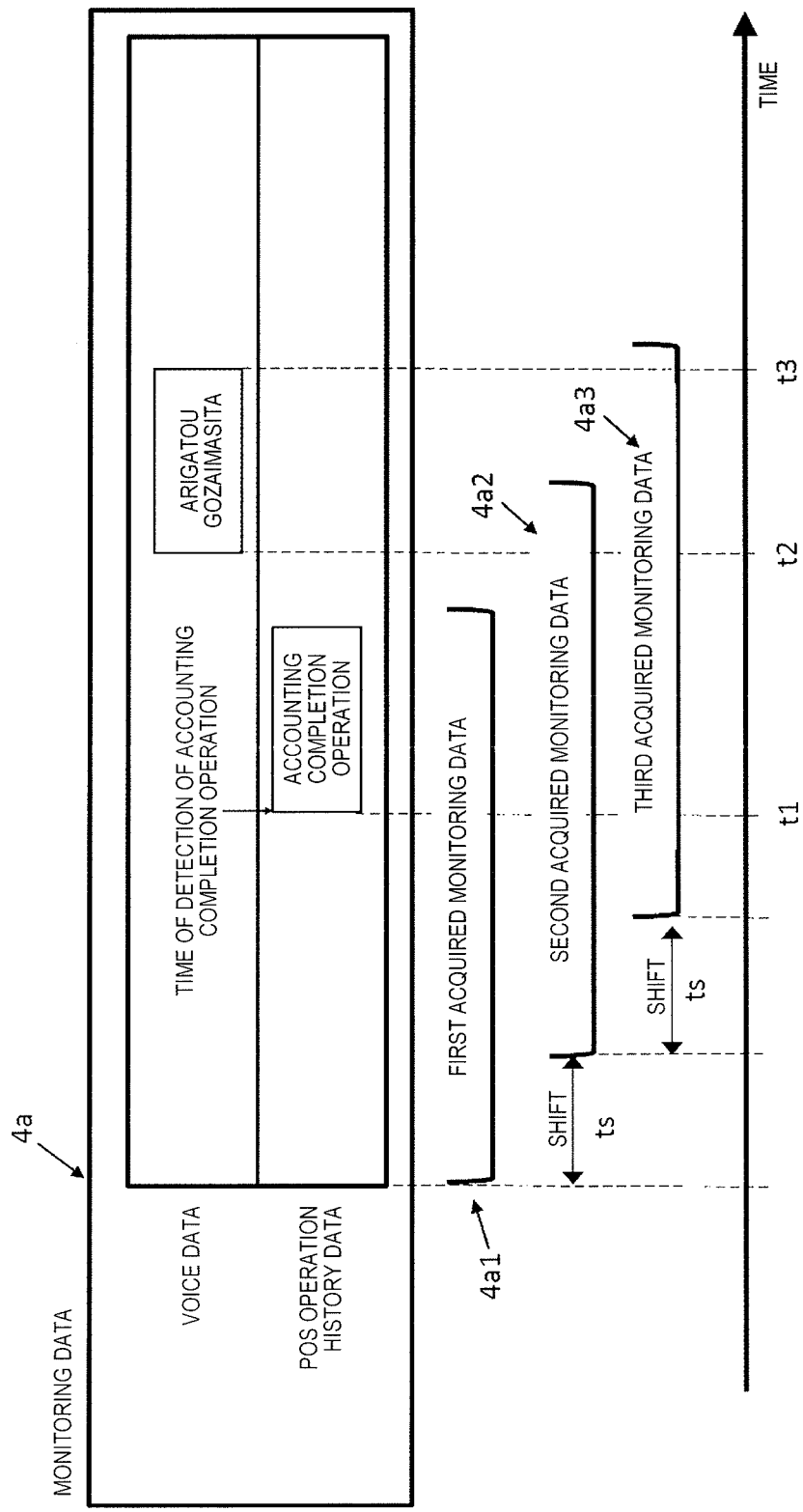
FIG. 38 is a diagram illustrating an example of a shift cutout process on monitoring data.

On the other hand, in a case where the service evaluation is not completed (NO in step S1), monitoring data extractor 38 of service evaluation apparatus 3 cuts out monitoring data 4a acquired from recorder 4 at each predetermined time interval (for example, about 10 to 20 seconds) in order for service speech evaluation value calculator 332 of service speech evaluator 33 to calculate a service speech evaluation value of a clerk. A length of the monitoring data cut out by monitoring data extractor 38 is assumed to include the entire length from starting of an service event (for example, an accounting completion operation) which is expected in advance, or before that, to ending thereof after a service keyword (for example, "arigatougozaimashita" ("thank you" in English)) which is expected in advance is spoken. At this time, monitoring data extractor 38 of service evaluation apparatus 3 shifts and sets a cutout start time serving as a starting point for cutting out monitoring data 4a, from a cutout start time of the previous monitoring data by a predetermined time period (for example, about 1 second) (step S2; refer to FIG. 38). However, monitoring data extractor 38 of service evaluation apparatus 3 does not perform a shift process when first monitoring data 4a is cut out. FIG. 38 is a diagram illustrating an example of a shift cutout process on monitoring data 4a. The process in step S2 is provided in order to prevent that it is hard to detect the service keyword in cutout monitoring data 4a2 if a service event is performed at a boundary time point of the predetermined time interval of monitoring data (for example, monitoring data 4a2 illustrated in FIG. 38) acquired in step S3. A plurality of monitoring data items 4a1, 4a2, 4a3, . . . generated through the process in step S2 include first monitoring data to final monitoring data which are all recorded without interrupting voice data of the service keyword, which is expected in advance, in the middle.

For example, as illustrated in FIG. 38, a case is assumed in which POS operation history data indicating that an accounting completion operation occurs at a time point t1, and voice data in which a clerk speaks "arigatougozaimashita" ("thank you" in English)" between a time point t2 and a time point t3 are stored in monitoring data 4a which is stored in recorder 4. In this case, since monitoring data 4a1 which is cut out for the first time by monitoring data extractor 38 in step S2 does not include voice data of the clerk corresponding to the accounting completion operation, a service event is not detected, and thus accurate service evaluation cannot be performed. In the next step S2, monitoring data extractor 38 of service evaluation apparatus 3 extracts monitoring data 4a2 in which a cutout start time serving as a starting point for cutting out monitoring data 4a is shifted from the cutout start time of monitoring data 4a1 by predetermined time period ts. Data sizes of cutout and acquired monitoring data 4ak (where k is an integer of 1 or greater) corresponding to predetermined time intervals are the same as each other. However, since monitoring data 4a2 does not store entire voice data such as "arigatougozaimashita" ("thank you" in English)" spoken by the clerk the service event is not detected, and, similarly, thus, accurate service evaluation cannot be performed. In the next step S2, monitoring data extractor 38 of service evaluation apparatus 3 extracts monitoring data 4a3 in which the cutout start time serving as a starting point for cutting out monitoring data 4a is shifted from the cutout start time of monitoring data 4a2 by predetermined time period ts. Monitoring data 4a3 stores the entire voice data such as "arigatougozaimashita" ("thank you" in English)" spoken by the clerk, and thus service evaluation apparatus 3 can detect the service event.

As mentioned above, service evaluation apparatus 3 may just try to detect whether or not a service keyword is included in each of monitoring data items 4a1, 4a2, 4a3, . . . having the normally same length (that is, the predetermined time period ts), extracted by monitoring data extractor 38, for example, through voice recognition. A process such as detection of a voice speech starting time or a voice speech ending time, or setting of a range for voice recognition is not necessary. Therefore, it is possible to reliably detect a service keyword which is expected in advance. A variation in a shift process on a cutout start time of monitoring data will be described later with reference to FIGS. 39 to 41. A method of cutting out monitoring data 4b is the same as the method of cutting out monitoring data 4a, and thus a description thereof will be omitted.

After step S2, monitoring data extractor 38 of service evaluation apparatus 3 acquires monitoring data 4a at a predetermined time interval (for example, about 10 seconds) from the starting time set in step S2, from recorder 4 (step S3), and holds acquired monitoring data 4a (specifically, the POS operation history data and the voice data of the clerk included in monitoring data 4a) in correlation with the starting time and an ending time of monitoring data 4a in memory 32 (step S4). The ending time is a time point obtained by adding the predetermined time period to the starting time.

After step S4, service speech evaluator 33 of service evaluation apparatus 3 performs an event detection determination process (step S5), and, if an event detection flag is set to "possible" (YES in step S6), output 34 of service evaluation apparatus 3 sends monitoring data 4a (that is, monitoring data 4a acquired from recorder 4 at the predetermined time interval), held in memory 32 in step S4, to each constituent element (that is, service event detector 331 and service speech evaluation value calculator 332) of service speech evaluator 33 (step S7). After step S7, service event detector 331 of service speech evaluator 33 of service evaluation apparatus 3 performs a service event detection process (step S8).

In a case where the event detection flag is set to "impossible" (NO in step S6), or after step S8, the operation of service monitoring system 100 returns to step S1.

Figure 7:
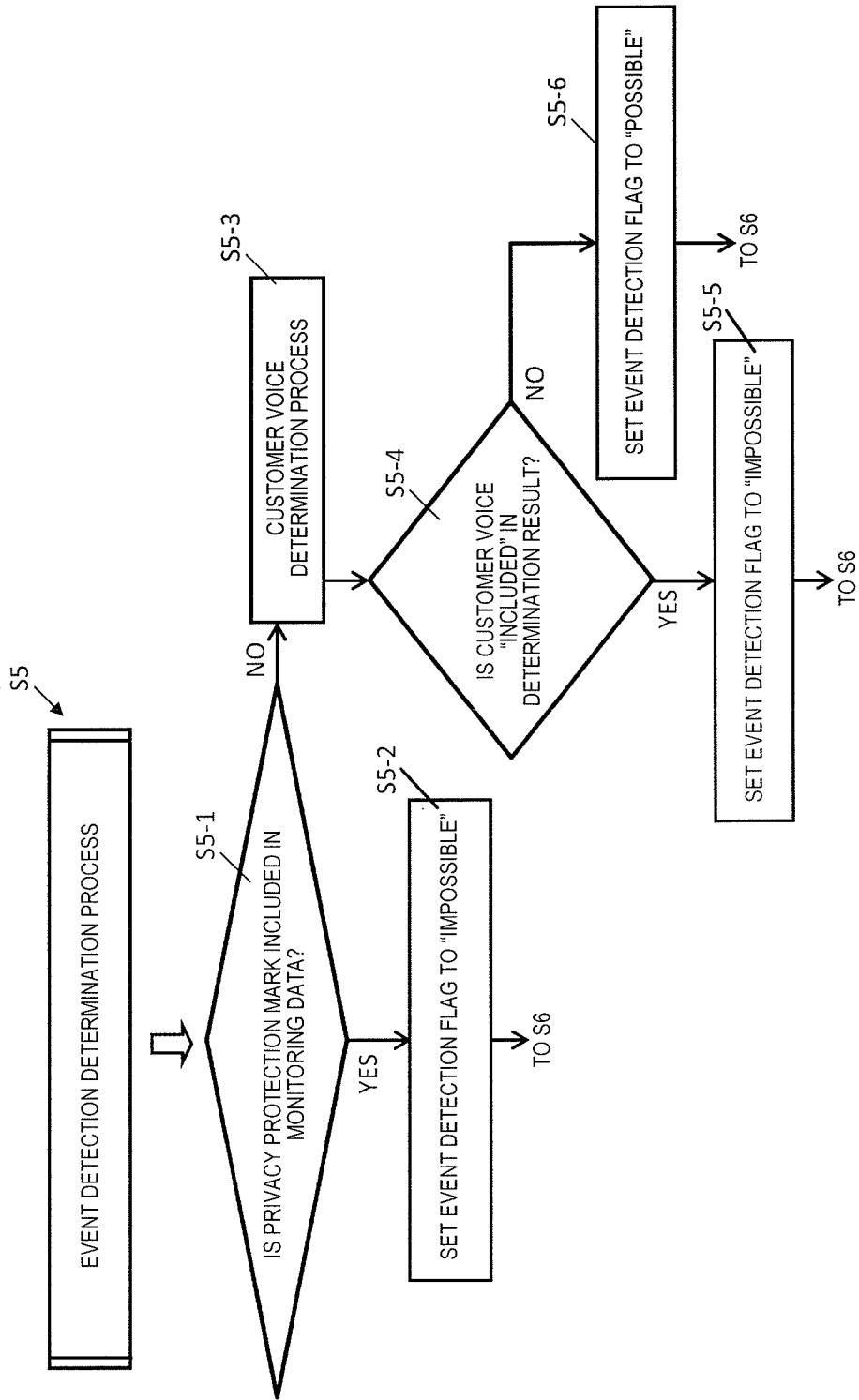
FIG. 7 is a flowchart illustrating an example of detailed operation procedures of an event detection determination process.

FIG. 7 is a flowchart illustrating examples of detailed operation procedures of the event detection determination process. In FIG. 7, if it is determined that that a privacy protection mark as an example of predetermined information indicating customer privacy protection is included in a predetermined region (for example, a header region, a part of a payload region, or other option regions) of monitoring data 4a at the predetermined time interval held in memory 32 in step S4 (YES in step S5-1), service speech evaluator 33 of service evaluation apparatus 3 sets the event detection flag indicating whether or not a service event detection process will be performed, to "impossible" (that is, the service event process is not performed and is omitted) (step S5-2). After step S5-2, the operation of service monitoring system 100 proceeds to step S6.

On the other hand, if service speech evaluator 33 determines that that a privacy protection mark as an example of predetermined information indicating customer privacy protection is not included in a predetermined region (for example, a header region, a part of a payload region, or other option regions) of monitoring data 4a at the predetermined time interval held in memory 32 in step S4 (NO in step S5-1), service speech evaluator 33 of service evaluation apparatus 3 determines whether or not a voice of a customer visiting the store is included in monitoring data 4a (step S5-3).

For example, in a case where it is determined that a keyword having a high possibility of customers speaking in the store is included in voice data included in monitoring data 4a (more specifically, for example, with respect to the voice data included in monitoring data 4a, a result of a word spotting process on a keyword having a high possibility of customers speaking in the store is equal to or more than a predetermined level), service speech evaluator 33 determines that a voice of a customer is included in monitoring data 4a (YES in step S5-4).

Alternatively, in a case where voices of people other than clerks which are registered in advance are collected in the attendant microphones worn by respective clerks (more specifically, for example, with respect to collected voice data, a voiceprint recognition result for a clerk registered in advance is equal to or less than a predetermined level), service speech evaluator 33 may determine that a voice of a customer is included in monitoring data 4a (YES in step S5-4).

Alternatively, in a case where image processing is performed on video data included in monitoring data 4b so as to detect a face other than faces image of clerks registered in advance, and a voice of a person is included in voices spoken from a position of the detected face or voices obtained by forming the directivity at the position of the defected face so as to perform an emphasis process, service speech evaluator 33 of service evaluation apparatus 3C may determine that a voice of a customer is included in monitoring data 4a (YES in step S5-4).

In a case where it is determined that a voice of a customer is included as a result of the process of determining whether or not a customer voice is included (YES in step S5-4), service speech evaluator 33 of service evaluation apparatus 3 (or service evaluation apparatus 3C) sets the event detection flag to "impossible" (step S5-5).

In a case where it is determined that a voice of a customer is not included as a result of the process of determining whether or not a customer voice is included (NO in step S5-4), service speech evaluator 33 of service evaluation apparatus 3 (or service evaluation apparatus 3C) sets the event detection flag to "possible" (step S5-6). After step S5-5, and after step S5-6, the operation of service monitoring system 100 proceeds to step S6.

Next, prior to description of the service event detection process in step S8 illustrated in FIG. 6, a description will be made of examples of a service event information DBs, as an example of service event data including determination conditions for each predetermined service event, respectively corresponding to service monitoring systems 100, 100A, 100B and 100C illustrated in FIGS. 2 to 5, with reference to FIGS. 11 to 14. Respective service event information DBs illustrated in FIGS. 11 to 14 are stored in management DB 2a of management server 2.

FIG. 11 is a diagram illustrating an example of a service event information DB corresponding to service monitoring system 100 illustrated in FIG. 2. FIG. 12 is a diagram illustrating an example of a service event information DB corresponding to service monitoring system 100A illustrated in FIG. 3. FIG. 13 is a diagram illustrating an example of a service event information DB corresponding to service monitoring system 100B illustrated in FIG. 4. FIG. 14 is a diagram illustrating an example of a service event information DB corresponding to service monitoring system 100C illustrated in FIG. 5. In description of FIGS. 12 to 14, a description of the content overlapping the description of FIG. 11 will be omitted, and different content will be described.

The service event information DB illustrated in FIG. 11 defines the type and a category of data corresponding to each item of a service event ID, a service event name, a service event determination condition (that is, a condition for determining whether or not a service event is detected in monitoring data 4a), and service event output information (that is, information output when a service event is detected).

A service event determination condition of the service event information DB illustrated in FIG. 11 defines that a service event detection trigger is to perform a predetermined operation (POS operation) on POS terminal 5.

Service event output information illustrated in FIG. 11 defines that a preset ID, an attendant ID, and a service event ID are output.

A service event determination condition of the service event information DB illustrated in FIG. 12 defines that a service event detection trigger differs for each service event, and, specifically, is to perform a predetermined operation (POS operation) on POS terminal 5 and to include a specific keyword in voice data.

Service event output information of the service event information DB illustrated in FIG. 12 differs for each service event, and specifically defines a combination of a preset ID (identification information of a predefined position in the store; the same applies hereinafter), an attendant ID (identification information of a clerk; the same applies hereinafter), and a service event ID, and only an attendant ID (identification information of an attendant microphone worn by the clerk; the same applies hereinafter).

The service event information DB illustrated in FIG. 13 defines the type and a category of data corresponding to each item of a service event ID, an item indicating whether or not an event targets all attendants, a service event name, a service event determination condition (that is, a condition for determining whether or not a service event is detected in monitoring data 4a), and service event output information (that is, information output when a service event is detected).

A service event determination condition of the service event information DB illustrated in FIG. 13 defines that a service event detection trigger differs for each service event, and, specifically, that the sensor device S1 (for example, an automatic door) provided near the entrance of the store detects an opening/closing operation; a clerk stays at a predefined position (preset position) corresponding to a predetermined preset ID, and a customer stays at a position (that is, a position having a high possibility of a customer (visitor) being located during a service event) corresponding to a predetermined visitor position preset ID for a predetermined period of time (for example, about 5 seconds); and a predetermined operation (POS operation) is performed on POS terminal 5.

Service event output information of the service event information DB illustrated in FIG. 13 differs for each service event, and specifically defines a combination of a microphone ID (which will be described later), a camera ID (which will be described later), an attendant ID, and a service event ID, and a combination of a preset ID, an attendant ID and a service event ID.

Service event output information of the service event information DB illustrated in FIG. 14 differs for each service event, and specifically defines a combination of a at an attendant, position coordinates, a camera ID, an attendant ID, and a service event ID, and a combination of a preset ID, an attendant ID and a service event Ill. The attendant position coordinates are used for directivity controller 37 to form the directivity of a voice in a direction from a microphone array collecting voice data of each clerk toward each clerk.

Figure 8:
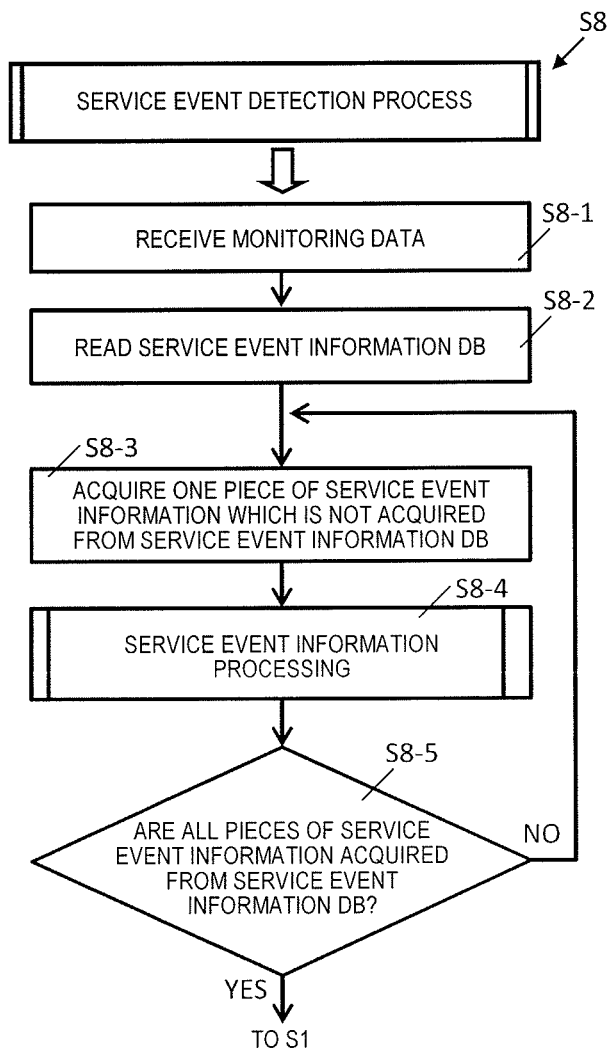
FIG. 8 is a flowchart illustrating an example of detailed operation procedures of a service event detection process.
Figure 9:
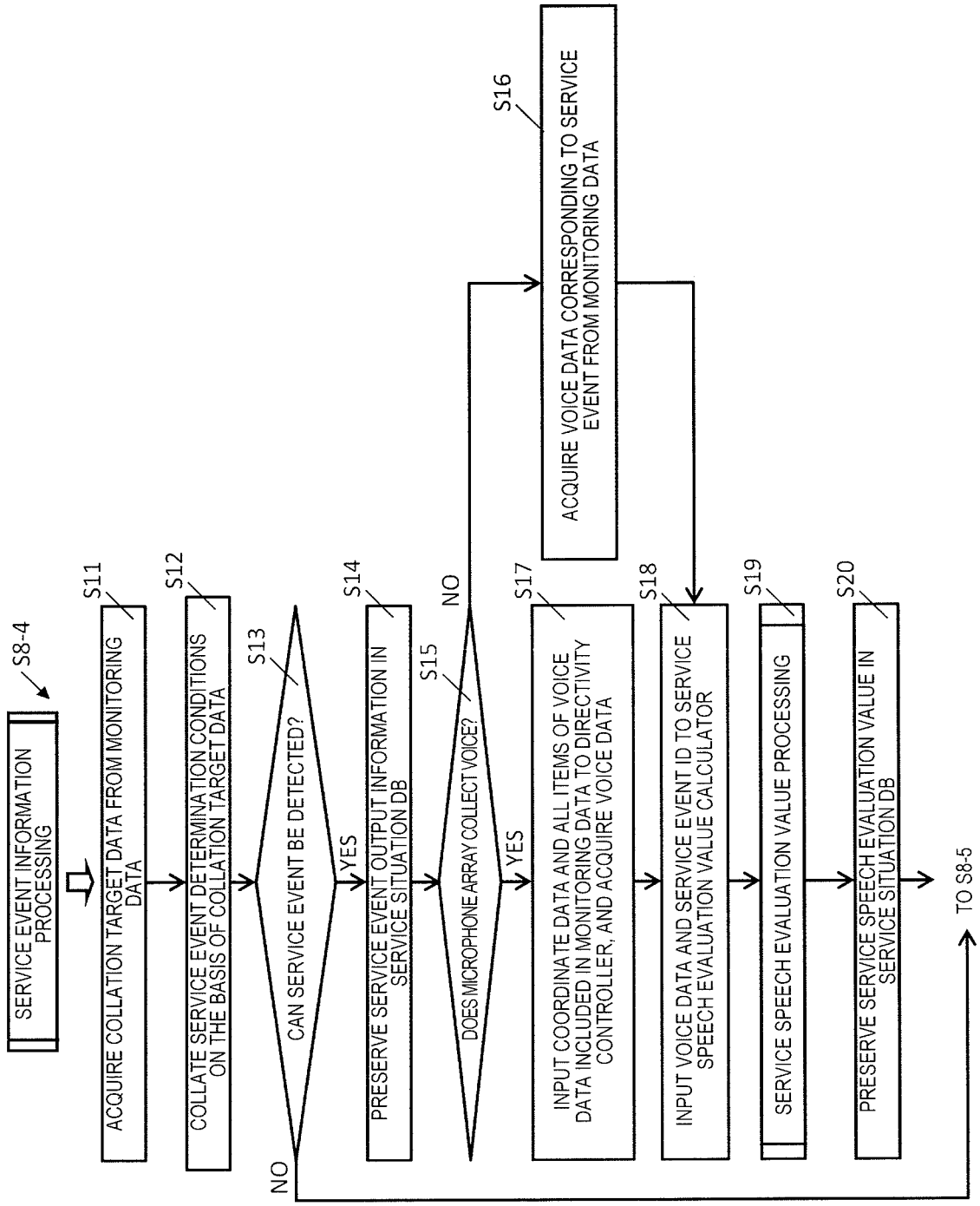
FIG. 9 is a flowchart illustrating an example of detailed operation procedures of service event information processing.

Next, with reference to FIGS. 8 and 9, a description will be made of details of the service event detection process (refer to step S8 illustrated in FIG. 6) by using the specific examples of the service event information DBs illustrated in FIGS. 11 to 14. FIG. 8 is a flowchart illustrating an example of detailed operation procedures of the service event detection process. FIG. 9 is a flowchart illustrating an example of detailed operation procedures of service event information processing.

In the description of FIGS. 8 and 9, for more detailed description and better understanding of the description, FIGS. 8 and 9 will be described in detail by referring to the content of each record of the service event information DBs illustrated in FIGS. 11 to 14, respectively corresponding to each system configuration service monitoring systems 100, 100A, 100B and 100C illustrated in FIGS. 2 to 5. In a case where the records of overlapping service event IDs in the service event information DBs illustrated in FIGS. 11 to 14 are defined, repeated description will be omitted, and different content will be described.

(Service Event Detection Process in Service Monitoring System 100 Illustrated in FIG. 2)

First, service event detector 331 receives monitoring data 4a at each predetermined time interval (for example, about 10 seconds) whose starting time and ending time are defined, from service speech evaluator 33 (step S8-1), and reads the service event information DB (refer to FIG. 11) stored in management DB 2a of management server 2 (step S8-2).

Service event detector 331 acquires a first-row record (the service event ID "EID1", and the service event name "accounting completion greeting") of the service event information DB, which is not acquired (step S8-3), and starts the service event information processing. Service event detector 331 acquires POS operation history data as collation target data from monitoring data 4a (step S11), and collates whether or not a detection trigger of the service event determination condition of the accounting completion operation is satisfied on the basis of the POS operation history data (that is, whether or not there is a predetermined action (operation) on POS terminal 5) (step S12).

In a case where a detection trigger of the service event determination condition of the accounting completion operation is not satisfied on the basis of the POS operation history data (NO in step S13), the service event information processing illustrated in FIG. 9 is finished, and the process in service event detector 331 proceeds to step S8-5.

On the other hand, in a case where a detection trigger of the service event determination condition of the accounting completion operation is satisfied on the basis of the POS operation history data (YES in step S13), the service event detector 331 stores the service event output information (specifically, a corresponding preset ID (any one of 1 to PN), an attendant ID (identification information of a clerk: any one of 1 to EN), and a service event ID) of the service event information DB illustrated in FIG. 11 in the service situation DB (refer to FIG. 10) (step S14).

In the detected service event, as identification information (attendant ID: 1 to EN) of an attendant (clerk) operating corresponding POS terminal 5, an attendant ID is used which is obtained by a barcode reader reading a barcode printed on, for example, a name card when starting to operate POS terminal 5.

In service monitoring system 100 illustrated in FIG. 2, the directivity of microphones M1 and ML is determined in advance when the microphones are manufactured, and thus the directivity cannot be changed. In other words, in service monitoring system 100 illustrated in FIG. 2, since voices are not collected by microphone arrays AM1, . . . , and AML (NO in step S15), a process of forming the directivity cannot be performed, and service event detector 331 acquires voice data of a clerk corresponding to the detected service event from monitoring data 4a (step S16), and inputs the voice data and the service event ID to service speech evaluation value calculator 332 (step S18). The voice data of the clerk corresponding to the detected service event is, for example, voice data collected by a microphone correlated with POS terminal 5 in which the service event of the "accounting completion operation" is detected.

Figure 15:
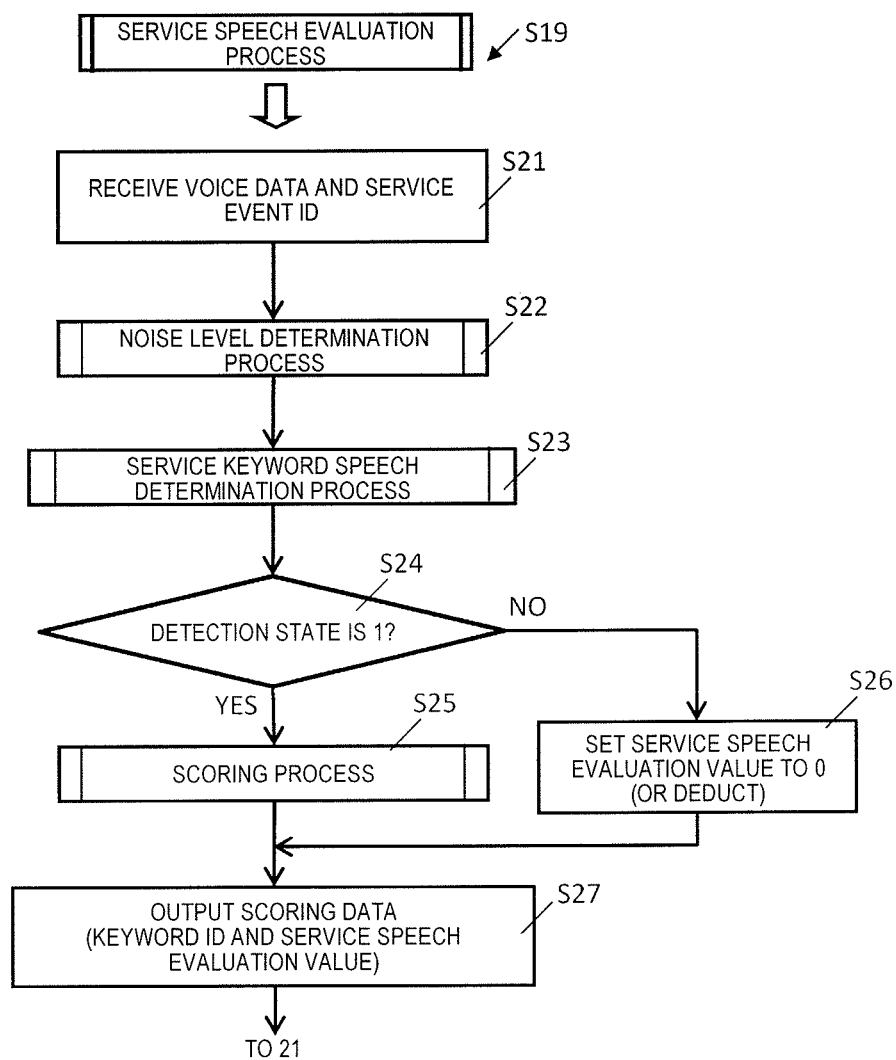
FIG. 15 is a flowchart illustrating an example of operation procedures of a service speech evaluation process.

Service speech evaluation value calculator 332 performs a service speech evaluation process illustrated in FIG. 15 (step S19), and stores (holds) a service speech evaluation output value in the service situation DB (step S20). Consequently, the service event information processing illustrated in FIG. 9 is finished. In FIG. 8, after step S8-4, in a case where all records of the service event information DB are not acquired (NO in step S8-5), the process in service event detector 331 returns to step S8-3. On the other hand, in a case where all records of the service event information DB are acquired (YES in step S8-5), the process in service event detector 331 is finished.

(Service Event Detection Process in Service Monitoring System 100A Illustrated in FIG. 3)

After step S8-2, service event detector 331 acquires a second-row record (the service event ID "EID2", and the service event name "visiting greeting") of the service event information DB, which is not acquired (step S8-3), and starts the service event information processing. Service event detector 331 acquires all items of voice data collected by the attendant microphones as collation target data from monitoring data 4a (step S11), performs voice recognition processing on all the items of voice data, and collates whether or not a specific keyword "irasshaimase ("welcome" in English) is included in voice recognition processing results (step S12).

In a case where the specific keyword "irasshaimase ("welcome" in English)" is not included in any voice recognition processing result of the voice data (NO in step S13), the service event information processing illustrated in FIG. 9 is finished, and the process in service event detector 331 returns to step S8-5.

In a case where the specific keyword "irasshaimase ("welcome" in English)" is included in any one of the voice recognition processing results of the voice data (YES in step S13), the service event detector 331 stores the service event output information (specifically, an attendant ID (identification information of a clerk: any one of 1 to EN), and a service event ID) of the service event information DB illustrated in FIG. 12 in the service situation DB (refer to FIG. 10) (step S14).

In service monitoring system 100A illustrated in FIG. 3, the directivity of attendant microphones SM1, . . . , and SML is determined in advance when the microphones are manufactured, and thus the directivity cannot be changed. In other words, in service monitoring system 100A illustrated in FIG. 3, since voices are not collected by microphone arrays AM1, . . . , and AML (NO in step S15), a process of forming the directivity cannot be performed, and service event detector 331 acquires voice data of a clerk corresponding to the detected service event from monitoring data 4a (step S16), and inputs the voice data and the service event ID to service speech evaluation value calculator 332 (step S18). The voice data of the clerk corresponding to the detected service event is voice data in which the specific keyword "irasshaimase ("welcome" in English)" is included in the voice recognition processing result in service event detector 331.

Service speech evaluation value calculator 332 performs the service speech evaluation process illustrated in FIG. 15 (step S19), and stores (holds) a service speech evaluation output value in the service situation DB (step S20). Consequently, the service event information processing illustrated in FIG. 9 is finished. In FIG. 8, after step S8-4, in a case where all records of the service event information DB are not acquired (NO in step S8-5), the process in service event detector 331 returns to step S8-3. On the other hand, in a case where all records of the service event information DB are acquired (YES in step S8-5), the process in service event detector 331 is finished.

(Service Event Detection Process in Service Monitoring System 100B Illustrated in FIG. 4)

After step S8-2, service event detector 331 acquires a first-row record (the service event ID "EID1", and the service event name "visiting-leaving greeting") of the service event information DB, which is not acquired (step S8-3), and starts the service event information processing. Since this service event of "visiting-leaving greeting" is a service event targeting all attendants (all clerks), microphone IDs and camera IDs for specifying all clerks are output as the service event output information, and this is also the same for the following description. Service event detector 331 acquires a detection result (automatic door opening/closing history data) included in video data and sensor data as collation target data from monitoring data 4b (step S11), and collates whether or not an automatic door opening/closing operation is included in the automatic door opening/closing history data (step S12).

In a case where an automatic door opening/closing operation is not included in the automatic door opening/closing history data (NO in step S13), the service event information processing illustrated in FIG. 9 is finished, and the process in service event detector 331 returns to step S8-5.

On the other hand, in a case where an automatic door opening/closing operation is included in the automatic door opening/closing history data (YES in step S13), the service event detector 331 stores (holds) the service event output information (specifically, a microphone ID (identification information of a microphone: any one of 1 to MN), a camera ID (identification information of a camera: any one of 1 to CN), an attendant ID (identification information of a clerk: any one of 1 to EN), and a service event ID) of the service event information DB illustrated in FIG. 13 in the service situation DB (refer to FIG. 10) (step S14). The camera ID is output as identification information of a camera which images positions where respective clerks are present most nearby when the automatic door is opened and closed, as a result of service event detector 331 performing image processing on predetermined video data.

In service monitoring system 100E illustrated in FIG. 4, the directivity of attendant microphones M1, . . . , and ML is determined in advance when the microphones are manufactured, and thus the directivity cannot be changed. In other words, in service monitoring system 100B illustrated in FIG. 4, since voices are not collected by microphone arrays AM1, and AML (NO in step S15), a process of forming the directivity cannot be performed, and service event detector 331 acquires voice data of a clerk corresponding to the detected service event from monitoring data 4b (step S16), and inputs the voice data and the service event ID to service speech evaluation value calculator 332 (step S18).

The voice data of the clerk corresponding to the detected service event is voice data collected by a microphone which is determined as being closest to a position where each clerk is present as a result of service event detector 331 performing image processing on predetermined video data when the automatic door is opened and closed. The microphone outputs a microphone ID which is identification information thereof.

The predetermined video data is, for example, video data captured by one or more necessary minimum cameras required to recognize the entire region in the store, or a combination of a plurality of items of video data, and a corresponding camera may be fixed, or may be changed as appropriate in response to the user's input operation, and this is also the same for the following description.

Service speech evaluation value calculator 332 performs the service speech evaluation process illustrated in FIG. 15 (step S19), and stores (holds) a service speech evaluation output value in the service situation DB (step S20). Consequently, the service event information processing illustrated in FIG. 9 is finished. In FIG. 8, after step S8-4, in a case where all records of the service event information DB are not acquired (NO in step S8-5), the process in service event detector 331 returns to step S8-3.

Therefore, service event detector 331 acquires a second-row record (the service event ID "EID2", and the service event name "accounting start greeting") of the service event information DB, which is not acquired (step S8-3), and starts the service event information processing. Service event detector 331 acquires the above-described predetermined video data as collation target data from monitoring data 4b (step S11), performs image processing on the video data, and collates whether or not a clerk is present at a predefined position (for example, a standing operation position at the register counter) for a clerk performing the "accounting start greeting", and a customer (visitor) stays at a predetermined position (for example, the front of the register counter, or a predetermined waiting position provided in the store) for a predetermined period of time (for example, about 5 seconds) (step S12). If it is determined whether or not a customer stays for a predetermined period of time, it is possible to exclude a case where a customer bypasses the register counter.

In a case where it is determined that the clerk is not present at the predefined position (for example, a standing operation position at the register counter) for a clerk performing the "accounting start greeting", or the customer (visitor) does not stay at the predetermined position (for example, the front of the register counter, or a predetermined waiting position provided in the store) for the predetermined period of time (for example, about 5 seconds) as a result of image processing on the video data (NO in step S13), the service event information processing illustrated in FIG. 9 is finished, and the process in service event detector 331 returns to step S8-5.

On the other hand, in a case where it is determined as a result of image processing on the video data that the clerk is present at the predefined position (for example, a standing operation position at the register counter) for a clerk performing the "accounting start greeting", and the customer (visitor) stays at the predetermined position (for example, the front of the register counter, or a predetermined waiting position provided in the store) for the predetermined period of time (for example, about 5 seconds) (YES in step S13), the service event detector 331 stores (holds) the service event output information (specifically, a preset ID (identification information of a predefined position: any one of 1 to PN), an attendant ID (identification information of a clerk: any one of 1 to EN), and a service event ID) of the service event information DB illustrated in FIG. 13 in the service situation DB (refer to FIG. 10) (step S14).

In service monitoring system 100B illustrated in FIG. 4, the directivity of attendant microphones M1, . . . , and ML is determined in advance when the microphones are manufactured, and thus the directivity cannot be changed. In other words, in service monitoring system 100B illustrated in FIG. 4, since voices are not collected by microphone arrays AM1, . . . , and AML (NO in step S15), a process of forming the directivity cannot be performed, and service event detector 331 acquires voice data of a clerk corresponding to the detected service event from monitoring data 4b (step S16), and inputs the voice data and the service event ID to service speech evaluation value calculator 332 (step S18). The voice data of the clerk corresponding to the detected service event is voice data of a clerk collected by a microphone correlated with the predefined position (preset position).

Service speech evaluation value calculator 332 performs the service speech evaluation process illustrated in FIG. 15 (step S19), and stores (holds) a service speech evaluation output value in the service situation DB (step S20). Consequently, the service event information processing illustrated in FIG. 9 is finished. In FIG. 8, after step S8-4, in a case where all records of the service event information DB are not acquired (NO in step S8-5), the process in service event detector 331 returns to step S8-3. On the other hand, in a case where all records of the service event information DB are acquired (YES in step S8-5), the process in service event detector 331 is finished.

(Service Event Detection Process in Service Monitoring System 100C Illustrated in FIG. 5)

After step S8-2, service event detector 331 acquires a first-row record (the service event ID "EID1", and the service event name "visiting-leaving greeting") of the service event information DB, which is not acquired (step S8-3), and starts the service event information processing. Service event detector 331 acquires a detection result (automatic door opening/closing history data) included in video data and sensor data as collation target data from monitoring data 4b (step S11), and collates whether or not an automatic door opening/closing operation is included in the automatic door opening/closing history data (step S12).

In a case where an automatic door opening/closing operation is not included in the automatic door opening/closing history data (NO in step S13), the service event information processing illustrated in FIG. 9 is finished, and the process in service event detector 331 returns to step S8-5.

On the other hand, in a case where an automatic door opening/closing operation is included in the automatic door opening/closing history data (YES in step S13), the service event detector 331 stores (holds) the service event output information (specifically, attendant position coordinates of each clerk, a camera ID (identification information of a camera: any one of 1 to CN), an attendant ID (identification information of a clerk: any one of 1 to EN), and a service event ID) of the service event information DB illustrated in FIG. 13 in the service situation DB (refer to FIG. 10) (step S14).

The attendant position coordinates are output as coordinates of a position where each clerk is present in video data displayed on the screen of display device 35, obtained by service event detector 331 performing image processing on predetermined video data. The camera ID is output as identification information of a camera which images positions where respective clerks are present most nearby when the automatic door is opened and closed, as a result of service event detector 331 performing image processing on predetermined video data. The microphone ID is correlated with the camera ID in advance, and is thus selected and output at the time at which the camera ID is selected.

In service monitoring system 100C illustrated in FIG. 5, since voice data is collected by microphone arrays AM1, . . . , and AML (YES in step S15), and a process of forming the directivity can be performed using the voice data obtained through voice collecting, service event detector 331 inputs data regarding the attendant position coordinates of each clerk corresponding to the detected service event and voice data of each clerk corresponding to the service event included in monitoring data 4b, to directivity controller 37, and acquires voice data after directivity controller 37 forms the directivity in a direction from a microphone array closest to each clerk toward each clerk for the voice data of each clerk (step S17). Service event detector 331 inputs the data regarding the attendant position coordinates (for example, coordinates of a position where a clerk is present, displayed on the screen of display device 35) of each clerk, the voice data acquired in step S17, and the service event ID, to service speech evaluation value calculator 332 (step S18).

Service speech evaluation value calculator 332 performs the service speech evaluation process illustrated in FIG. 15 (step S19), and stores (holds) a service speech evaluation output value in the service situation DB (step S20). Consequently, the service event information processing illustrated in FIG. 9 is finished. In FIG. 8, after step S8-4, in a case where all records of the service event information DB are not acquired (NO in step S8-5), the process in service event detector 331 returns to step S8-3.

Next, with reference to FIG. 10, a description will be made of an example of the service situation DB including the service event output information (refer to FIGS. 11 to 14) which is output as a result of the service event detection process illustrated in FIG. 8. FIG. 10 is a diagram illustrating an example of the service situation DB.

The service situation DB illustrated in FIG. 10 defines data corresponding to each item of a service situation data ID, a service speech evaluation value, an event starting time, an event ending time, an attendant. ID, a service event ID, an attendant position (preset), and an attendant position (not preset).

Regarding the service situation data ID "ID 1", service speech evaluation values are V11, ... , and V1n, and, since it has been detected that an attendant (clerk) is present at a position which is not a predefined position (preset position), an attendant position is formed of a camera ID of a camera imaging the clerk and coordinates (coordinate position on the screen) indicating the position of the clerk on video data displayed on the screen of display device 35. The camera having the camera ID "C1" may be an omnidirectional camera, and may be a camera having a fixed angle of view, or may be a PTZ camera having panning, tilting, and zooming functions.

The left subscript "1" in the service speech evaluation value V11 corresponds to the service event ID "EID1", and the left subscript "1" in the service speech evaluation value V11 indicates identification information of a service event in a case where service events having the same service event ID are detected in monitoring data items 4a and 4b which are cut out at a predetermined time interval. Here, n is an integer of 1 or greater, and n is an integer of 2 or greater, for example, in a case where a plurality of service events having the same service event ID are detected in monitoring data items 4a and 4b having a length of about 10 seconds.

Regarding the service situation data ID "ID2", service speech evaluation values are V21, ... , and V2m, and, here, in is an integer of 1 or greater in the same manner as n described above. Since it is detected that an attendant (clerk) is present at a predefined position (preset position), an attendant position is formed of a preset ID indicating the predefined position (preset position).

Therefore, since service monitoring systems 100, 100A, 100B and 100C illustrated in FIGS. 2 to 5 include the service situation DB illustrated in FIG. 10, voice data and video data from a starting time to an ending time of a corresponding service event can be output (reproduced) from service evaluation apparatus 3, and thus a person in charge of the store (for example, a store manager) can carefully observe and review a service situation of a clerk during the service event while checking the service situation with voices and videos. Since the voice data is stored in recorder 4, service evaluation apparatus 3 acquires the voice data collected when a service event corresponding to a service event ID is detected, from recorder 4, and then outputs (reproduces) the voice data.

With reference to FIG. 15, a description will be made of details of operation procedures of the service speech evaluation process (refer to step S19) illustrated in FIG. 9. FIG. 15 is a flowchart illustrating an example of operation procedures of the service speech evaluation process.

In FIG. 15, service speech evaluation value calculator 332 acquires the voice data and the service event ID sent from service event detector 331 in step S18 (step S21), performs a noise level determination process thereon (step S22), and performs a service keyword speech detection process (step S23). After step S23, service speech evaluation value calculator 332 determines whether or not a flag regarding a detection state (which will be described later) is "1" (step S24). In a case where the flag regarding a detection state is "1" (YES in step S24), service speech evaluation value calculator 332 performs a scoring process (step S25). On the other hand, in a case where the flag regarding a detection state is not "1" (NO in step S24), service speech evaluation value calculator 332 sets a service speech evaluation value to 0 or deducts a predetermined score (step S26).

After step S25 or step S26, service speech evaluation value calculator 332 outputs a detected keyword ID (which will be described later) and the service speech evaluation value to service speech evaluator 33 as scoring data (step S27).

Figure 16:
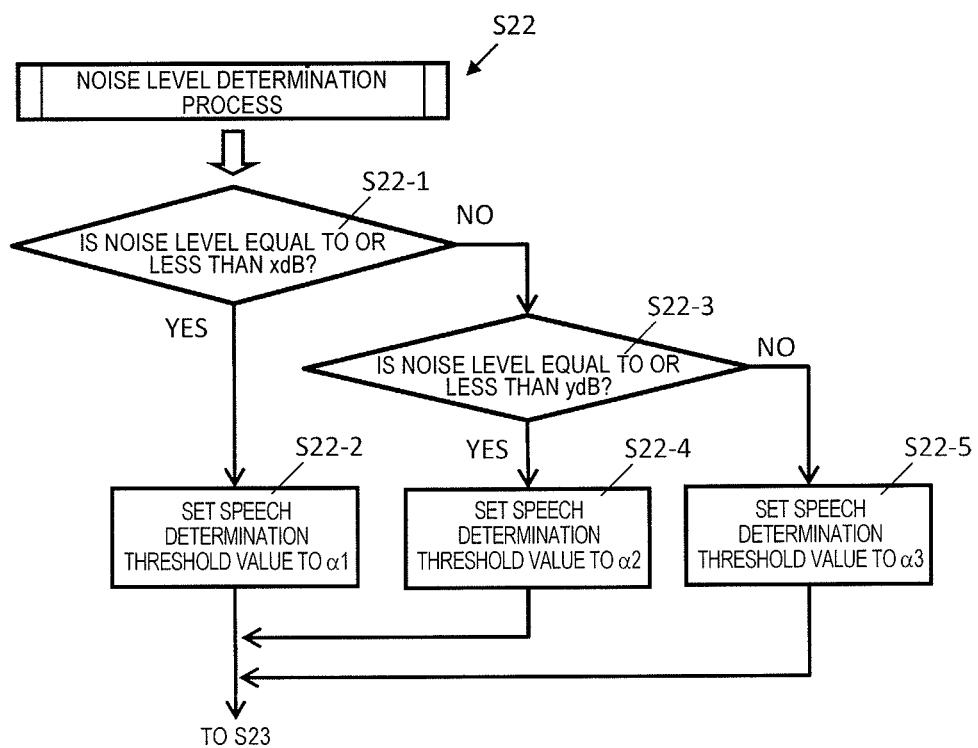
FIG. 16 is a flowchart illustrating an example of operation procedures of a noise level determination process.

Next, with reference to FIG. 16, a description will be made of details of operation procedures of the noise level determination process (refer to step S22) illustrated in FIG. 15. FIG. 16 is a flowchart illustrating an example of operation procedures of the noise level determination process.

In FIG. 16, service speech evaluation value calculator 332 determines whether or not a noise level of surroundings of a voice collection region (for example, the store), acquired by service evaluation apparatus 3, is equal to or less than a predetermined value x [dB] (step S22-1). A noise level is collected by any one of, for example, the microphone, the attendant microphone, and the microphone array, and is transmitted to service evaluation apparatus 3. In a case where the noise level is equal to or less than the predetermined value x [dB] (YES in step S22-1), service speech evaluation value calculator 332 determines a speech determination threshold value (which will be described later) to be $\alpha 1$ (step S22-2).

In a case where the noise level exceeds the predetermined value x [dB] (NO in step S22-1), service speech evaluation value calculator 332 determines whether or not the noise level is equal to or less than a predetermined value y ($>$x) [dB] (step S22-3). In a case where the noise level is equal to or less than the predetermined value y [dB] (YES in step S22-3), service speech evaluation value calculator 332 determines a speech determination threshold value to be $\alpha 2$ (step S22-4). In a case where the noise level exceeds the predetermined value y [dB] (NO in step S22-3), service speech evaluation value calculator 332 determines a speech determination threshold value to be $\alpha 3$ (step S22-5).

Figure 17:
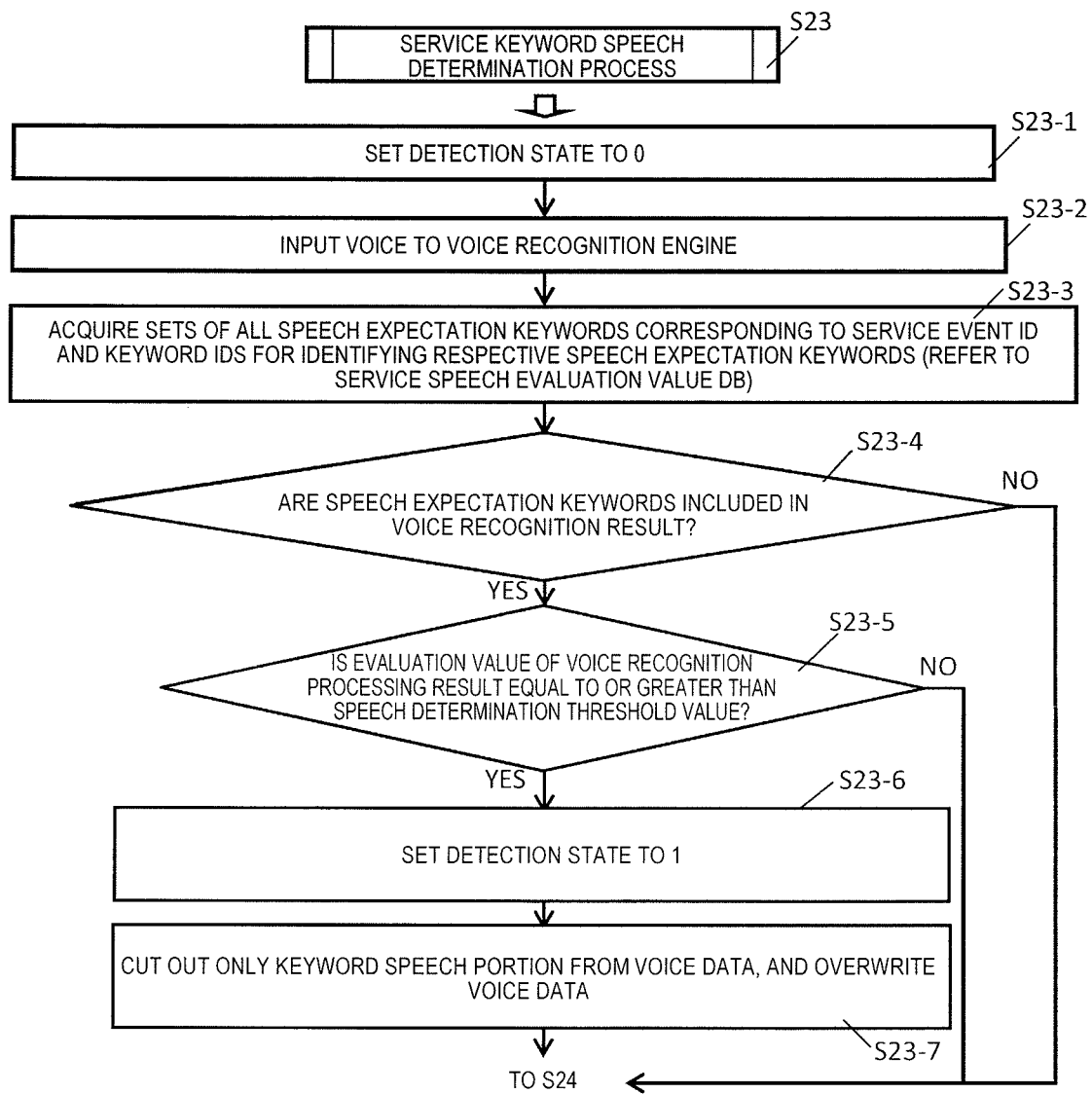
FIG. 17 is a flowchart illustrating an example of operation procedures of a service keyword speech determination process.

Next, with reference to FIG. 17, a description will be made of details of operation procedures of the service keyword speech determination process (refer to step S23) illustrated in FIG. 15. FIG. 17 is a flowchart illustrating an example of operation procedures of the service keyword speech determination process.

In FIG. 17, service speech evaluation value calculator 332 sets the flag regarding a detection state to "0" (step S23-1). The flag regarding a detection state is information indicating a state in which an exemplary speech expectation keyword (refer to FIG. 22A) having a high possibility of a clerk speaking or having to be spoken in a service event.

Service speech evaluation value calculator 332 inputs the voice data acquired in step S21 to a voice recognition engine of service speech evaluation value calculator 332 (step S23-2), and acquires sets of all speech expectation keywords corresponding to the service event ID and keyword IDs for identifying the respective speech expectation keywords from each other, from the service speech evaluation DB of management DB 2a of management server 2 (step S23-3).

Service speech evaluation value calculator 332 determines whether or not the speech expectation keywords acquired in step S23-3 are included in a voice recognition result from the voice recognition engine (step S23-4). In a case where it is determined that the speech expectation keywords are not included in the voice recognition result from the voice recognition engine (NO in step S23-4), the process in service speech evaluation value calculator 332 illustrated in FIG. 17 is finished.

On the other hand, in a case where the speech expectation keywords acquired in step S23-3 are included in a voice recognition result from the voice recognition engine (YES in step S23-4), service speech evaluation value calculator 332 determines whether or not an evaluation value of the voice recognition processing result is equal to or greater than the speech determination threshold value (any one of α1, α2, and α3) determined in step S22-2, step S22-4, or step S22-5 (step S23-5). In a case where it is determined that the evaluation value of the voice recognition processing result is smaller than the speech determination threshold value (any one of α1, α2, and α3) (NO in step S23-5), the process in service speech evaluation value calculator 332 illustrated in FIG. 17 is finished.

On the other hand, in a case where it is determined that the evaluation value of the voice recognition processing result is equal to or greater than the speech determination threshold value (any one of α1, α2, and α3) (YES in step S23-5), service speech evaluation value calculator 332 changes and sets the flag regarding a detection state to "1" (step S23-6), cuts out only a keyword speech portion corresponding to the speech expectation keyword from the voice data acquired in step S21, so as to update and overwrite the voice data (step S23-7). Even in a case where unwanted noise sound is included before and after the speech portion, only the keyword speech portion is cut out, and thus the noise sound included before and after that is cut. Therefore, the accuracy of voice recognition is improved, and the accuracy of the scoring process in the subsequent step S25 is also ensured.

Figure 18:
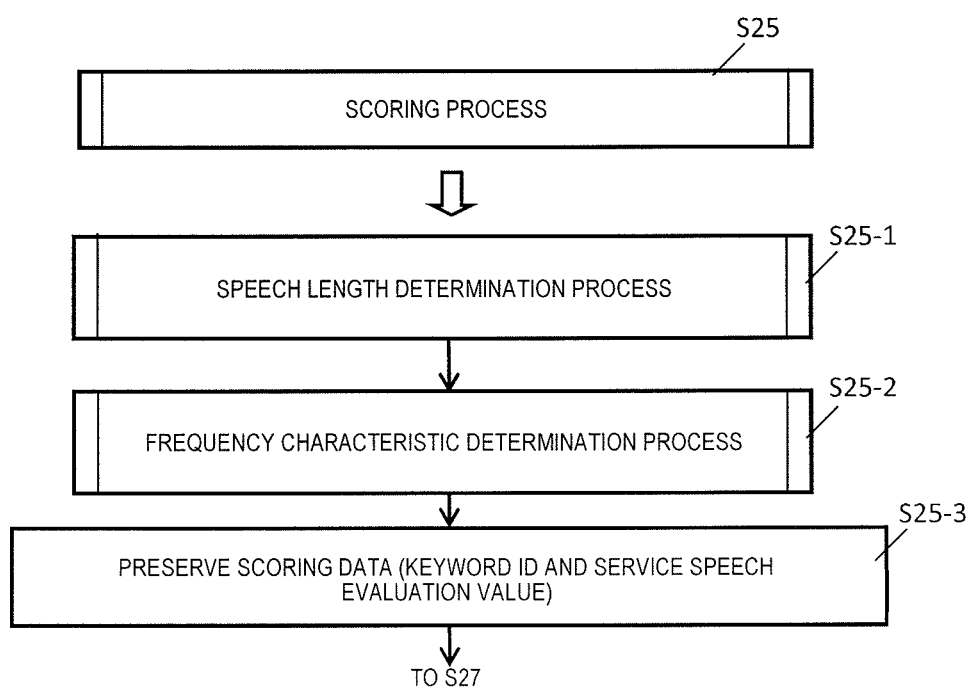
FIG. 18 is a flowchart illustrating an example of operation procedures of a scoring process.

Next, with reference to FIG. 18, a description will be made of details of operation procedures of the scoring process (refer to step S25) illustrated in FIG. 15. FIG. 18 is a flowchart illustrating an example of operation procedures of the scoring process.

In FIG. 18, service speech evaluation value calculator 332 performs a speech length determination process by using the voice data updated in step S23-7 (step S25-1), and performs a frequency characteristic determination process (step S25-2). Service speech evaluation value calculator 332 holds scoring data (specifically, a set of a keyword ID for identifying the same speech expectation keyword as a keyword detected from the voice data updated in step S23-7 and a service speech evaluation value) as results of the speech length determination process and the frequency characteristic determination process in memory 32 (step S25-3).

Figure 19A:
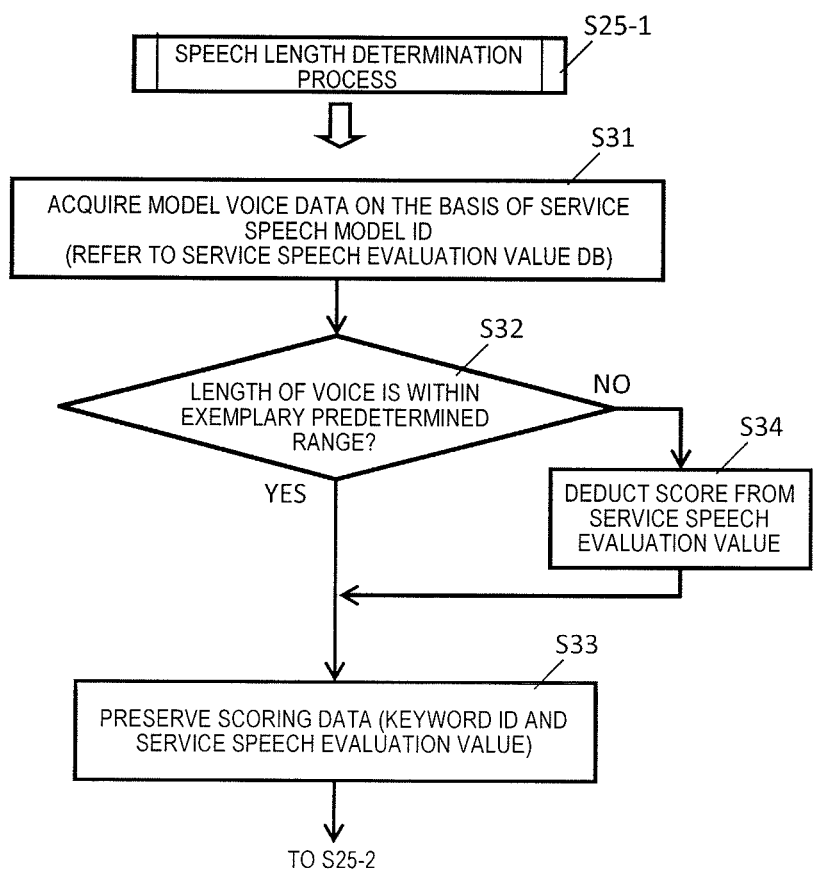
FIG. 19A is a flowchart illustrating an example of operation procedures of a speech length determination process.
Figure 19B:
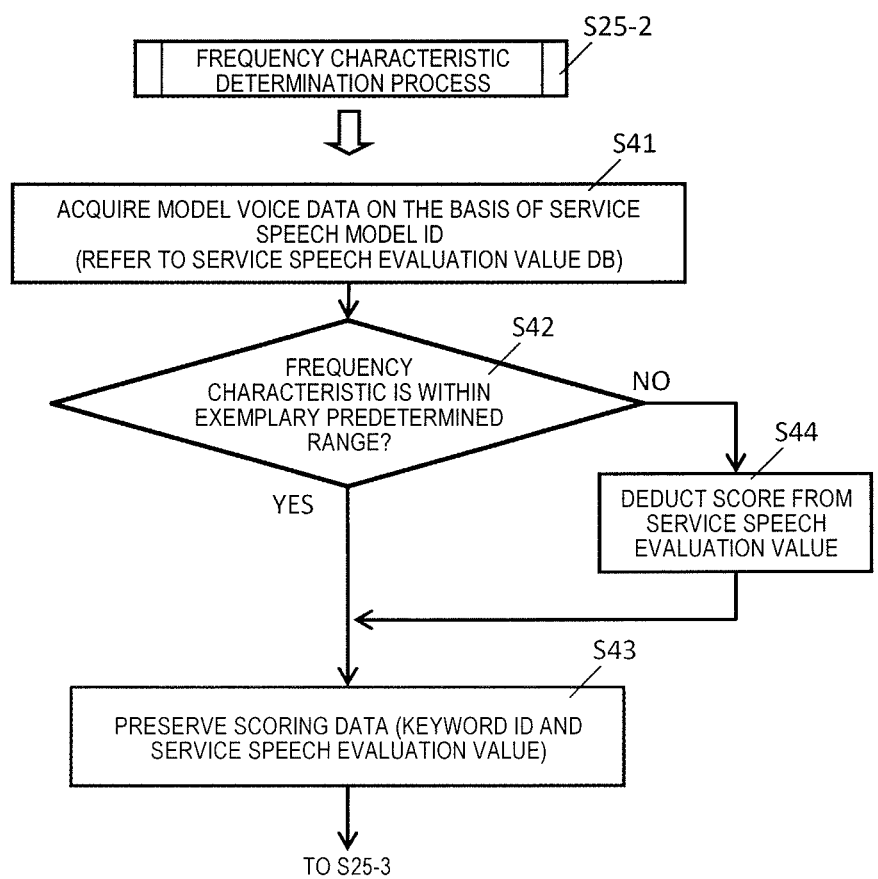
FIG. 19B is a flowchart illustrating an example of operation procedures of a frequency characteristic determination process.

Next, with reference to FIGS. 19A and 19B, a description will be made of details of operation procedures of the speech length determination process (refer to S25-1) and the frequency characteristic determination process (refer to step S25-2) illustrated in FIG. 18. FIG. 19A is a flowchart illustrating an example of operation procedures of the speech length determination process. FIG. 19B is a flowchart illustrating an example of operation procedures of the frequency characteristic determination process.

In FIG. 19A, service speech evaluation value calculator 332 acquires model voice data specified by a service speech model ID corresponding to the service event ID acquired in step S21 from management DB 2a of management server 2 by referring to the service speech evaluation DB of management DB 2a of management server 2 (step S31). The model voice data is an example of keyword voice data including voice data regarding a speech expectation keyword for each predetermined service event. Service speech evaluation value calculator 332 determines whether or not a length of the voice data (for example, a speech portion of a clerk) updated in step S23-7 is within an exemplary predetermined range (step S32).

FIG. 20 is a diagram illustrating a specific example of the speech length determination process using the model voice data. FIG. 20, in which a transverse axis expresses time, illustrates "i-ra-s-sh-a-i-ma-se ("welcome" in English)" having a voice speech length 10 within an exemplary predetermined range of "irasshaimase ("welcome" in English)" spoken in a service event of "visiting greeting", "irasshaimase ("welcome" in English)" (refer to No. 1 illustrated in FIG. 20) having a voice speech length 11 and "irasshaimase ("welcome" in English)" (refer to No. 2 illustrated in FIG. 20) having a voice speech length 12 exceeding the predetermined range.

In a case where a speech length of the voice data updated in step S23-7 exceeds the speech length (speech length 10) of the model voice data by a predetermined range (for example, 10%) (for example, refer to Nos. 1 and 2 illustrated in FIG. 20) (NO in step S32), service speech evaluation value calculator 332 deducts a predetermined score from the service speech evaluation value (step S34).

For example, in the case of No. 1 illustrated in FIG. 20, the speech length of spoken "irasshaimase ("welcome" in English)" is shorter than the speech length of "irasshaimase ("welcome" in English)" of the model voice data by a predetermined range, and, in this case, service speech evaluation value calculator 332 deducts "100×(0.910·11)/10" as a predetermined score. Here, 11 indicates a speech length of "irasshaimase ("welcome" in English)" spoken in the case of No. 1 illustrated in FIG. 20. More specifically, in a case where the speech length of "irasshaimase ("welcome" in English)" of the model voice data is 1 second, and the predetermined range is ±10% of the speech length of "irasshaimase ("welcome" in English)" of the model voice data, if the speech length of "irasshaimase ("welcome" in English)" spoken in the case of No. 1 illustrated in FIG. 20 is 0.9 seconds to 1.1 seconds, a score is not deducted, but if the speech length thereof is, for example, 0.7 seconds, 20 points (=100×(0.9×1 second·0.7 seconds)) is deducted.

For example, in the case of No. 2 illustrated in FIG. 20, the speech length of spoken "irasshaimase ("welcome" in English)" is larger than the speech length of "irasshaimase ("welcome" in English)" of the model voice data by the predetermined range, and, in this case, service speech evaluation value calculator 332 deducts "100×(12−1.110)/10" as a predetermined score. Here, 12 indicates a speech length of "irasshaimase ("welcome" in English)" spoken in the case of No. 2 illustrated in FIG. 20. More specifically, in a case where the speech length of "irasshaimase ("welcome" in English)" of the model voice data is 1 second, and the predetermined range is ±10% of the speech length of "irasshaimase ("welcome" in English)" of the model voice data, if the speech length of "irasshaimase ("welcome" in English)" spoken in the case of No. 2 illustrated in FIG. 20 is 0.9 seconds to 1.1 seconds, a score is not deducted, but if the speech length thereof is, for example, 1.3 seconds, 20 points (=100×(1.3 seconds−1.1×1 second)) is deducted.

On the other hand, in a case where the speech length of the voice data updated in step S23-7 does not exceed the speech length (speech length 10) of the model voice data by the predetermined range (for example, 10%) (YES in step S32), or after step S34, service speech evaluation value calculator 332 holds scoring data (specifically, a set of the keyword ID for identifying the same speech expectation keyword as a keyword detected from the voice data updated in step S23-7 and a service speech evaluation value as a result of the deduction in step S34 or corresponding to an initial value (for example, 100 points) not having undergone deduction in step S34) in memory 32 (step S33).

In FIG. 19B, service speech evaluation value calculator 332 acquires model voice data specified by a service speech model ID corresponding to the service event ID acquired in step S21 from management DB 2a of management server 2 by referring to the service speech evaluation DB of management DB 2a of management server 2 (step S41). Service speech evaluation value calculator 332 determines whether or not a frequency characteristic (for example, a frequency) of each phoneme (the pronunciation of a word) of the voice data updated in step S23-7 is within a predetermined range from a fundamental frequency of each exemplary phoneme (step S42).

Figure 21:
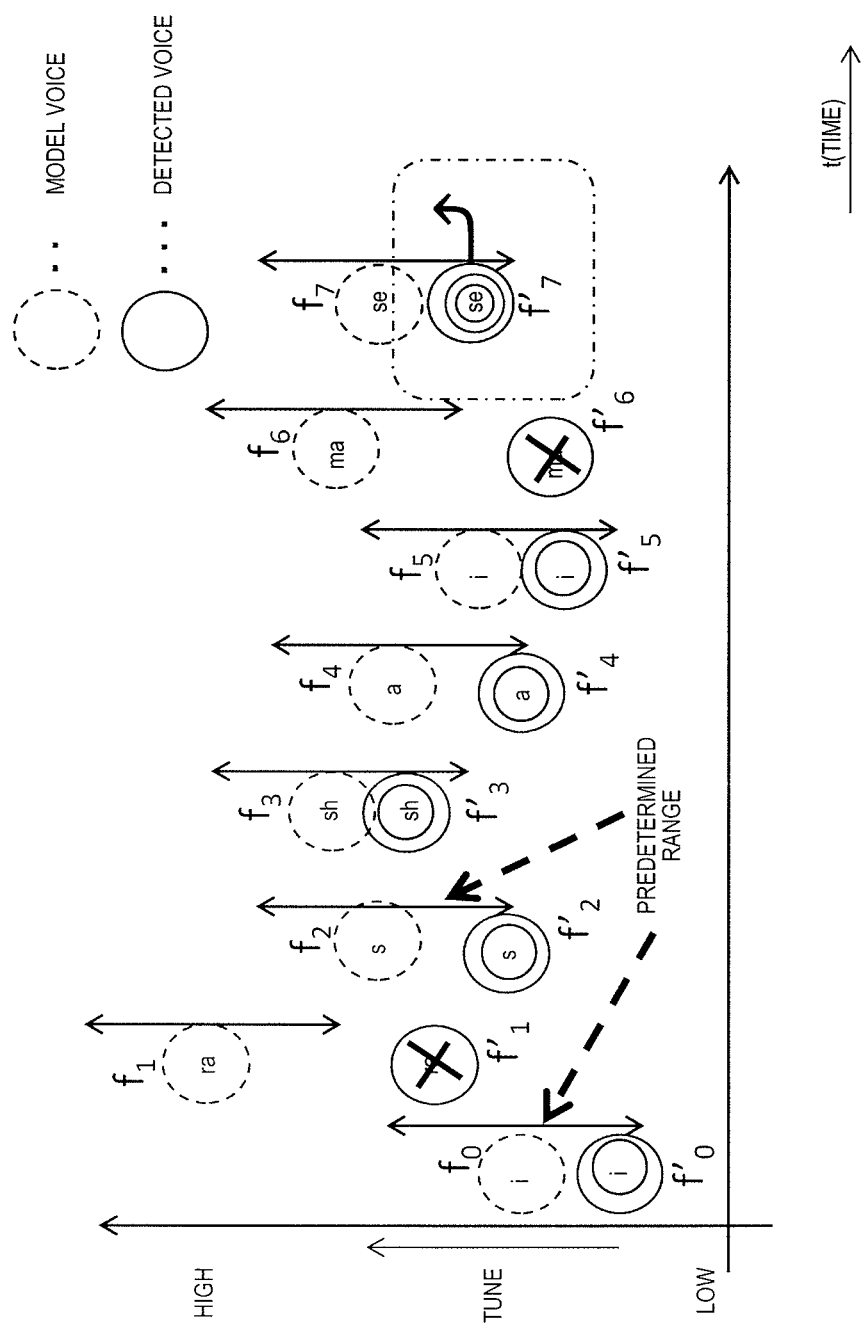
FIG. 21 is a diagram illustrating a specific example of the frequency characteristic determination process using a fundamental frequency of each phoneme of the model voice data.

FIG. 21 is a diagram illustrating a specific example of the frequency characteristic determination process using a fundamental frequency of each phoneme of model voice data. In FIG. 21, a transverse axis expresses time, dotted circles indicate fundamental frequencies f1 to f7 of respective phonemes of the model voice data, and solid circles indicate frequencies f1 to f7 of respective phonemes of the voice data updated in step S23-7. FIG. 21 illustrates a predetermined range (refer to each linear solid arrow illustrated in FIG. 21) of each of the fundamental frequencies f1 to f7 of exemplary phonemes of "irasshaimase ("welcome" in English)" spoken in a service event of "visiting greeting", for example.

In a case where it is determined that a frequency characteristic (for example, a frequency) of each phoneme of the voice data updated in step S23-7 exceeds a predetermined range (for example, 60 Hz) of the frequency characteristic of each phoneme of the model voice data (NO in step S42), service speech evaluation value calculator 332 deducts a predetermined score from the service speech evaluation value according to the number of phonemes exceeding the predetermined ranges (step S44).

For example, in the case illustrated in FIG. 21, since the frequencies f1 and f6 of the phoneme "ra" and the phoneme "ma" respectively exceed the predetermined ranges of the corresponding fundamental frequencies f1 and f6, service speech evaluation value calculator 332 deducts 5 points for each corresponding phoneme if a frequency difference (for example, |f1−f1|) is 60 Hz to 120 Hz, and deducts 10 points if the frequency difference (for example, |f1−f1|) exceeds 120 Hz. Since there is a case where the ending of a speech expectation keyword is spoken in a rising tone depending on an area or the business world (refer to a dot chain line illustrated in FIG. 21), for example, increased values of fundamental frequencies may be used for the ending of a word or predetermined several phonemes including the ending of a word.

On the other hand, in a case where it is determined that a frequency characteristic (for example, a frequency) of each phoneme of the voice data updated in step S23-7 does not exceed the predetermined range (for example, 60 Hz) of the frequency characteristic of each phoneme of the model voice data (YES in step S42), or after step S44, service speech evaluation value calculator 332 holds scoring data (specifically, a set of the keyword ID for identifying the same speech expectation keyword as a keyword detected from the voice data updated in step S23-7 and a service speech evaluation value as a result of the deduction in step S44 or corresponding to an initial value (for example, 100 points) not having undergone deduction in step S44) in memory 32 (step S43).

FIG. 22A is a diagram illustrating an example of a speech expectation keyword table forming a part of the service speech evaluation DB. FIG. 22B is a diagram illustrating an example of a service speech model list forming a part of the service speech evaluation DB.

The speech expectation keyword table illustrated in FIG. 22A defines, data corresponding to each item of a service event ID, a service event name, a keyword ID, a speech expectation keyword, and a service speech model ID. The keyword ID is used to identify a speech expectation keyword. The service speech model ID is correlated with model voice data as illustrated in FIG. 22B. As illustrated in FIG. 22A, one or more speech expectation keywords corresponding to a single service speech model ID may be defined (refer to the record of the service event ID "EID2" illustrated in FIG. 22A).

Next, with reference to FIG. 23, a description will be made of operation procedures of a service situation DB viewing process or correction process in service monitoring systems 100, 100A, 100B and 100C of the present embodiment. FIG. 23 is a flowchart illustrating an example of operation procedures of a viewing process or a service speech evaluation value correction process performed by a restricted viewer.

In FIG. 23, for example, login screen WD1 (refer to FIG. 27) to a service situation viewing screen displayed on display device 35, a login ID and a password are entered through an input operation (for example, a touch operation using finger FG) performed by a person making a request for viewing the service situation DB ("viewing request person"), and login button LGI is pressed (step S51). Service evaluation apparatus 3 acquires an access authority, an authority level, and a password on the basis of the information (specifically, the password entered on login screen WD1 illustrated in FIG. 27) entered by the viewing request person by referring to a viewer DB (refer to FIG. 26A) of management DB 2a of management server 2 (step S51). FIG. 26A is a diagram illustrating an example of the viewer DB. FIG. 26B is a diagram illustrating an example of an attendant DB.

The viewer DB illustrated in FIG. 26A defines the type and a category of data for each item of a viewer ID, a password, a viewer authority, and an authority level. As the viewer authority, two types of authorities such as an authority allowing both of a viewing operation and a correction operation to be performed, and an authority allowing only the viewing operation to be performed are defined. The password may be an actually entered password, and may be hash values (digest) for an entered password.

The attendant DB illustrated in FIG. 26B defines the type and a category of data for each item of an attendant ID indicating identification information of a clerk, a store ID indicating identification information of a store, and a clerk name.

Figure 27:
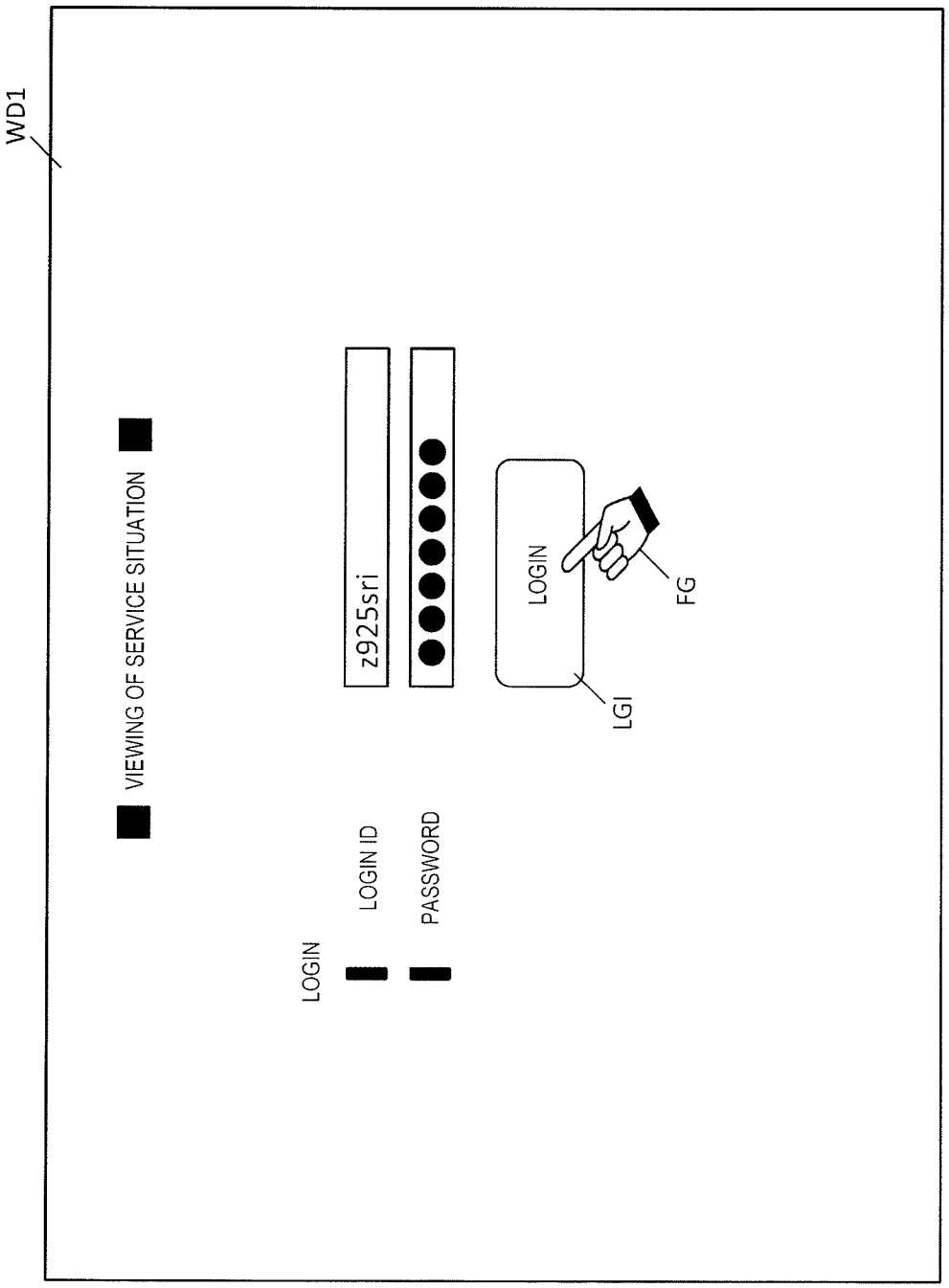
FIG. 27 is a diagram illustrating an example of a login screen to the service situation DB which is a viewing target in the service monitoring system.

FIG. 27 is a diagram illustrating an example of a login screen to the service situation DB which is a viewing target in the service monitoring system, in step S51, service evaluation apparatus 3 determines whether or not the viewing request person having entered the information on the login screen has an access authority for a viewing operation defined in the viewer DB, and the passwords matches each other (step S52). In a case where it is determined that there is no access authority for the viewing operation or the passwords do not match each other (NO in step S52), the process in service evaluation apparatus 3 illustrated in FIG. 23 is finished.

On the other hand, in a case where it is determined that the viewing request person has an access authority for the viewing operation defined in the viewer DB, and the passwords match each other (YES in step S52), service evaluation apparatus 3 accesses the service situation DB of management DB 2a of management server 2, and displays, for example, results of collecting service speech evaluation values of all clerks for customers (visitors) on the daily basis, as service situation display screen WD2 on display device 35 (refer to FIG. 28) (step S53).

Figure 28:
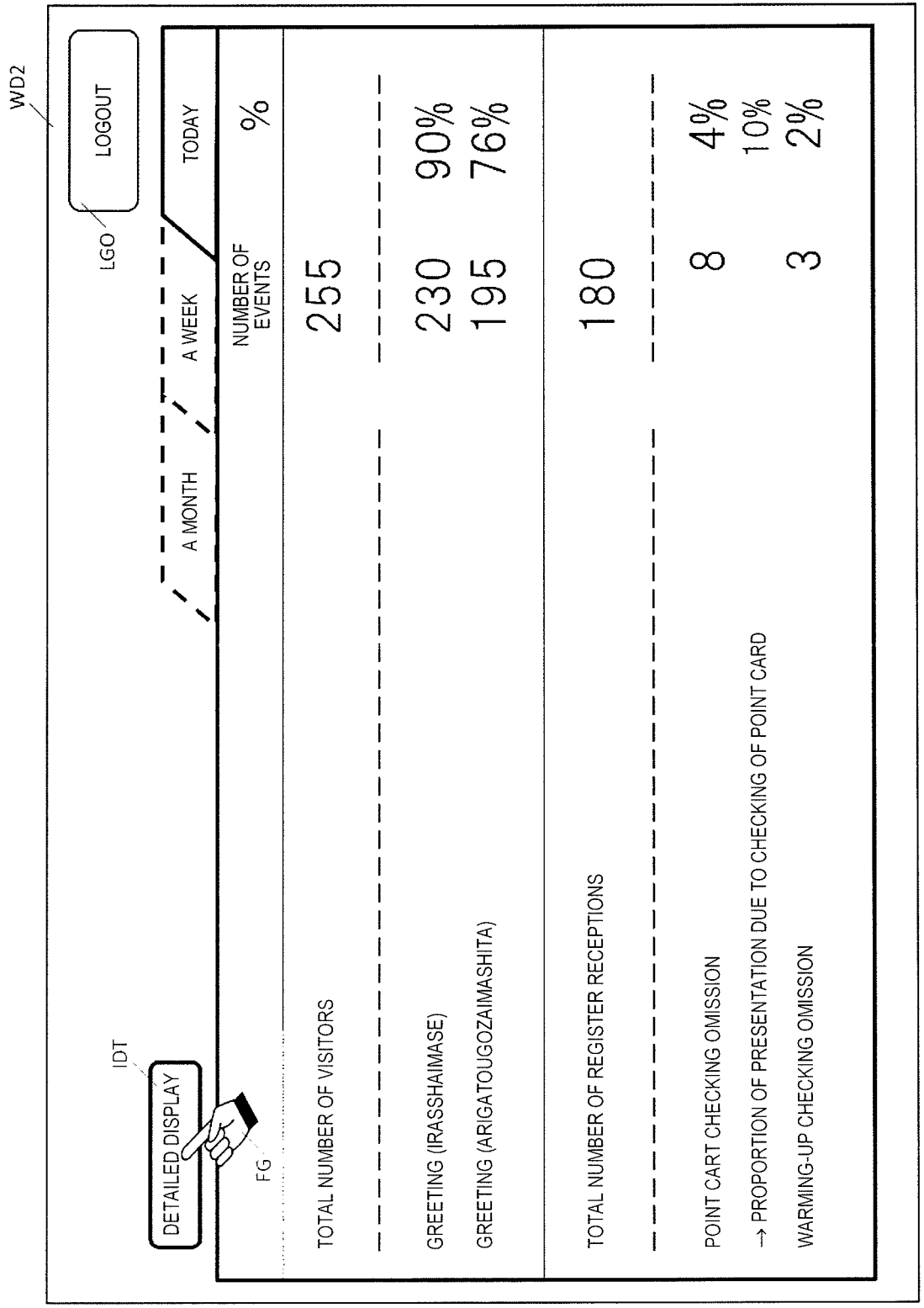
FIG. 28 is a diagram illustrating an example of results of collecting service speech evaluation values of all attendants for visitors on the daily basis, as a service situation display screen.

FIG. 28 is a diagram illustrating examples of results of collecting service speech evaluation values of all attendants for visitors on the daily basis, as service situation display screen WD2. FIG. 28 shows that the number of service events detected for visited customers is 255, the number of events in which speech of the speech expectation keyword "irasshaimase ("welcome" in English)" among service events of visiting greeting is performed is 230 whose proportion to the total number of events of 255 is 90%, and the number of events in which speech of the speech expectation keyword "arigatougozaimashita" ("thank you" in English)" among service events of leaving greeting is performed is 195 whose proportion to the total number of events of 255 is 76%.

FIG. 28 shows that the number of service events detected in relation to register reception for visited customers is 180, the number of point card checking omissions (that is, a service event for prompting presentation of a point card is not detected) is 8 whose proportion to the total number "180" is 4%, a presentation proportion of customers presenting point cards when a clerk checks point cards is 10%, and the number of warming-up checking omissions (that is, a service event for checking whether or not a lunch box is warmed up with a microwave oven is not detected) is 3 whose proportion to the total number "180" is 2%.

Output 34 of service evaluation apparatus 3 may collect data of each item illustrated in FIG. 28 on the weekly basis or monthly basis instead of the daily basis so as to display the data again, in response to a predetermined input operation.

In a case where logout button LGO is selected through a touch operation with finger FG of a user (a person having an authority level for the viewing operation) on service situation display screen WD2 illustrated in FIG. 28 (YES in step S54), output 34 of service evaluation apparatus 3 closes all viewing screens displayed on display device 35 (step S55). On the other hand, in a case where logout button LGO is not selected (NO in step S54), and it is determined that detailed display button IDT on service situation display screen WD2 illustrated in FIG. 28 is selected, and there is a corresponding access authority (authority level L1 allowing the correction operation to be performed) (YES in step S56), output 34 of service evaluation apparatus 3 changes service situation display screen WD2 illustrated in FIG. 28 to detailed display screen WD7 illustrated in FIG. 32 which is then displayed on display device 35 (step S57). After step S57, service evaluation apparatus 3 performs a service speech evaluation value correction process (step S58). FIG. 32 is a diagram illustrating a specific example of each record displayed on detailed display screen WD7 of the service situation DB.

On the other hand, in a case where detailed display button IDT of service situation display screen WD2 is not selected, there is no corresponding access authority, or after step S58, the process in service evaluation apparatus 3 illustrated in FIG. 23 returns to step S54.

Figure 25:
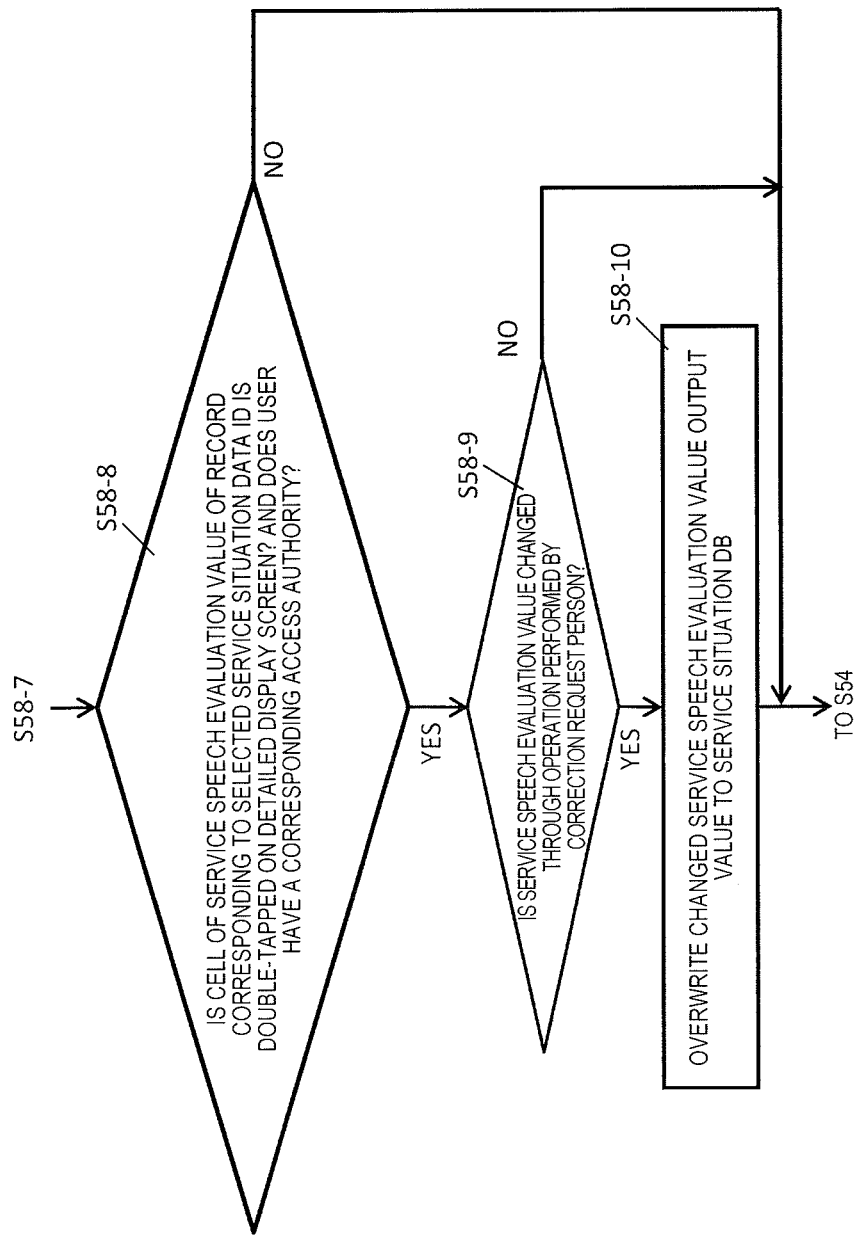
FIG. 25 is a flowchart continuously illustrating the detailed operation procedures of the service speech evaluation value correction process illustrated in FIG. 24.

Next, with reference to FIGS. 24 and 25, a description will be made of details of service speech evaluation value correction process (refer to step S58) illustrated in FIG. 23. FIG. 24 is a flowchart illustrating an example of detailed operation procedures of the service speech evaluation value correction process. FIG. 25 is a flowchart continuously illustrating the detailed operation procedures of the service speech evaluation value correction process illustrated in FIG. 24.

In FIG. 24, record RC1 of a service situation data ID (refer to FIG. 33) which is desired to be corrected by, for example, a user (a person making a request for correction) is designated with finger FG of the user in a state in which detailed display screen WD7 illustrated in FIG. 32 is displayed on display device 35 (step S58-1). FIG. 33 is a diagram illustrating an example of an operation of correcting a service speech evaluation value in specific record RC1 displayed on detailed display screen WD7 of the service situation DB.

Service speech evaluator 33 of service evaluation apparatus 3 accesses the service situation DB of management DB 2a of management server 2 via output 34, extracts an event starting time and an event ending time corresponding to the service event ID designated in step S58-1, acquires video data and voice data corresponding to the event starting time and the event ending time from recorder 4, and sends the data to output 34 (step S58-2).

Figure 35:
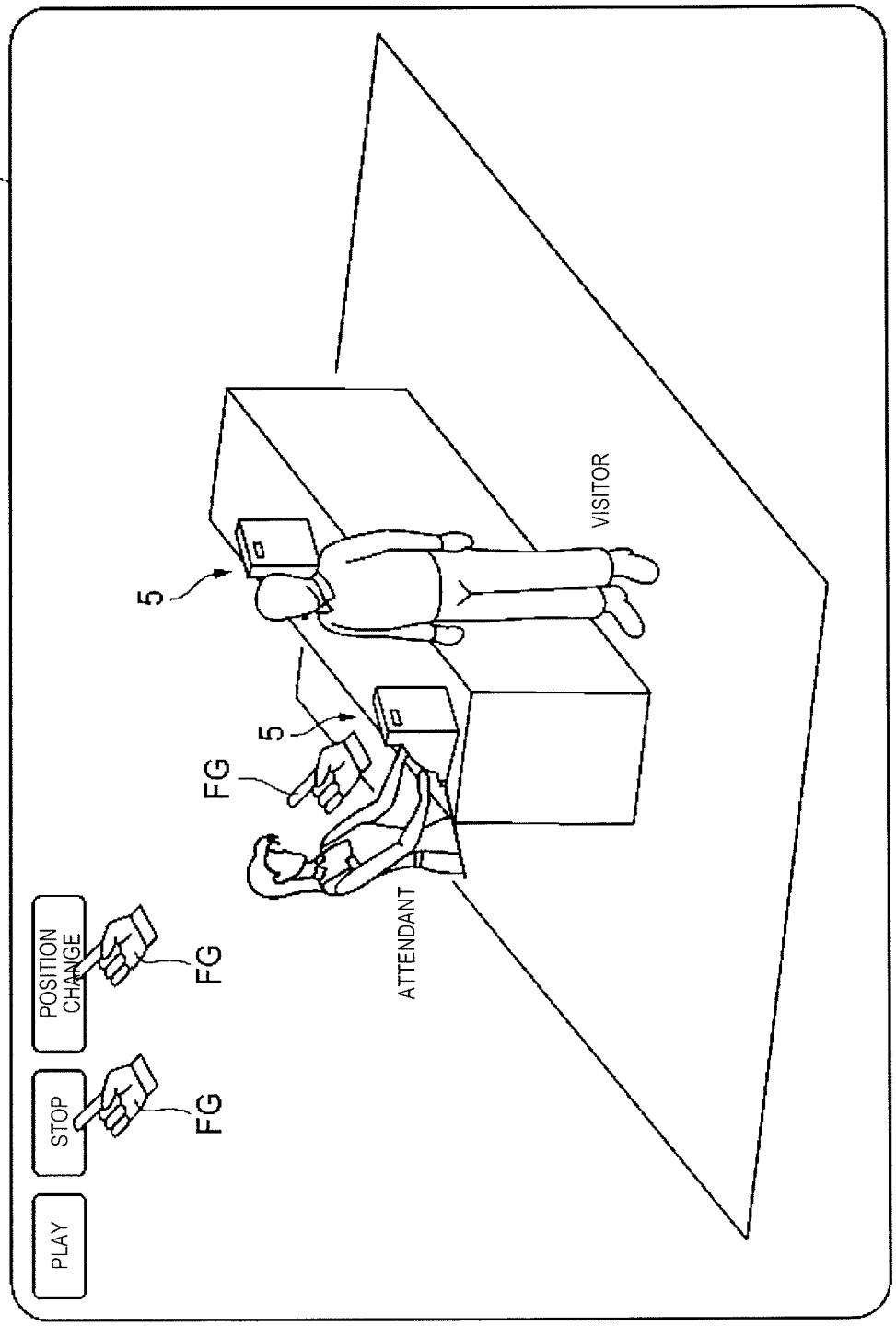
FIG. 35 is a diagram illustrating an example of an operation of correcting a service position on a service situation preview screen.

Output 34 changes detailed display screen WD7 to service situation preview screen WD8 illustrated in FIG. 35 which is then displayed on display device 35, and outputs the voice data from speaker 36 while outputting (reproducing) the acquired video data on display device 35 (step S58-2). FIG. 35 is a diagram illustrating an example of an operation of correcting a service position on the service situation preview screen.

In service monitoring system 100C illustrated in FIG. 5, service speech evaluator 33 acquires data regarding an attendant position corresponding to the service situation data ID from the service situation DB, and sends the data to directivity controller 37 along with voice data. Directivity controller 37 forms the directivity of a voice in a direction from a microphone array which collects a voice of a clerk having the attendant ID corresponding to the service situation data ID toward the clerk by using the voice data and the data regarding the attendant position, and sends the directivity to output 34 (step S58-2).

After step S58-2, service speech evaluator 33 determines whether or not a position change button on service situation preview screen WD8 is in an active state of being selectable, a stop button on service situation preview screen WD8 illustrated in FIG. 35 is selected with finger FG of the user (correction request person), and the user (correction request person) has a corresponding access authority (the authority level L1 allowing the correction operation to be performed) (step S58-3). In service monitoring systems 100, 100A and 100B illustrated in FIGS. 2 to 4 other than service monitoring system 100C illustrated in FIG. 5, the microphone array is not used, and thus the position change button on service situation preview screen WD8 illustrated in FIG. 35 is in an unselectable state (inactive state).

In a case where the position change button on service situation preview screen WD8 is in an inactive state, if the stop button on service situation preview screen WD8 is not selected with finger FG of the user (correction request person), or the user (correction request person) does not have the corresponding access authority, the process proceeds to step S58-8 (refer to FIG. 25).

On the other hand, in a case where it is determined that the position change button on service situation preview screen WD8 is in an active state of being selectable, the stop button on service situation preview screen WD8 is selected with finger FG of the user (correction request person), and the user (correction request person) has the corresponding access authority (authority level L1 allowing the correction operation to be performed) (YES in step S58-3), if a directive direction is designated with finger FG of the user (correction request person) on service situation preview screen WD8 (step S58-4), directivity controller 37 changes a directive direction in order to form the directivity of a voice in the direction designated in step S58-4 (step S58-5). Output 34 outputs voice data after the directivity whose direction is changed is formed, from speaker 36. The voice data is recognized by the user (correction request person) (step S58-5).

If the position change button on service situation preview screen WD8 is selected with finger FG of the user (correction request person) (YES in step S58-6), service speech evaluator 33 changes the attendant information on detailed display screen WD7 illustrated in FIG. 32 to coordinates (that is, coordinates indicating a position on the screen displayed on display device 35) indicating a position of the directive direction designated in step S58-4, so as to display the coordinates on display device 35, and changes (corrects) and overwrites an attendant position of a corresponding record of the service situation DB (step S58-7; refer to FIG. 36). FIG. 36 is a diagram illustrating an example of coordinates of a service position after the specific record displayed on the detailed display screen of the service situation DB is corrected. FIG. 36 shows that, for example, cell CL2 of any coordinates (that is, coordinates indicating the designated position on the screen of display device 35 whose directive direction is changed) of the attendant position (not preset) of the record corresponding to the service situation ID data "4" is changed.

On the other hand, in a case where the position change button on service situation preview screen, WD8 is not selected with finger FG of the user (correction request person) (NO in step S58-6), the service speech evaluation value correction process illustrated in FIG. 24 returns to step S58-4.

After step S58-7, in FIG. 25, service speech evaluator 33 determines whether or not cell CL1 (refer to FIG. 34) of the service speech evaluation value of the record corresponding to the service situation data ID (refer to step S58-1) selected with finger FG of the user (correction request person) is double-tapped on detailed display screen WD7 (refer to FIG. 32) displayed on display device 35, and the user has a corresponding access authority (authority level L1 allowing the correction operation to be performed) (step S58-8). FIG. 34 is a diagram illustrating an example of a service speech evaluation value after the specific record displayed on detailed display screen WD7 of the service situation DB is corrected.

In a case where cell CL1 of the service speech evaluation value of the record corresponding to the service situation data ID selected with finger FG of the user (correction request person) is not double-tapped on detailed display screen WD7, or the user does not have a corresponding access authority (NO in step S58-8), the service speech evaluation value correction process illustrated in FIG. 25 is finished, and the process in service evaluation apparatus 3 returns to step S54.

On the other hand, in a case where it is determined that cell CL1 of the service speech evaluation value of the record corresponding to the service situation data ID (refer to step S58-1) selected with finger FG of the user (correction request person) is double-tapped on detailed display screen WD7 (refer to FIG. 32), and the user has a corresponding access authority (authority level L1 allowing the correction operation to be performed) (YES in step S58-8), for example, if the service speech evaluation value in double-tapped cell CL1 is corrected (changed) through an operation using finger FG of the correction request person (YES in step S58-9), service speech evaluator 33 overwrites the corrected (changed) service speech evaluation value (refer to FIG. 34) on the service situation DB and preserves (stores) the service speech evaluation value (step S58-10).

In a case where the service speech evaluation value in double-tapped cell CL1 is not corrected (changed) through an operation using finger FG of the correction request person (NO in step S58-9), the service speech evaluation value correction process illustrated in FIG. 25 is finished, and the process in service evaluation apparatus 3 returns to step S54.

Figure 29:
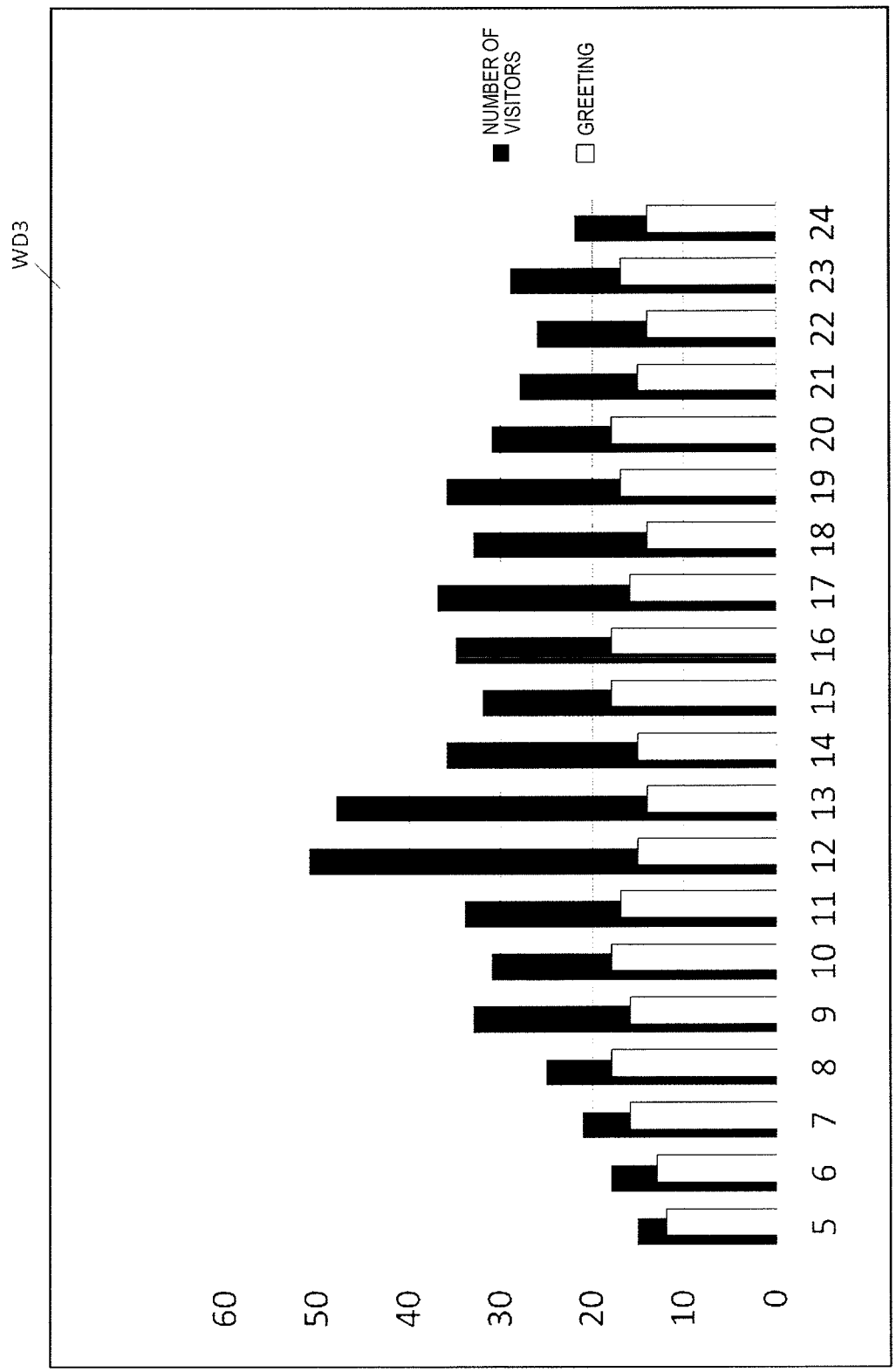
FIG. 29 is a diagram illustrating an example of results of collecting service speech evaluation values of all attendants for visitors in a period of time of a day.
Figure 30A:
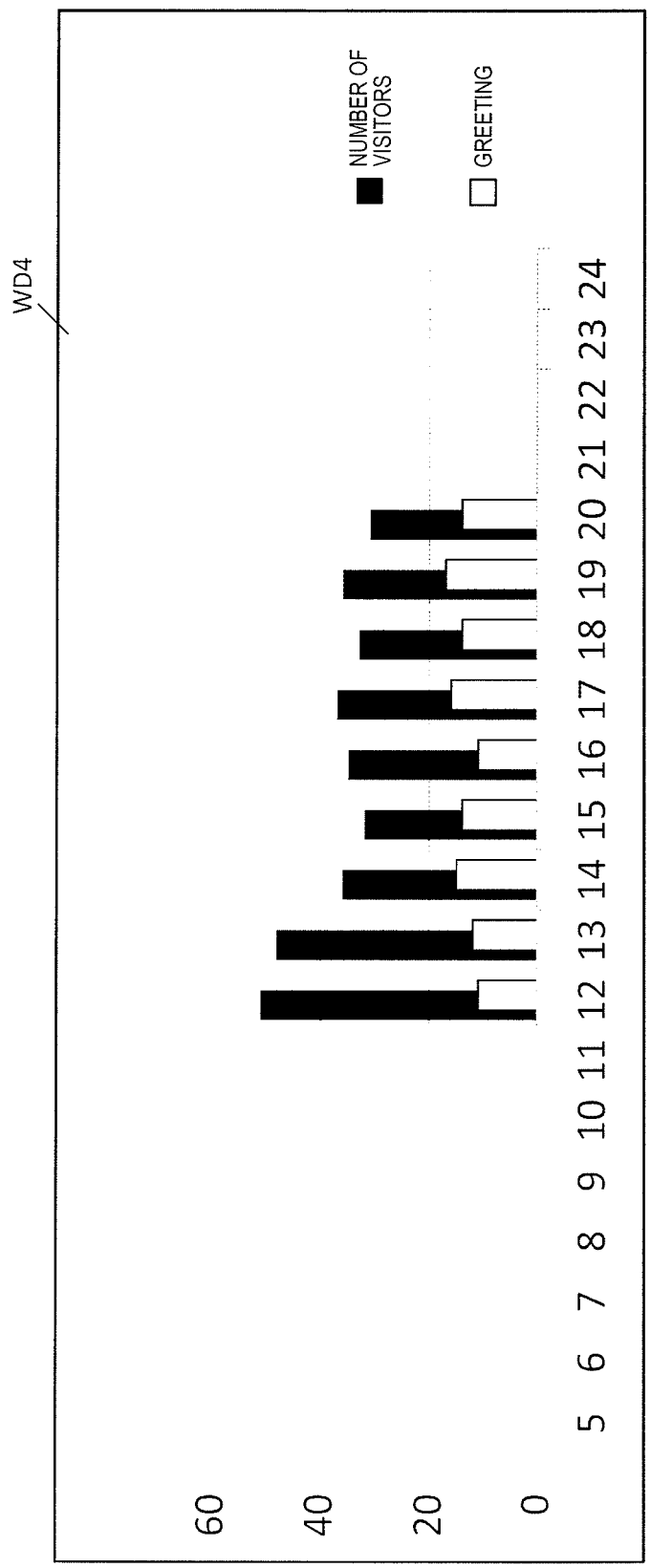
FIG. 30A is a diagram illustrating an example of results of collecting service speech evaluation values of a single attendant in each period of time of a day.

FIG. 29 is a diagram illustrating an example of results of collecting service speech evaluation values of all attendants for visitors in a period of time of a day. FIG. 30A is a diagram illustrating an example of results of collecting service speech evaluation values of a single attendant in each period of time of a day. FIG. 30B is a diagram illustrating an example of results of collecting service speech evaluation values of each attendant for a day. FIG. 31 is a diagram illustrating an example of results of collecting service speech evaluation values of each store for a day.

Output 34 of service evaluation apparatus 3 may change service situation display screen WD2 illustrated in FIG. 28 to service situation display screen WD3 illustrated in FIG. 29 which is then displayed on display device 35, in response to a predetermined input operation performed by a user (that is, a person having at least authority level L1 illustrated in FIG. 26A). In FIG. 29, a transverse axis expresses time points of a day, and a longitudinal axis expresses the number of visitors (customers) (refer to black bars) and the number of clerks having greeted the customers (in other words, the number of the service event name "visiting greeting" being performed appropriately by the clerks; refer to white bars).

Output 34 of service evaluation apparatus 3 may change service situation display screen WD3 illustrated in FIG. 29 to service situation display screen WD4 restricted to specific periods of time as illustrated in FIG. 30A, and may display the screen on display device 35, in response to a predetermined input operation performed by a user (that is, a person having at least authority level L1 illustrated in FIG. 26A). In FIG. 30A, a transverse axis expresses time points of a day, and a longitudinal axis expresses the number of visitors (customers) (refer to black bars) and the number of clerks having greeted the customers (in other words, the number of the service event name "visiting greeting" being performed appropriately by the clerks; refer to white bars).

Output 34 of service evaluation apparatus 3 may change service situation display screen WD2 illustrated in FIG. 28 to service situation display screen WD5 illustrated in FIG. 30B which is then displayed on display device 35, in response to a predetermined input operation performed by a user (that is, a person having at least authority level L1 illustrated in FIG. 26A). FIG. 30B shows a greeting proportion, an average score, and the number of register reception people for each of clerks (for example, four people) on the daily basis in a comparison manner. Output 34 of service evaluation apparatus 3 may collect data of each item illustrated in FIG. 30B on the weekly basis or monthly basis instead of the daily basis so as to display the data again, in response to a predetermined input operation.

Output 34 of service evaluation apparatus 3 may change service situation display screen WD2 illustrated in FIG. 28 to service situation display screen WD6 illustrated in FIG. 31 which is then displayed on display device 35, in response to a predetermined input operation performed by a user (that is, a person having at least authority level L1 illustrated in FIG. 26A). FIG. 31 shows the number of visitors, a greeting proportion, an average score, and the number of register reception people for each of stores (for example, four stores) on the daily basis in a comparison manner. Output 34 of service evaluation apparatus 3 may collect data of each item illustrated in FIG. 31 on the weekly basis or monthly basis instead of the daily basis so as to display the data again, in response to a predetermined input operation.

As described above, service monitoring systems 100, 100A, 100B and 100C of the present embodiment detect a service event of a clerk on the basis of the service event information DB (service event data) including service event determination conditions for each predetermined service event and the POS operation history data indicating an operation history of POS terminal 5 of a clerk (employee) on POS terminal 5 (predetermined business terminal), and calculates a service speech evaluation value corresponding to a predetermined speech keyword when operating POS terminal 5 on the basis of voice data of a clerk included monitoring data 4a or monitoring data 4b. Service monitoring systems 100, 100A, 100B and 100C stores the calculated service speech evaluation value in correlation with voice data of a clerk specified by an attendant ID (identification information of a clerk), an attendant position (a service position of a clerk), and a service time point.

Consequently, service monitoring systems 100, 100A, 100B and 100C are not required to use a human resource such as a researcher unlike the related art, can widely protect privacy of a customer receiving a service, can obtain the objectivity of the service speech content of a corresponding attendant as a service speech evaluation value, by monitoring service speech of the corresponding attendant (employee) during various service events for customers in a predetermined voice collection region (for example, a store), and thus can accurately and objectively evaluate a service situation of the employee for customers.

Service monitoring systems 100, 100A, 100B and 100C omit detection of a service event of an employee in a case where data (that is, a privacy protection mark) indicating predetermined information indicating customer privacy protection is added to voice data of the employee stored in recorder 4 which is a second storage unit, and can thus more clearly protect customer privacy when a service event is detected by excluding a service event with a customer intervened.

Service monitoring systems 100, 100A, 100B and 100C further store the speech expectation keyword table (keyword data) of the service speech evaluation DB including a speech expectation keyword for each predetermined service event in management DB 2a of management server 2, set a service speech evaluation value to zero or deduct a predetermined score from a service speech evaluation value in a case where a speech expectation keyword corresponding to a service event is not included in voice data of a clerk, and can thus accurately evaluate a service situation for a clerk which has not spoken the speech expectation keyword during a service event.

Service monitoring systems 100, 100A, 100B and 100C further store the speech expectation keyword table (keyword data) of the service speech evaluation DB including a speech expectation keyword for each predetermined service event in management DB 2a of management server 2, cut out only a keyword speech portion corresponding to a speech expectation keyword from voice data of clerk so as to update and overwrite the voice data in a case where a speech expectation keyword corresponding to a service event is included in voice data of a clerk, and can thus improve the scoring process accuracy by cutting unwanted noise sound, and can also reduce the volume of voice data of a clerk. It is possible to calculate an accurate service speech evaluation value.

Service monitoring systems 100, 100A, 100B and 100C further store the service speech model list (keyword voice data) of the service speech evaluation DB including voice data of a speech expectation keyword for each predetermined service event in management DB 2a of management server 2, deduct a predetermined score from a service speech evaluation value in a case where a speech length of a speech expectation keyword of updated voice data of a clerk exceeds a predetermined range of a speech length of a speech expectation keyword of the keyword voice data, and can thus accurately evaluate a service situation of a clerk who has spoken the speech expectation keyword during a service event in a deviation manner from an exemplary speech length.

Service monitoring systems 100, 100A, 100B and 100C further store the service speech model list (keyword voice data) of the service speech evaluation DB including voice data of a speech expectation keyword for each predetermined service event in management DB 2a of management server 2, deduct a predetermined score from a service speech evaluation value in a case where a frequency of each phoneme of a speech expectation keyword of updated voice data of a clerk exceeds a predetermined range of a fundamental frequency of each phoneme of a speech expectation keyword of the keyword voice data, and can thus accurately evaluate a service situation of a clerk who has spoken the speech expectation keyword during a service event in a deviation manner from an exemplary fundamental frequency.

Service monitoring system 100A detects a service event of a clerk on the basis of voice data of each clerk collected by attendant microphones SM1, . . . , and SML worn by respective clerks, and the service event data, and can thus accurately detect a service event such as visiting greeting by clearly collecting a voice of a clerk compared with a case where a microphone (for example, a microphone installed on a ceiling surface) other than an attendant microphone is separated from a clerk.

Service monitoring systems 100B and 100C further store video data of a predefined position in a predetermined voice collection region (for example, a store) obtained through imaging in cameras C1, . . . , and CM in recorder 4 as monitoring data 4b, detect a service event of a clerk on the basis of the video data, and can thus accurately evaluate whether or not a service event of accounting start greeting is appropriately performed by performing image processing on the video data having, as the predefined position, the vicinity of POS terminal 5 at which the service event of accounting start greeting in the predetermined voice collection region (for example, a store) is performed.

Service monitoring systems 100B and 100C further store detection results of appearance or leaving of a customer at or from a predetermined voice collection region (for example, visiting or leaving of a customer to or from a store), obtained by sensor devices S1, . . . , and SN, in recorder 4 as monitoring data 4b, detect a service event of a clerk on the basis of the detection results, and can thus accurately evaluate whether or not a service event of visiting-leaving greeting is appropriately performed according to a detection result of the sensor device (for example, an automatic door which is opened and closed) which motivates the service event of visiting-leaving greeting in the predetermined voice collection region (for example, a store).

Service monitoring system 100C emphasizes a voice of a clerk (employee) when calculating a service speech evaluation value on the basis of voice data of a clerk in which the directivity of a voice is formed from any one of microphone arrays AM1, . . . , and AML in a predetermined directive direction (for example, a constant position (for example, a register counter) of the clerk (employee) during service), and can thus accurately calculate a service speech evaluation value for the clerk by improving the accuracy of calculating the service speech evaluation value compared with a case where the directivity is not formed.

Service monitoring systems 100, 100A, 100B and 100C further store an authority level (authority data) including authority information regarding a viewing operation on detailed display screen WD7 (service speech evaluation value display screen) of the service situation DB on display device 35 with respect to a service speech evaluation value for each service event, in the viewer DB of management DB 2a of management server 2, and can display the service speech evaluation value display screen on display device 35 in a case where authority information of a person (user) making a request for viewing the service speech evaluation value display screen satisfies the authority information regarding a viewing operation included in the authority data.

Service monitoring systems 100, 100A, 100B and 100C further cause authority information regarding a service speech evaluation value correction operation on detailed display screen WD7 (service speech evaluation value display screen) of the service situation DB to be included as authority data, and can update (correct) a service speech evaluation value on the service speech evaluation value display screen in response to a service speech evaluation value correction operation in a case where authority information of a person (user) making a request for correcting a service speech evaluation value satisfies authority information regarding a correction operation included in the authority data.

Service monitoring systems 100B and 100C further store video data of a predefined position in a predetermined voice collection region obtained through imaging in cameras C1, . . . , and CM in recorder 4 as monitoring data 4b, and can update (correct) a service speech evaluation value on the service speech evaluation value display screen in response to a correction operation on a service position during a service event of a clerk while video data is being output through an operation performed by a user having authority information regarding both of a viewing operation and a correction operation.

Service monitoring systems 100, 100A, 100B and 100C can display a service speech evaluation value for each service event on the service speech evaluation value display screen in a comparison manner on display device 35 in response to a predetermined input operation performed by a user having at least authority information regarding a viewing operation, and can thus easily perform comparison for each predetermined item.

Figure 39:
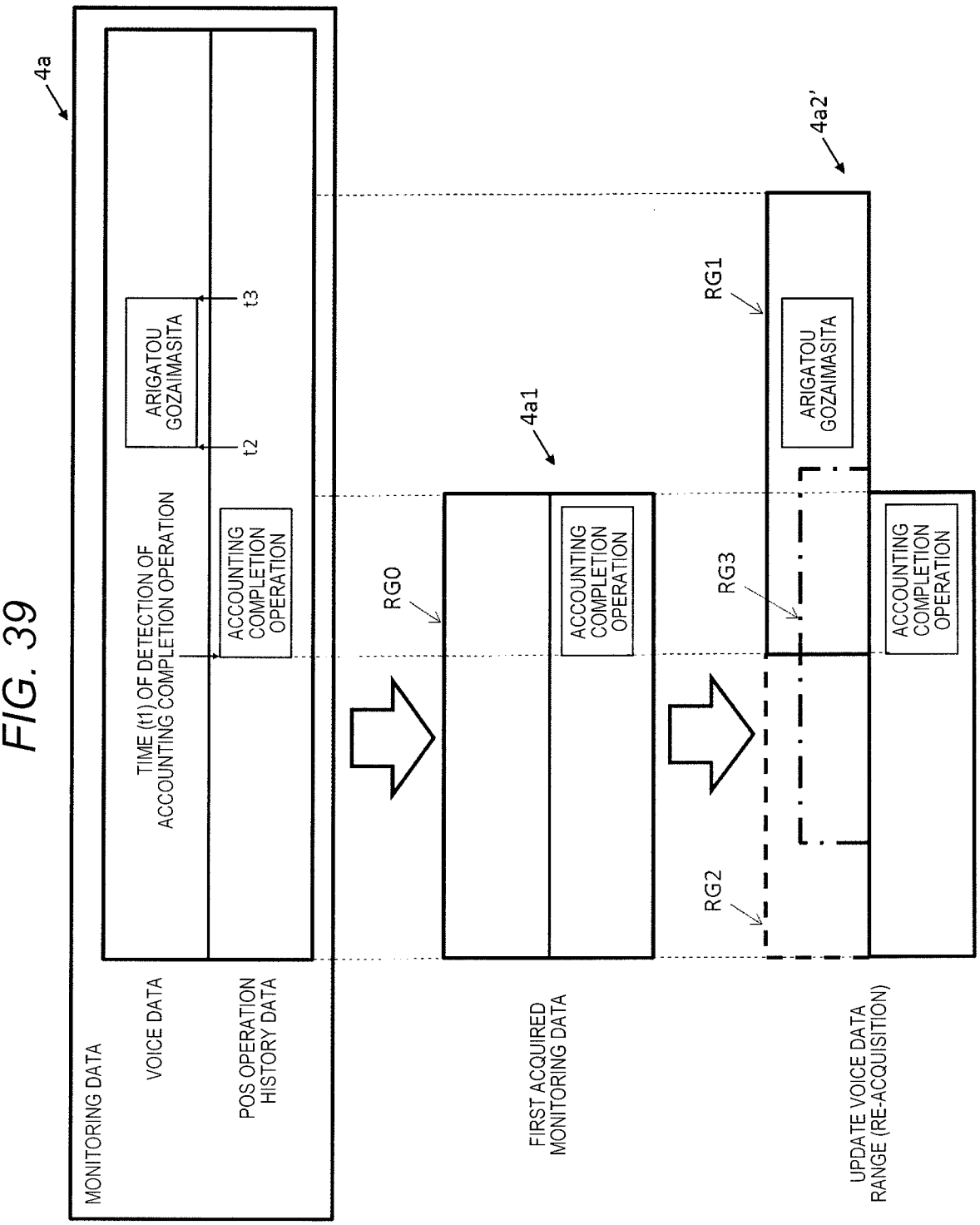
FIG. 39 is a diagram illustrating an example of a variation in a monitoring data cutout process.

In the present embodiment, the shift process in step S2 illustrated in FIG. 6 is not limited to the method of shifting a cutout starting time serving as a starting point for cutting out monitoring data 4a by predetermined period of time ts. A description will be made of a variation in the shift process with reference to FIGS. 39 to 41. FIG. 39 is a diagram illustrating an example of a variation in a cutout process on monitoring data 4a. FIG. 40 is a flowchart illustrating separate an example of detailed operation procedures of the service event information processing. FIG. 41 is a diagram illustrating an example of a speech expectation section table for each service event forming a part of the service speech evaluation DB. In the description of FIG. 40, the same process as each process illustrated in FIG. 9 is given the same step number, and a description thereof will be made briefly or omitted.

For example, in the same manner as in FIG. 38, a case is assumed in which POS operation history data indicating that an accounting completion operation occurs at a time point t1, and voice data in which a clerk speaks "arigatougozaimashita" ("thank you" in English)" between a time point t2 and a time point t3 are stored in monitoring data 4a illustrated in FIG. 39. In this case, if the shift process described with reference to FIG. 38 is used, monitoring data extractor 38 of service evaluation apparatus 3 extracts monitoring data 4a1 obtained by cutting out voice data and POS operation history data corresponding to a predetermined time interval (that is, cutout range RG0) beginning with the head of monitoring data 4a. However, in the same manner as in FIG. 38, since monitoring data 4a1 does not include voice data of the clerk corresponding to the accounting completion operation, a service event is not detected, and thus accurate service evaluation cannot be performed.

Therefore, after step S14 illustrated in FIG. 40, monitoring data extractor 38 of service evaluation apparatus 3 acquires information regarding a speech expectation section corresponding to a service event ID by referring to the speech expectation section table illustrated in FIG. 41, and changes a range of voice data to be cut out from monitoring data 4a1 so as to re-acquire monitoring data 4a2' (step S14-1 illustrated in FIG. 40). Processes in step S14-1 and the subsequent steps are the same as the processes in step S15 and the subsequent steps illustrated in FIG. 9, and thus a description thereof will be omitted.

Here, step S14-1 will be described in detail with reference to FIG. 41. In the speech expectation section table illustrated in FIG. 41, a service event ID, a service event name, and a speech expectation section are correlated with each other. For example, in a case of "accounting completion greeting" corresponding to the service event ID "EID1", if a clerk speaks words, an expected section is a period of time of 10 seconds from the time at which the service event (that is, accounting completion greeting) is detected. Therefore, monitoring data extractor 38 of service evaluation apparatus 3 changes a cutout starting time serving as a starting point for cutting out voice data of monitoring data 4a to the time point t1 at which the service event (for example, accounting completion greeting) is detected on the basis of the service event ID, and re-acquires voice data for 10 seconds from the time point t1 as voice data in cutout range RG1. Consequently, monitoring data extractor 38 of service evaluation apparatus 3 updates monitoring data 4a1 acquired for the first time to monitoring data 4a2', and thus voice data corresponding to a section of a voice spoken by a clerk during the service event can be obtained so that the service event detection efficiency is improved.

As illustrated in FIG. 41, a voice data cutout range differs for each service event, and, in a case of "accounting start greeting" corresponding to the service event ID "EID2", the cutout range is a total of 10 seconds ranging over 5 seconds before and after the time as a starting point at which the service event (that is, accounting start greeting) is detected (for example, refer to cutout range RG3 illustrated in FIG. 39).

In a case of "visiting greeting" corresponding to the service event ID "EID3", a voice data cutout range is a period of time of 10 seconds from the time at which the service event (that is, visiting greeting) is detected in the same manner as in "accounting completion greeting" corresponding to the service event ID "EID1". In a case of "leaving greeting" corresponding to the service event ID "EID4", a voice data cutout range is a period of time of 10 seconds before the time at which the service event (that is, leaving greeting) is detected (for example, refer to cutout range RG2 illustrated in FIG. 39).

Consequently, monitoring data extractor 38 of service evaluation apparatus 3 can hold information regarding an expected voice section as the speech expectation section table if a voice spoken by a clerk during a service event corresponding to a detected service event ID is included, and can cut out and extract voice data of an optimal voice section spoken by a clerk for each service event as monitoring data by using the table, so as to perform accurate service evaluation.

As mentioned above, various embodiments have been described with reference to the drawings, but, needless to say, the present disclosure is not limited to these embodiments. It is clear that a person skilled in the art can conceive of various modifications or alterations within the scope disclosed in the claims, and it is understood that they are also naturally included in the technical scope of the present disclosure.

INDUSTRIAL APPLICABILITY

The present disclosure is useful as a service monitoring system and a service monitoring method, capable of widely protecting privacy of a customer without using a human resource such as a researcher, and accurately and objectively evaluating a service situation by monitoring the speech content of a corresponding attendant in various service events for customers in a store.

REFERENCE MARKS IN THE DRAWINGS

2 MANAGEMENT SERVER
2a MANAGEMENT DB
3, 3C SERVICE EVALUATION APPARATUS
4 RECORDER
4a, 4b MONITORING DATA
5 POS TERMINAL
31 CONSOLE
32, 53 MEMORY
33 SERVICE SPEECH EVALUATOR
34 OUTPUT
35, 52 DISPLAY DEVICE
36 SPEAKER
37 DIRECTIVITY CONTROLLER
51 INPUT DEVICE
331 SERVICE EVENT DETECTOR
332 SERVICE SPEECH EVALUATION VALUE CALCULATOR
100, 100A, 100B, 100C SERVICE MONITORING SYSTEM
AM1, AML MICROPHONE ARRAY
C1, CM CAMERA
M1, ML MICROPHONE
S1, SN SENSOR DEVICE
SM1, SML ATTENDANT MICROPHONE

The invention claimed is:
1. A service monitoring system comprising:
a microphone that collects a voice of an employee in a predetermined voice collection region;
a camera that images a predefined position in the predetermined voice collection region,
a first memory that stores service event data including determination conditions for each predetermined service event;
a second memory that stores
terminal operation history data indicating an operation history of a predetermined business terminal, and
voice data of the employee collected by the microphone in correlation with the operation history;
a computer including a processor that:
detects an occurrence of a predetermined service event based on a detection of a predetermined operation by the predetermined business terminal within the terminal operation history data stored in the second memory in view of the service event data stored in the first memory,
identifies target voice data of the employee that is captured during the predetermined operation by the predetermined business terminal from the voice data of the employee stored in the second memory, and
calculates a service speech evaluation value of the employee based on whether or not a predetermined speech keyword was included in the target voice data; and
an output that stores the service speech evaluation value calculated in correlation with identification information of the employee, and voice data of the employee specified by a service position and a service time point of the employee,
wherein the computer is physically separate from the predetermined business terminal,
wherein the predetermined operation includes a physical operation of the predetermined business terminal,
wherein the second memory further stores video data of the predefined position in the predetermined voice collection region, obtained through imaging in the camera, and
wherein the output updates the service speech evaluation value on a service speech evaluation value display screen in response to a correction operation on a service position during a service event of the employee detected by the processor while the video data of the predefined position in the predetermined voice collection region stored in the second memory is being output.

2. The service monitoring system of claim 1,
wherein the processor omits detection of the service event of the employee in a case where information indicating customer privacy protection is included in the voice data of the employee stored in the second memory.

3. The service monitoring system of claim 1,
wherein the first memory further stores keyword data including a speech expectation keyword for each predetermined service event, and
wherein the processor sets the service speech evaluation value to zero or deducts a predetermined score from the service speech evaluation value in a case where the speech expectation keyword corresponding to the service event detected is not included in the voice data of the employee stored in the second memory.

4. The service monitoring system of claim 1,
wherein the first memory further stores keyword data including a speech expectation keyword for each predetermined service event, and
wherein the processor updates the voice data of the employee stored in the second memory to voice data of the speech expectation keyword in a case where the speech expectation keyword corresponding to the service event detected is included in the voice data of the employee stored in the second memory.

5. The service monitoring system of claim 4,
wherein the first memory further stores keyword voice data including voice data of a speech expectation keyword for each predetermined service event, and
wherein the processor deducts a predetermined score from the service speech evaluation value in a case where a speech length of the speech expectation keyword of updated voice data of the employee exceeds a first predetermined range of a speech length of the speech expectation keyword of the keyword voice data stored in the first memory.

6. The service monitoring system of claim 4,
wherein the first memory further stores keyword voice data including voice data of a speech expectation keyword for each predetermined service event, and
wherein the processor deducts a predetermined score from the service speech evaluation value in a case where a frequency of each phoneme of the speech expectation keyword of updated voice data of the employee exceeds a second predetermined range of a fundamental frequency of each phoneme of the speech expectation keyword of the keyword voice data stored in the first memory.

7. The service monitoring system of claim 1,
wherein the microphone is worn by the employee, and
wherein the processor further detects the service event of the employee on the basis of the service event data stored in the first memory and voice data of the employee collected by the microphone.

8. The service monitoring system of claim 1,
wherein the processor detects the service event of the employee on the basis of the video data of the predefined position in the predetermined voice collection region, stored in the second memory.

9. The service monitoring system of claim 8, further comprising:
a customer sensor that detects appearance or leaving of a customer at or from the predetermined voice collection region,
wherein the second memory further stores detection results of appearance or leaving of the customer in the customer sensor, and
wherein the processor detects the service event of the employee on the basis of the detection results of appearance or leaving of the customer in the customer sensor.

10. The service monitoring system of claim 8, further comprising:
a directivity controller that forms the directivity of a voice in a predetermined directive direction from the microphone on the basis of the voice data of the employee stored in the second memory,
wherein the processor calculates the service speech evaluation value on the basis of voice data of the employee in which the directivity of the voice is formed by the directivity controller.

11. The service monitoring system of claim 1,
wherein the first memory further store authority data including authority information regarding a viewing operation on the service speech evaluation value display screen on a display device with respect to the service speech evaluation value calculated by the processor for each service event, and
wherein the output displays the service speech evaluation value display screen on the display device in a case where authority information of a person making a request for viewing the service speech evaluation value display screen satisfies the authority information regarding the viewing operation included in the authority data stored in the first memory.

12. The service monitoring system of claim 11,
wherein the authority data includes authority information regarding a service speech evaluation value correction operation on the service speech evaluation value display screen, and
wherein the output updates the service speech evaluation value on the service speech evaluation value display screen in response to the service speech evaluation value correction operation in a case where authority information of a person making a request for correcting the service speech evaluation value satisfies the authority information regarding the correction operation included in the authority data stored in the first memory.

13. The service monitoring system of claim 11,
wherein the output displays the service speech evaluation value for each service event on the service speech evaluation value display screen in a comparison manner on the display device for each predetermined item in response to a predetermined input operation.

14. The service monitoring system of claim 1, further comprising:
a voice data extractor that extracts the voice data of the employee stored in the second memory,
wherein the first memory stores information regarding a speech expectation section expected to be spoken by the employee for each service event, and
wherein the voice data extractor extracts voice data of the employee corresponding to the speech expectation section associated with the service event detected by the processor by using the information regarding the speech expectation section.

15. The service monitoring system of claim 9, further comprising:
a directivity controller that forms the directivity of a voice in a predetermined directive direction from the microphone on the basis of the voice data of the employee stored in the second memory,
wherein the processor calculates the service speech evaluation value on the basis of voice data of the employee in which the directivity of the voice is formed by the directivity controller.

16. The service monitoring system of claim 1,
wherein the target voice data is identified in response to the predetermined operation by the predetermined business terminal.

17. The service monitoring system of claim 1,
wherein the predetermined operation by the predetermined business terminal includes an opening of a door.

18. The service monitoring system of claim 1,
wherein the predetermined operation includes an operation of a POS terminal.

19. A service monitoring method for a service monitoring system including a microphone that collects a voice of an employee in a predetermined voice collection region, the method comprising:
storing service event data including determination conditions for each predetermined service event in a first memory;
storing terminal operation history data indicating an operation history on a predetermined business terminal and voice data of the employee collected by the microphone in correlation with the operation history in a second memory;

storing, in the second memory, video data of a predefined position in the predetermined voice collection region obtained through imaging via a camera;

detecting, by a computer having a processor, an occurrence of a predetermined service event based on a detection of a predetermined operation by the predetermined business terminal within the terminal operation history data stored in the second memory, in view of the service event data stored in the first memory;

identifying, by the computer having the processor, target voice data of the employee that is captured during the predetermined operation by the predetermined business terminal from the voice data of the employee stored in the second memory;

calculating a service speech evaluation value of the employee based on whether or not a predetermined speech keyword was included in the target voice data;

storing the calculated service speech evaluation value in correlation with identification information of the employee, and voice data of the employee specified by a service position and a service time point of the employee; and updating the service speech evaluation value in response to a correction operation on a service position during a service event of the employee detected by the processor while the video data of the predefined position in the predetermined voice collection region stored in the second memory is being output, wherein the computer is physically separate from the predetermined business terminal, and wherein the predetermined operation includes a physical operation of the predetermined business terminal.

* * * * *